United States Patent [19]
Sato et al.

[11] Patent Number: 5,585,200
[45] Date of Patent: *Dec. 17, 1996

[54] OVER WRITE CAPABLE MAGNETOOPTICAL RECORDING MEDIUM

[75] Inventors: Masatoshi Sato, Machida; Hiroyuki Matsumoto, Tokyo, both of Japan

[73] Assignee: Nikon Corporation, Tokyo, Japan

[ * ] Notice: The term of this patent shall not extend beyond the expiration date of Pat. No. 5,239,534.

[21] Appl. No.: 750,701

[22] Filed: Aug. 20, 1991

Related U.S. Application Data

[62] Division of Ser. No. 580,361, Sep. 10, 1990, abandoned, which is a continuation of Ser. No. 343,361, Apr. 26, 1989, abandoned.

[30] Foreign Application Priority Data

| Apr. 28, 1988 | [JP] | Japan | 63-105833 |
| May 19, 1988 | [JP] | Japan | 63-122634 |
| Jun. 7, 1988 | [JP] | Japan | 63-140275 |

[51] Int. Cl.$^6$ .................................................. G11B 5/66
[52] U.S. Cl. ........................ 428/694 ML; 428/684 MM; 428/684 EC; 428/900; 360/131; 360/135; 365/122; 369/13; 369/121
[58] Field of Search ................................. 428/694, 900, 428/694 ML, 694 MM, 694 EC; 360/131, 135; 365/122; 369/13, 121; 430/945

[56] References Cited

U.S. PATENT DOCUMENTS

| 4,556,291 | 12/1985 | Chen | 359/324 |
| 4,649,519 | 3/1987 | Sun et al. | 365/122 |
| 4,753,853 | 6/1988 | Sato et al. | 428/679 |
| 4,855,975 | 8/1989 | Akasaka et al. | 369/13 |
| 5,239,534 | 8/1993 | Matsumoto | 369/288 |

FOREIGN PATENT DOCUMENTS

| 8775306 | 1/1988 | Australia . |
| 225141 | 6/1987 | European Pat. Off. . |
| 257530 | 3/1988 | European Pat. Off. . |

OTHER PUBLICATIONS

Saito et al, "Direct Overwrite By Light Power Modulation on Magnetooptical Multi–Layered Media", Jap. J. App. Phys., vol. 26, Sep. 16, 1987, Supplement 26–4 pp. 155–159.

Kobayashi et al. "Magnetization Process of Exchange-Coupled Ferrimagnetic Double–Layered Films" Jap. J. App. Phys. vol. 20 No. 11 Nov., 1981 pp. 2089–2095.

The Bell System Technical Journal, Sep. 1983, vol. 62, No. 7, Part 1, pp. 1923–1936.

*Primary Examiner*—Leszek Kiliman
*Attorney, Agent, or Firm*—Shapiro and Shapiro

[57] ABSTRACT

An overwritable method of magnetooptical recording uses an over write capable magnetooptical recording medium that comprises a substrate and a magnetic layer. The magnetic layer is stacked on the substrate and includes first and second layers each having a perpendicular magnetic anisotropy. When a high-level laser beam irradiates the medium, the magnetization of the second layer is reversed and a bit of one magnetization direction is recorded in the first layer under the influence of the magnetization of the second layer. When a low-level laser beam irradiates the medium, a bit of opposite magnetization direction is recorded in the first layer under the influence of the second layer. This overwritable method of magnetooptical recording exhibits a high C/N ratio without decreasing recording sensitivity.

8 Claims, 30 Drawing Sheets

---

FIRST LAYER: RECORDING LAYER

SECOND LAYER: REFERENCE LAYER

FIG. 4A
| FIRST LAYER: RECORDING LAYER |
| SECOND LAYER: REFERENCE LAYER |
FIG. 4B
| FIRST LAYER | ⇩⇩⇧⇩⇩⇧⇧⇩⇩ |
| SECOND LAYER | ⇧⇧⇧⇧⇧⇧⇧⇧⇧ |
FIG. 5
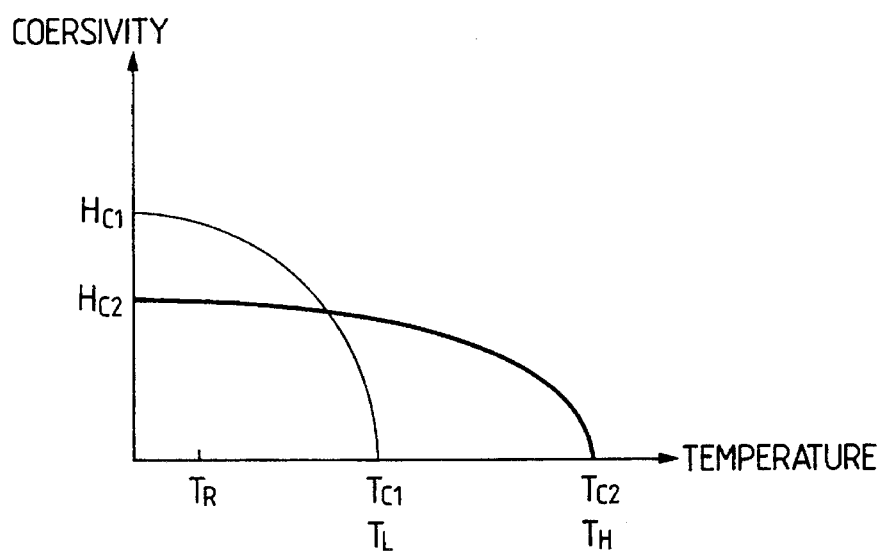
FIG. 6
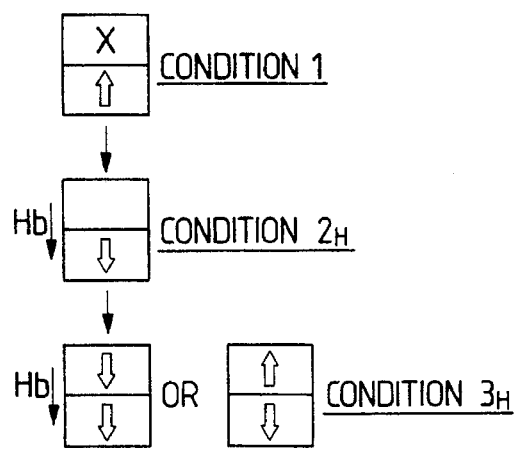
FIG. 7
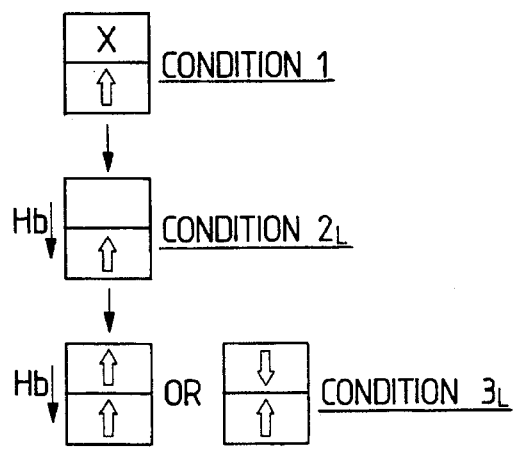

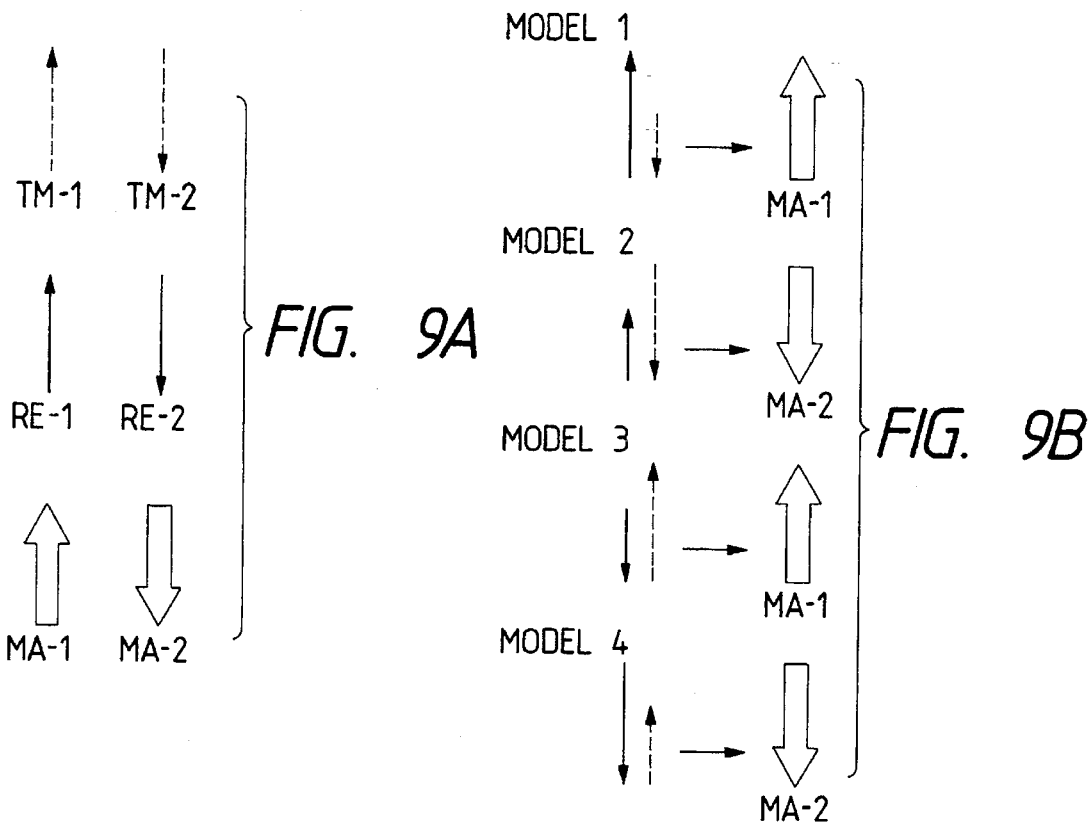
FIG. 9A
FIG. 9B
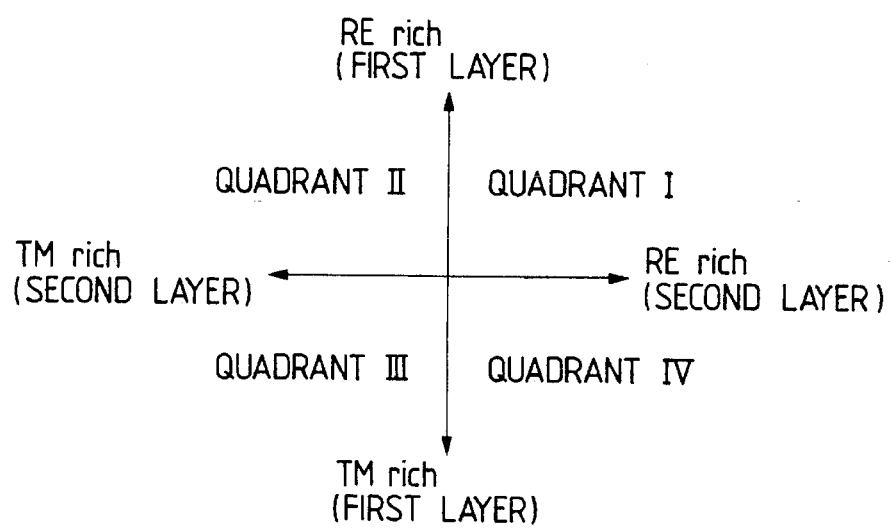
FIG. 10

MEDIUM NO. 1-1

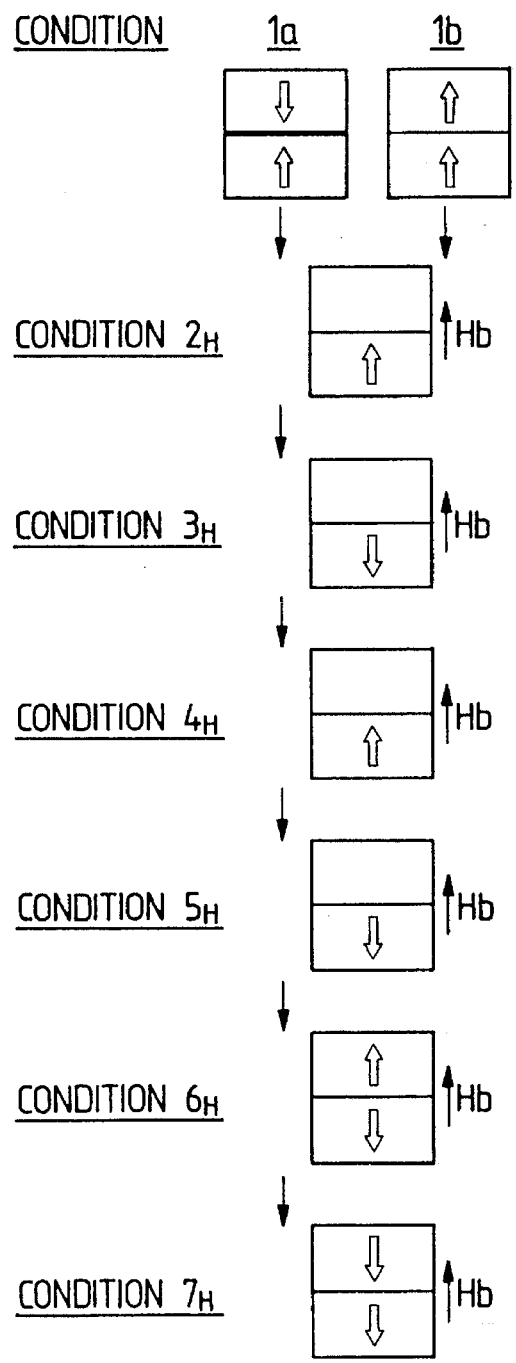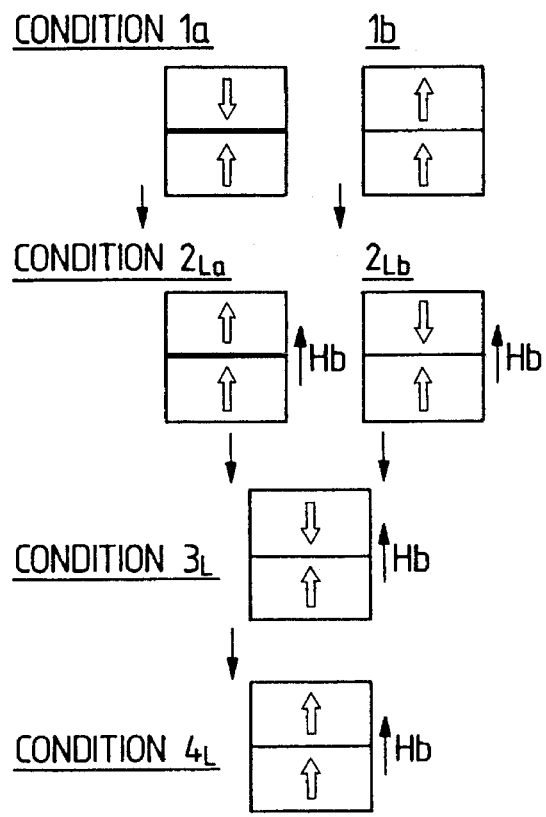

MEDIUM NO. 1-2

MEDIUM NO. 1-3

MEDIUM NO. 2-1

MEDIUM NO. 2-2

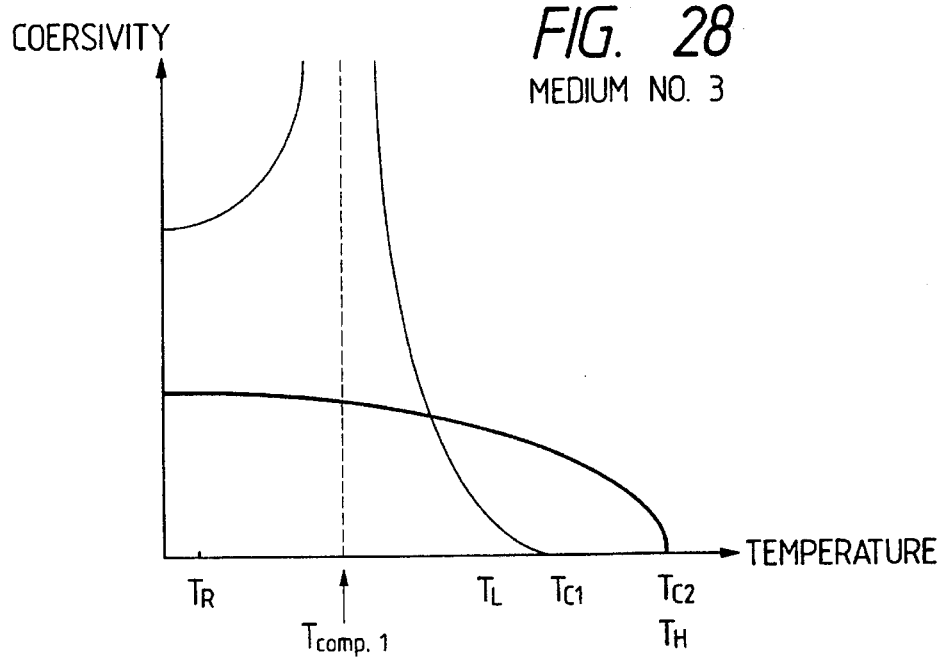
FIG. 28
MEDIUM NO. 3
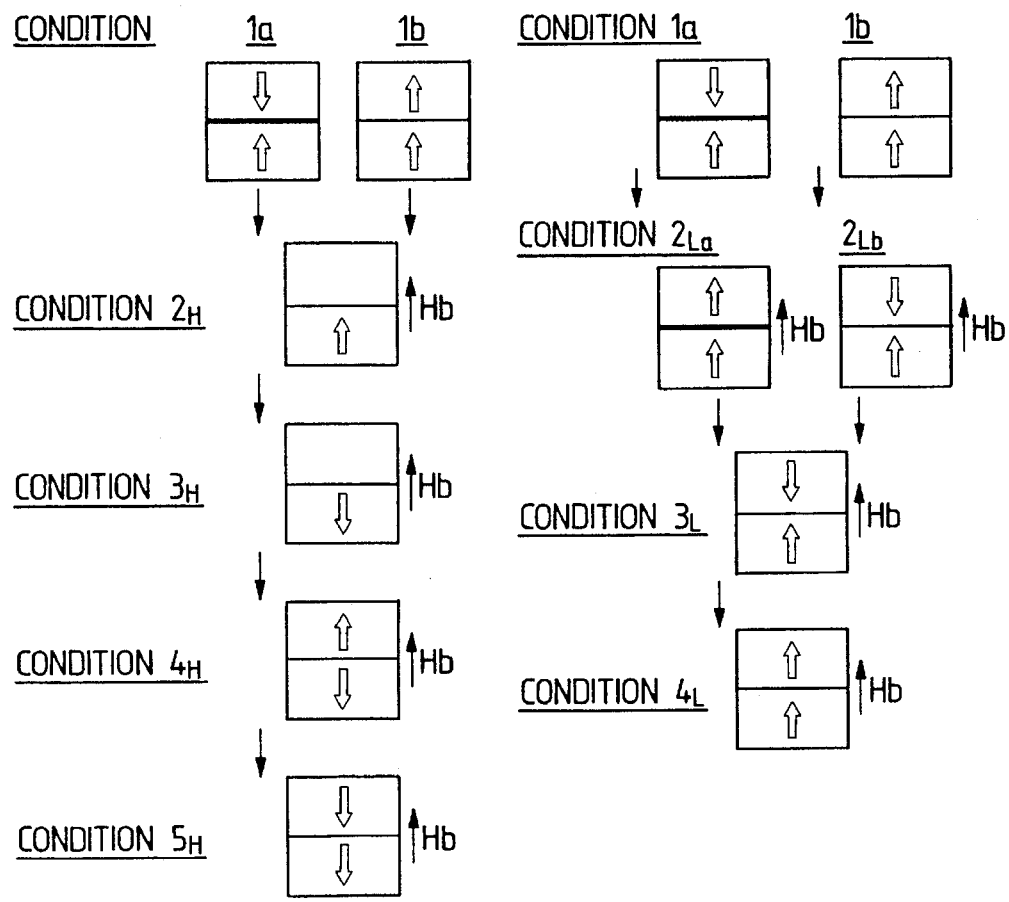
FIG. 29
FIG. 30

MEDIUM NO. 4-1

MEDIUM NO. 4-2

FIG. 32
FIG. 33
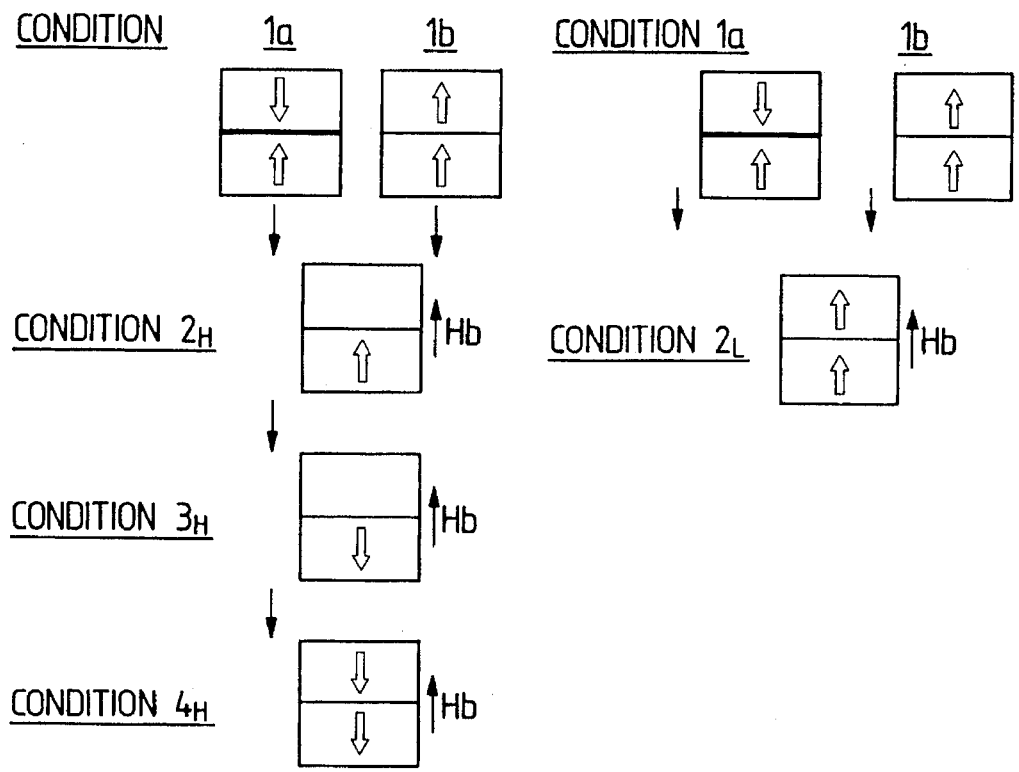
FIG. 35
FIG. 36
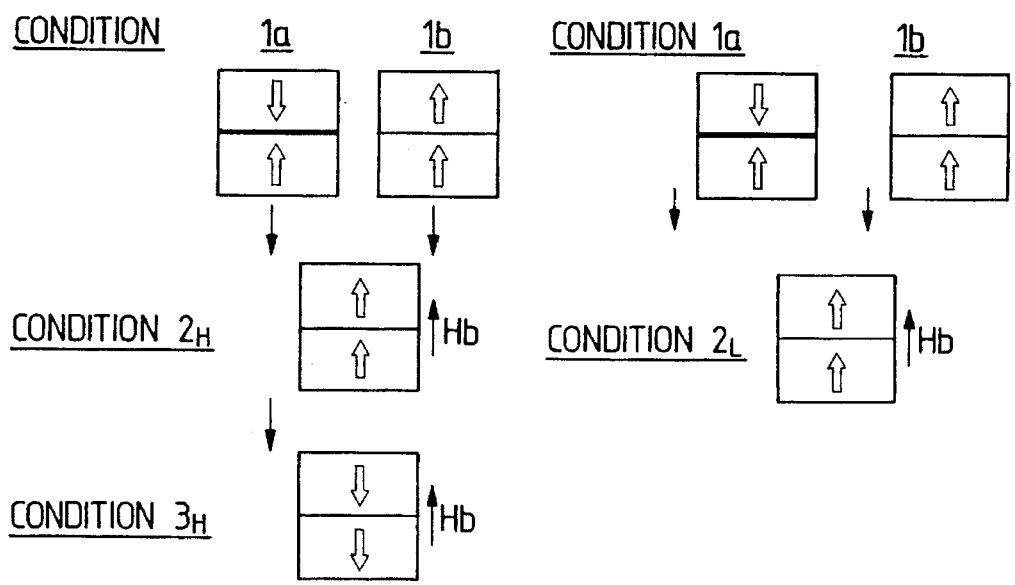

MEDIUM NO. 5-1

MEDIUM NO. 5-2

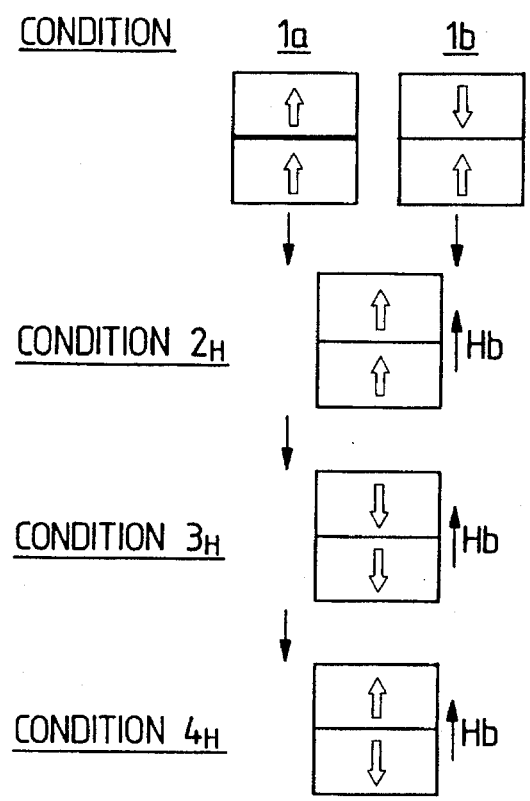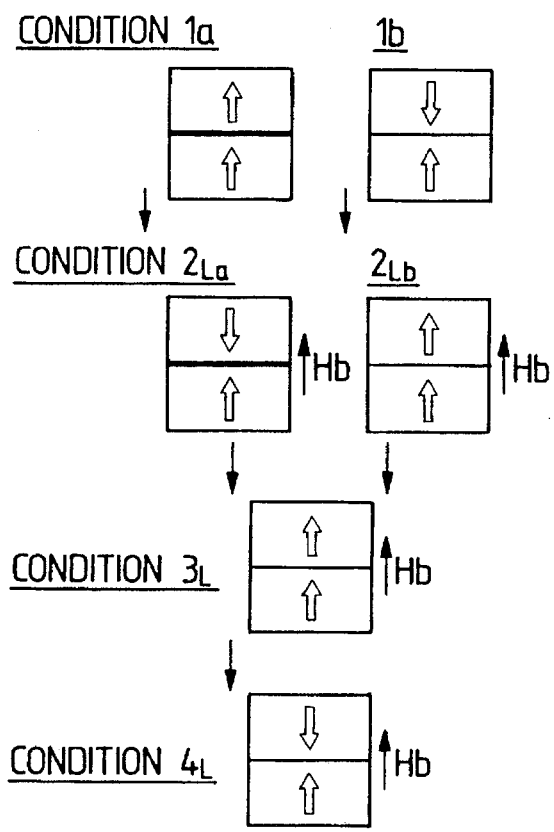

FIG. 43
MEDIUM NO. 6
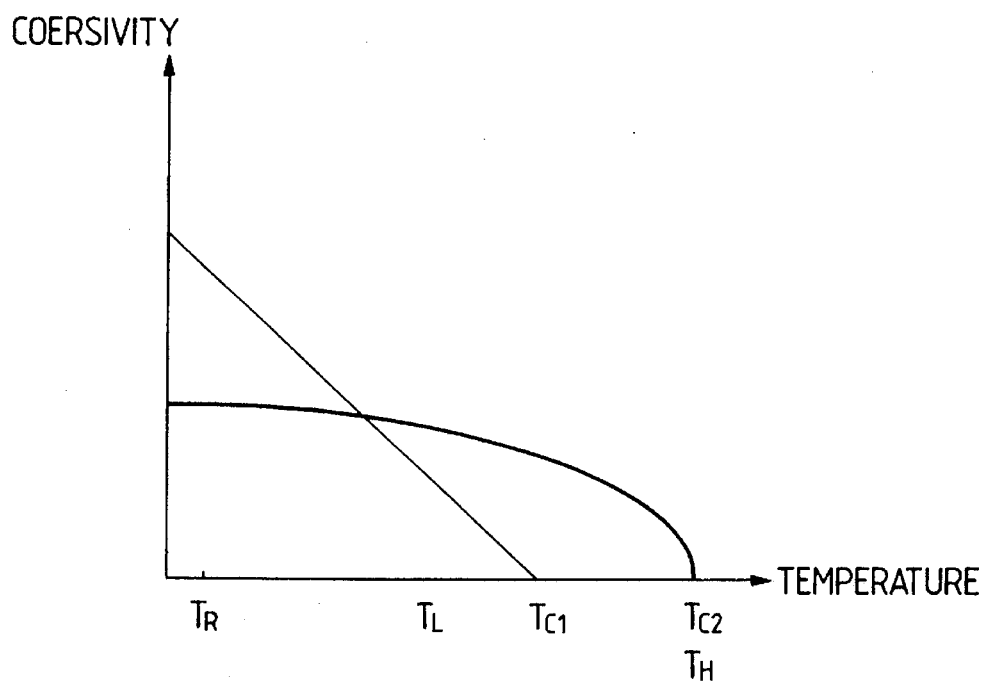
FIG. 44
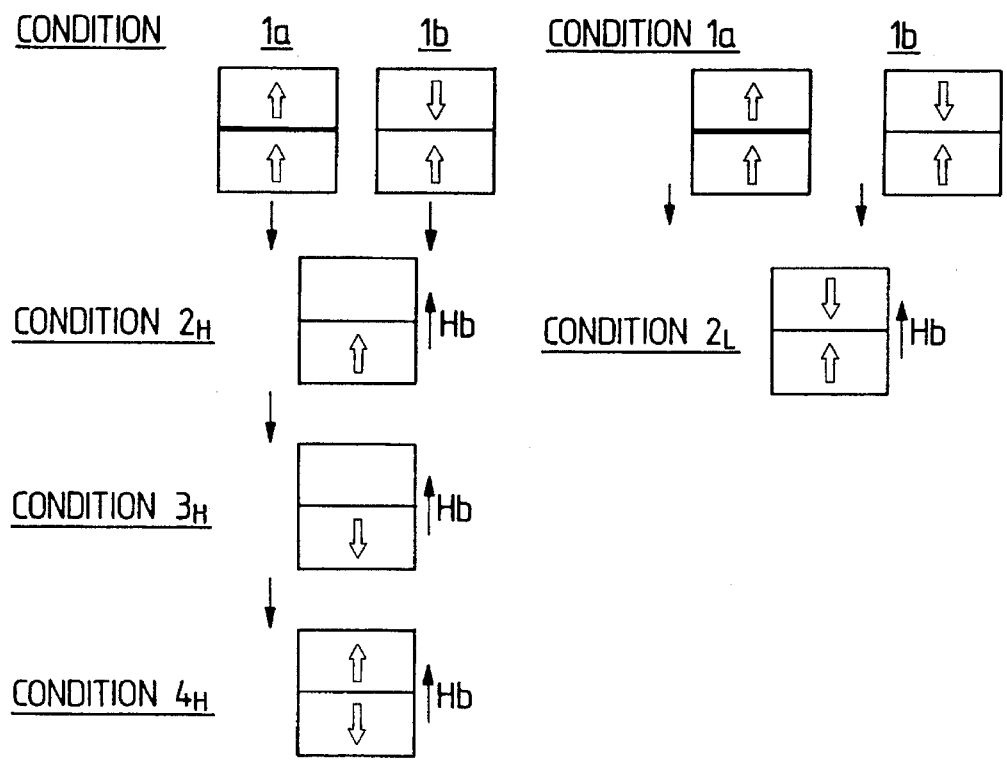
FIG. 45

MEDIUM NO. 7-1

MEDIUM NO. 7-2

CONDITION

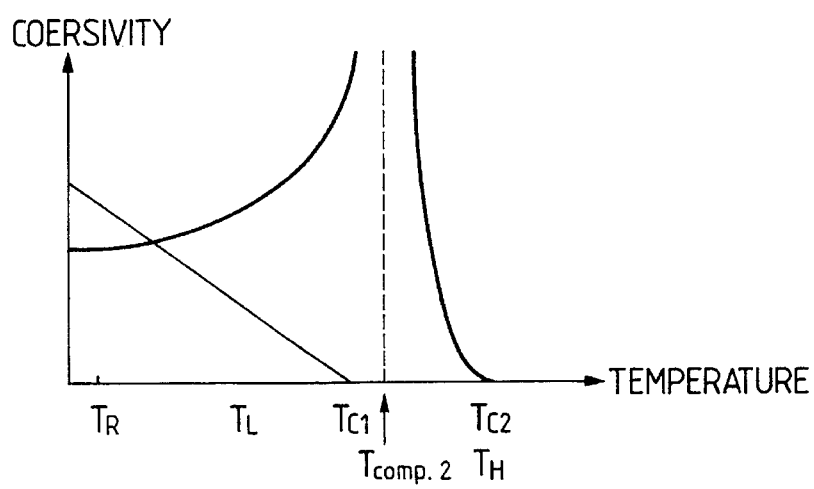
FIG. 52 MEDIUM NO. 8-1
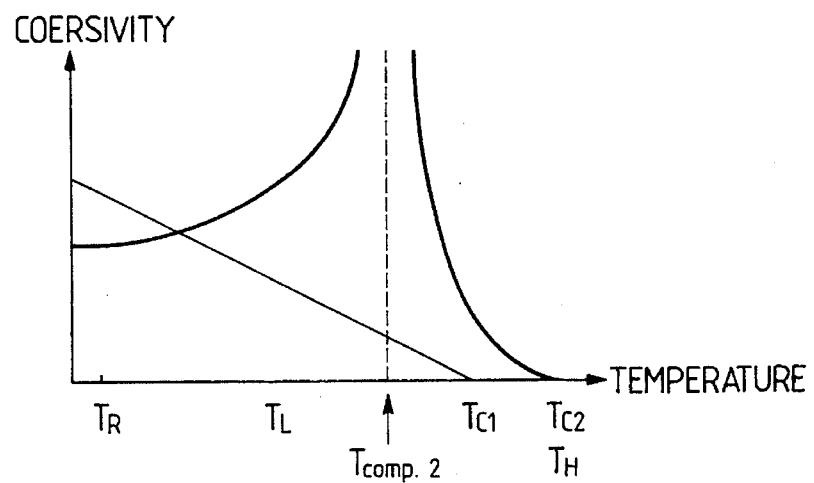
FIG. 55 MEDIUM NO. 8-2
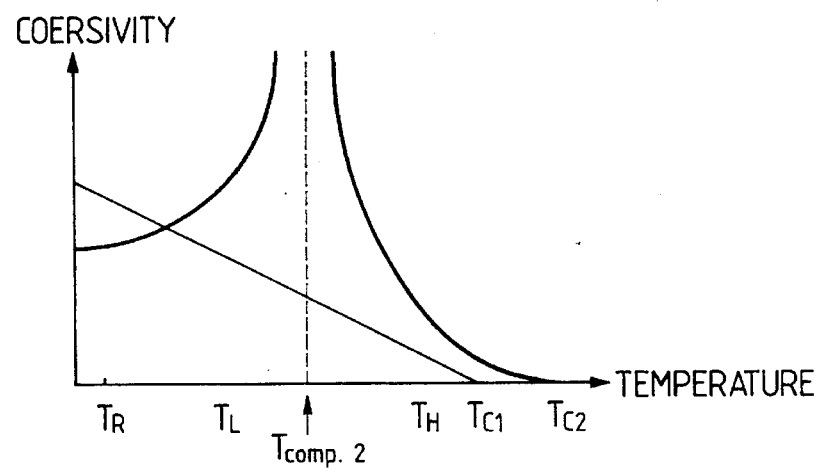
FIG. 58 MEDIUM NO. 8-3

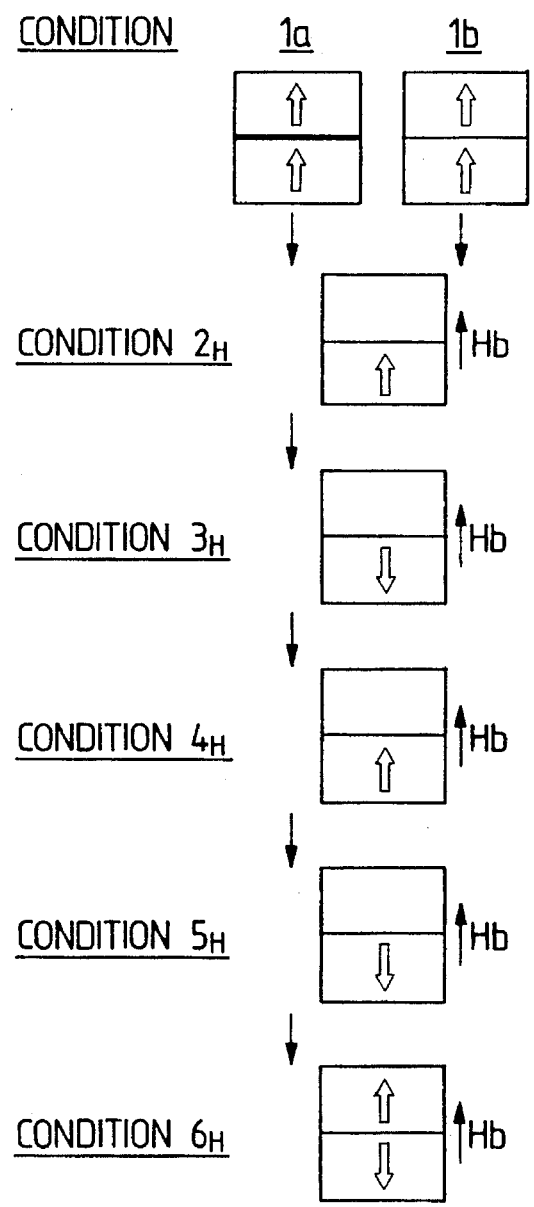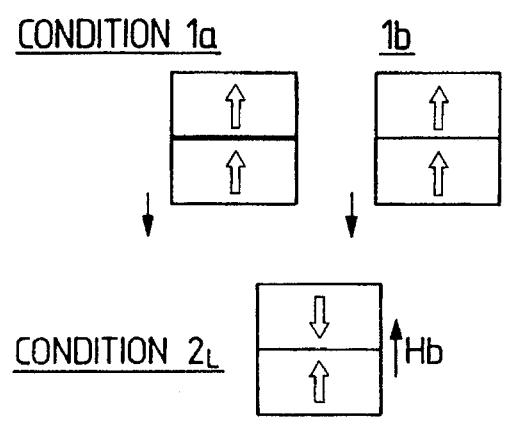
FIG. 53
FIG. 54

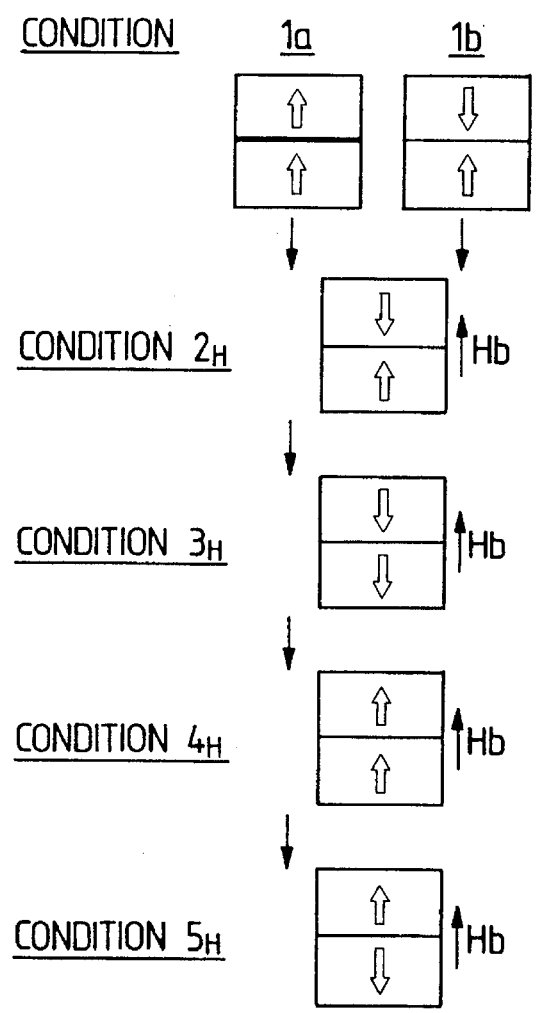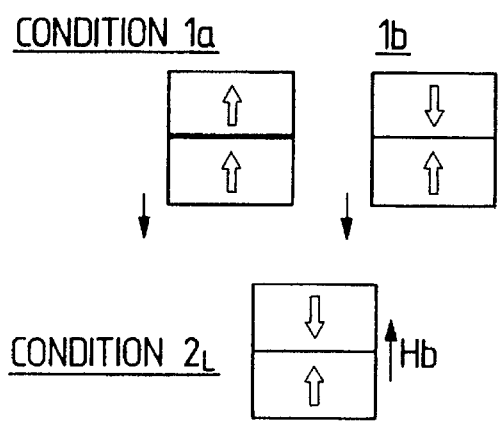
FIG. 59
FIG. 60

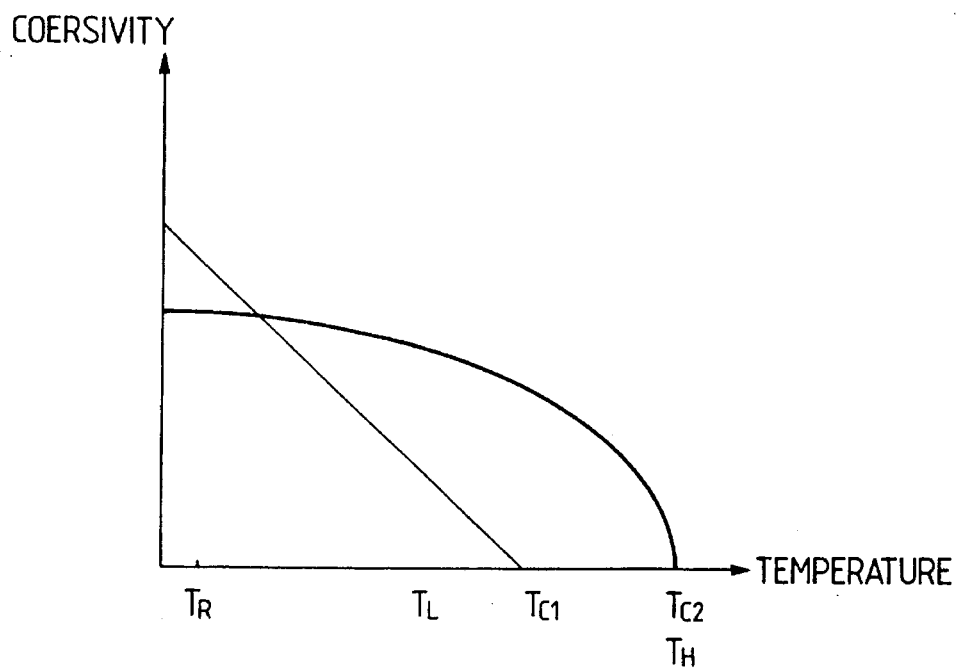
FIG. 61
MEDIUM NO. 9
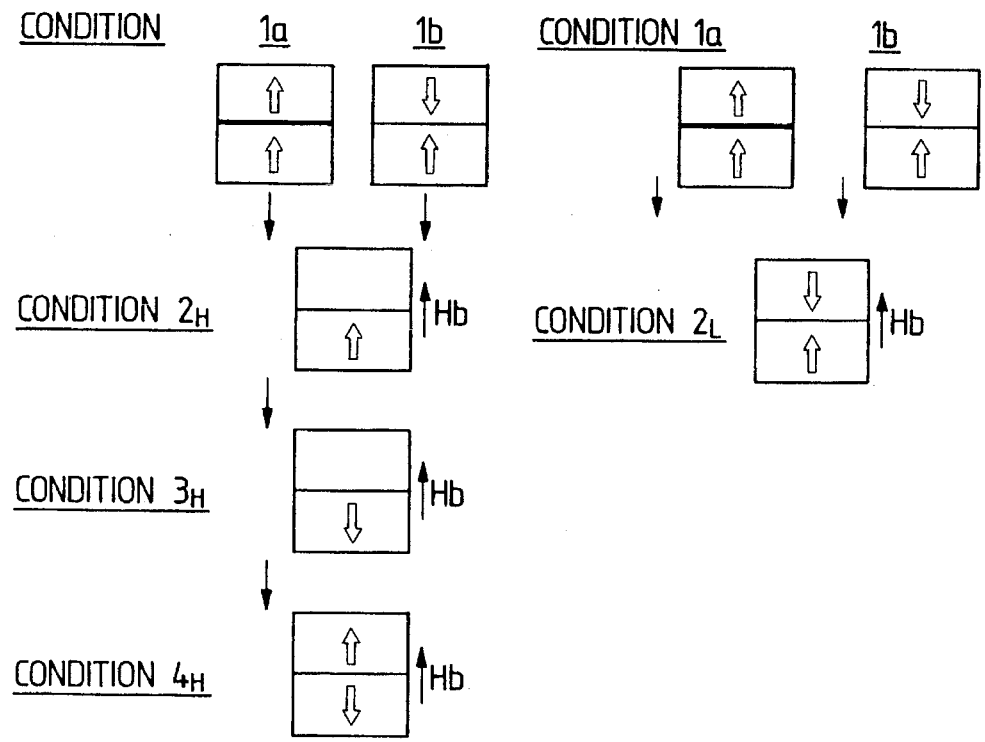
FIG. 62
FIG. 63

സ്1

OVER WRITE CAPABLE MAGNETOOPTICAL RECORDING MEDIUM

This is a division of application Ser. No. 580,361 filed Sep. 10, 1990, which is a continuation of application Ser. No. 343,361 filed Apr. 26, 1989, both of which are now abandoned.

BACKGROUND OF THE INVENTION

1. Field of the Invention

The present invention relates to an overwritable method of magnetooptical recording used with a modulated optical energy beam.

2. Related Background Art

In recent years, many efforts have been made to develop an optical recording/reproduction method, an optical recording apparatus and a medium used therefor, which can satisfy various requirements including high density, large capacity, high speed access, and high recording/reproduction speed.

Of various optical recording/reproduction methods, the magnetooptical recording/reproduction method is most attractive due to its unique advantages that information can be erased after use and new information can be written thereon.

A recording medium used in a magnetooptical recording/reproduction method has a perpendicular magnetic layer or layers as a recording layer. The magnetic layer comprises, for example, amorphous GdFe, GdCo, GdFeCo, TbFe, TbCo, TbFeCo, and the like. Concentric or spiral tracks are formed on the recording layer, and data is recorded on the tracks. Note that in this specification, one of the "upward" and "downward" directions of magnetization with respect to a film surface is defined as an "A direction" and the other one is defined as a "non-A direction". Data to be recorded is binarized in advance, and is recorded by a bit ($B_1$) having "A-directed" magnetization and a bit ($B_0$) having "non-A-directed" magnetization. These bits $B_1$ and $B_0$ correspond to "1" and "0" levels If of a digital signal, respectively. However, in general, the direction of magnetization of the recording tracks can be aligned in the "non-A direction" by applying a strong bias field before recording. This processing is called "initialization". Thereafter, the bit ($B_1$) having "A-directed" magnetization is formed on the tracks. Data is recorded in accordance with the presence/absence and/or a bit length of the bit ($B_1$).

Principle of Bit Formation

In the bit formation, a characteristic feature of a laser, i.e., excellent coherence in space and time, is effectively used to focus a beam into a spot as small as the diffraction limit determined by the wavelength of the laser light. The focused light is radiated onto the track surface to write data by producing bits less than 1 μm in diameter on the recording layer. In optical recording, a recording density up to $10^8$ bit/cm$^2$ can be theoretically attained, since a laser beam can be concentrated into a spot with a size as small as its wavelength.

As shown in FIG. 1, in magnetooptical recording, a laser beam L is focused onto a recording layer 1 to heat it, while a bias field (Hb) is externally applied to the heated portion in the direction opposite the initialized direction. A coercivity Hc of the locally heated portion is decreased below the bias field (Hb). As a result, the direction of magnetization of that portion is aligned in the direction of the bias field (Hb). In this way, reversely magnetized bits are formed.

Ferromagnetic and ferrimagnetic materials differ in the temperature dependencies of the magnetization and Hc. Ferromagnetic materials have Hc which decreases around the Curie temperature and allow data recording based on this phenomenon. Thus, data recording in ferromagnetic materials is referred to as Tc recording (Curie temperature recording).

On the other hand, ferrimagnetic materials have a compensation temperature, below the Curie temperature, at which magnetization (M) becomes zero. The Hc abruptly increases around this temperature and hence abruptly decreases outside this temperature. The decreased Hc is cancelled by a relatively weak bias field (Hb). Thus, recording is enabled. This process is called Tcomp. recording (compensation point recording).

In this case, however, there is no need to adhere to the Curie point or temperature therearound, and the compensation temperature. In other words, if a bias field (Hb) capable of cancelling a decreased Hc is applied to a magnetic material having the decreased Hc at a predetermined temperature higher than a room temperature, recording is enabled.

Principle of Reading

FIG. 2 illustrates the principle of data reading based on the magnetooptical effect. Light is an electromagnetic wave with an electromagnetic-field vector normally emanating in all directions in a plane perpendicular to the light path. When light is converted to linearly polarized beams (Lp) and radiated onto a recording layer (l), it is reflected by or passes through the recording layer (l). At this time, the plane of polarization rotates according to the direction of magnetization (M). This phenomenon is called the magnetic Kerr effect or magnetic Faraday Effect.

For example, if the plane of polarization of the reflected light rotates through $\theta_k$ degrees for "A-directed" magnetization, it rotates through $-\theta_k$ degrees for the "non-A-directed" magnetization. Therefore, when the axis of an optical analyzer (polarizer) is set perpendicular to the plane inclined at $-\theta_k$, the light reflected by a "non-A-direction" magnetized bit ($B_0$) cannot pass through the analyzer. On the contrary, a product $(\times \sin 2\theta_k)^2$ of the light reflected by a bit ($B_1$) magnetized along the "A direction" passes through the analyzer and becomes incident on a detector (photoelectric conversion means). As a result, the bit ($B_1$) magnetized along the "A direction" looks brighter than the bit ($B_0$) magnetized along the "non-A-direction", and the detector produces a stronger electrical signal for the bit ($B_1$). The electrical signal from the detector is modulated in accordance with the recording data, thus reading the data.

In order to reuse a recorded medium (i) the medium must be initialized by an initializing device; (ii) an erase head similar to a recording head must be provided in a recording apparatus; or (iii) recorded information must be erased using a recording apparatus or an erasing device as preprocessing.

It was thought that an over write operation capable of recording new information regardless of the presence/absence of recorded information could not be realized in a practical magnetooptical recording system.

If the direction of the bias field Hb can be freely adjusted between the "A direction" and the "non-A-direction", the over write operation can be performed. However, it is impossible to modulate the direction of the bias field Hb at high speed. For example, if the bias field Hb corresponds to a permanent magnet, the direction of the magnet must be mechanically reversed. However, it is impossible to reverse the direction of the magnet at high speed. When the bias field Hb corresponds to an electromagnet, it is also impossible to modulate the direction of a large-capacity current at high speed.

However, the magnetooptical technologies have made rapid progress, and a magnetooptical recording method capable of performing an over write operation by modulating an intensity of light to be radiated in accordance with binary information to be recorded without turning on/off the bias field Hb or without modulating the direction of the bias field Hb, an over write capable magnetooptical recording medium used therefor, and an over write capable recording apparatus used therefor have been developed and disclosed and claimed in patent applications (U.S. Ser. No. 870,350, now abandoned, and West Germany Patent Application No. 36,19,618 filed on Jun. 4, 1986). These applications will be referred to as a "prior application".

DESCRIPTION OF THE INVENTION OF THE PRIOR APPLICATION

One of the characteristic features of the invention of the prior application is to use a magnetooptical recording medium comprising a multi-layered perpendicular magnetic film of an at least two-layered structure constituted by a recording layer (first layer) and a reference layer (second layer). Information is recorded by a bit having an "A-directed" magnetization, and a bit having a "non-A-directed" magnetization in the first layer (also in the second layer in some cases).

The over write method of the invention of the prior application comprises the steps of:

(a) moving a recording medium;

(b) applying an initial field Hini. to leave the magnetization of the first layer unchanged and to align the direction of magnetization of the second layer in the "A direction" before recording;

(c) radiating a laser beam onto the medium;

(d) pulse-modulating the beam intensity in accordance with binary information to be recorded;

(e) applying a bias field when the beam is radiated; and (f) forming one of a bit having an "A-directed" magnetization and a bit having "non-A-directed" magnetization when the intensity of the pulse beam is at high level, and forming the remaining bit when the beam intensity is at low level.

In the invention of the prior application, when recording is performed, an over write capable magnetooptical recording apparatus is used which comprises:

(a) means for moving a magnetooptical recording medium;

(b) initial field Hini apply means;

(c) a laser beam light source;

(d) modulating means for pulse-modulating the beam intensity in accordance with binary information to be recorded between:

(1) high level giving to the medium a temperature suitable for forming one of a bit having an "A-directed" magnetization and a bit having a "non-A-directed" magnetization, and (2) low level giving to the medium a temperature suitable for forming the remaining bit; and (e) bias field applying means which can also be used as the initial field apply means.

In the invention of the prior application, a laser beam is pulse-modulated in accordance with information to be recorded. However, the pulse-modulation itself is also performed in conventional magnetooptical recording, and the means for pulse-modulating the beam intensity in accordance with binary information to be recorded is a known means. For example, such a means is described in detail in THE BELL SYSTEM TECHNICAL JOURNAL, Vol. 62 (1983), 1923–1936. Therefore, if necessary high and low levels of a beam intensity can be given, such a means can be easily available by partially modifying the conventional modulating means. Such a modification is easy for those who are skilled in the art if the high and low levels of the beam intensity are given.

A characteristic feature of the over-write operation in the invention of the prior application relates to high and low levels of a beam intensity. More specifically, when the beam intensity is at high level, an "A-directed" magnetization of the reference layer (second layer) is reversed to a "non-A-directed" magnetization by a recording magnetic field (Hb), and a bit having the "non-A-directed" magnetization (or "A-directed" magnetization) is formed in the recording layer (first layer) by the "non-A-directed" magnetization of the second layer. When the beam intensity is at low level, a bit having the "A-directed" magnetization (or "non-A-directed" magnetization) is formed in the recording layer by the "A-directed" magnetization of the reference layer.

In a ooo (or ΔΔΔ) expression, if you read ooo outside the parentheses, you should read ooo outside the parentheses in the following ooo (or ΔΔΔ) expressions. On the contrary, if you select and read ΔΔΔ in the parentheses without reading ooo, you should read ΔΔΔ outside the parentheses without reading ooo in the following ooo (or ΔΔΔ) expressions.

As has been already known, when no recording is performed, a laser beam is often turned on at "very low level" in order to access, e.g., a predetermined recording position on a medium. When the laser beam is also used for reproduction, the laser beam is often turned on at an intensity of "very low level". In the present invention, the intensity of the laser beam is often set to be "very low level". However, the low level when a bit is formed is higher than the "very low level". Therefore, an output waveform of the laser beam in the invention of the prior application is shown in FIG. 3A.

Although not disclosed in the specification of the prior application, in the present invention, a recording beam can employ not one beam, but two adjacent beams, so that the first beam is a low-level laser beam (erase beam) which is not modulated in principle, and the second beam is a high-level laser beam (write beam) which is modulated in accordance with information. In this case, the second beam is pulse-modulated between high level and base level (equal to or lower than low level; base level can be zero). An output waveform in this case is shown in FIG. 3B.

The invention of the prior application is divided into first and second aspects. In both the aspects, the recording medium has a multilayered structure, which is divided into two layers, as shown in FIG. 4A.

The first layer is the recording layer, which exhibits high coercivity at room temperature and has low reversing temperature. The second layer is the reference layer, which exhibits low coercivity at room temperature and has a higher reversing temperature than the first layer. Both the layers comprise perpendicular magnetic layers.

Note that each of the first and second layers may comprises a multi-layered film. In some cases, a third layer may be present between the first and second layers. Furthermore, no clear boundary need be present between the first and second layers, so that one layer can be gradually changed to the other layer.

In the first aspect, the coercivity of a first layer is represented by $H_{C1}$; that of a second layer $H_{C2}$; the Curie temperature of the first layer, $T_{C1}$; that of the second layer, $T_{C2}$; the room temperature, $T_R$; the temperature of the recording medium when a low level laser beam is radiated, $T_L$; that when a high level laser beam is radiated, $T_H$; a coupling field applied to the first layer, $H_{D1}$; and a coupling field applied to the second layer, $H_{D2}$. In this case, the recording medium satisfies the following Formula 1, and satisfies Formulas 2 to 5 at the room temperature.

$T_R < T_{C1} \approx T_L < T_{C2} \approx T_H$  Formula 1

$H_{C1} > H_{C2} + |H_{D1} \mp H_{D2}|$  Formula 2

$H_{C1} > H_{D1}$  Formula 3

$H_{C2} > H_{D2}$  Formula 4

$H_{C2} + H_{D2} < |Hini.| < H_{C1} \pm H_{D1}$  Formula 5

In the above formula, symbol "≈" means "equal to" or "substantially equal to". In addition, of double signs ± and ∓, the upper sign corresponds to an A (antiparallel) type medium, and the lower sign corresponds to a P (parallel) type medium (these media will be described later). Note that the P type medium includes a ferromagnetic material and a magnetostatic coupling medium.

The relationship between the coercivity and the temperature is as shown in the graph of FIG. 5. Referring to FIG. 5, the thin curve represents the characteristics of the first layer and the bold curve represents those of the second layer.

When an initial field (Hini.) is applied to the recording medium at room temperature, the direction of magnetization of the second layer is reversed without reversing that of the first layer, according to Formula 5. When the initial field (Hini.) is applied to the recording layer before recording, the second layer can be magnetized in the "A direction" (in the drawings, the "A direction" is indicated by an upward arrow, and the "non-A-direction" is indicated by a downward arrow). If the initial field (Hini.) is decreased to zero, the direction of magnetization of the second layer can be left unchanged without being re-reversed, according to Formula 4.

FIG. 4B schematically shows a state wherein only the second layer is magnetized in the "A direction" immediately before recording.

Referring to FIG. 4B the direction of magnetization in the first layer represents previously recorded data. Since the direction of magnetization in the first layer 1 does not change the basic operation mechanism, it is indicated by X in the following description. The diagram in FIG. 4B is modified as shown in Condition 1 in FIG. 6 for the sake of simplicity.

In Condition 1, the high-level laser beam is radiated onto the recording medium to increase the medium temperature to $T_H$. Since $T_H$ is higher than the Curie temperature $T_{C1}$, magnetization of the first layer 1 disappears. In addition, since $T_H$ is near the Curie temperature $T_{C2}$ magnetization of the second layer 2 also disappears completely or almost completely. The bias field (Hb) in the "A direction" or "non-A direction" is applied to the medium in accordance with the type thereof. The bias field (Hb) can be a stray field from the medium itself. For the sake of simplicity, assume that the bias field (Hb) in the "non-A direction" is applied to the medium. Since the medium is moving, a given irradiated portion is immediately separated from the laser beam and is cooled by air. When the temperature of the medium is decreased under the presence of the field Hb, the direction of magnetization of the second layer is reversed to the "non-A direction" based on the field Hb (Condition $2_H$ in FIG. 6).

When the medium is further cooled and the medium temperature is decreased below $T_{C1}$, magnetization of the first layer appears again. In this case, the direction of magnetization of the first layer is influenced by that of the second layer due to a magnetic coupling (exchange or magnetostatic coupling) force. As a result, "non-A directional" magnetization (the P type medium) or "A directional" magnetization (the A type medium) is formed in accordance with the type of the medium, as shown in Condition $3_H$ in FIG. 6.

A change in conditions due to high-level laser beam irradiation is called a high-temperature cycle herein.

Next, in Condition 1 in FIG. 7, the low-level laser beam is radiated onto the medium to increase the medium temperature to $T_L$. Since $T_L$ is near the Curie temperature $T_{C1}$, magnetization of the first layer disappears completely or almost completely. However, since $T_L$ is below the Curie temperature $T_{C2}$, magnetization of the second layer does not disappear (condition $2_L$ in FIG. 7). In Condition $2_L$, although the bias field (Hb) is unnecessary, it cannot be turned on or off at high speed. Therefore, the bias field (Hb) is left applied inevitably.

However, since the coercivity $H_{C2}$ is maintained high, the direction of magnetization of the second layer will not be reversed due to the field Hb. Since the medium is moving, a given irradiated portion is immediately separated from the laser beam and is cooled by air. As cooling progresses, magnetization of the first layer appears. The direction of magnetization is influenced by that of the second layer due to the magnetic coupling force. As a result, "A directional" magnetization (the P type medium) or "non-A directional" magnetization (the A type medium) appears in accordance with the type of the medium. This magnetization is not changed even at the room temperature (Condition $3_L$ in FIG. 7).

A change in conditions due to low-level laser beam irradiation is called a low-temperature cycle herein.

FIG. 8 summarizes the above descriptions. Referring to FIG. 8, bits, having either "A directional" magnetization or "non-A directional" magnetization, which are opposite to each other, are formed in the high- and low-temperature cycles regardless of the direction of magnetization in the first layer. More specifically, an over-write operation is enabled by pulse modulating the laser beam between high level (high-temperature cycle) and low level (low-temperature cycle) in accordance with data to be recorded.

Note that the recording medium normally has a disk shape, and is rotated during recording. For this reason, a recorded portion (bit) is again influenced by the initial field (Hini.), which is applied by initial field applying means during a single rotation. As a result, the direction of magnetization of the second layer is aligned along the original "A direction". However, at the room temperature, magnetization of the second layer can no longer influence that of the first layer, and the recorded data can be held.

If linearly polarized light is radiated onto the first layer, since light reflected thereby includes data, data can be reproduced as in the conventional magnetooptical recording medium.

Note that according to the composition design of the first and second layers, a reproduction field $H_R$ is applied before reproduction, so that information in the first layer is transferred to the second layer which is aligned in the original "A direction", or information in the first layer is naturally transferred to the second layer as soon as the influence of the field Hini. disappears without applying the reproduction field $H_R$. In this case, information can be reproduced from the second layer.

A perpendicular magnetic film constituting the first layer and the second layer is selected from the group consisting of (1) crystalline or amorphous ferromagnetic or ferrimagnetic materials having the Curie temperature and no compensation temperature, and (2) crystalline or amorphous ferrimagnetic materials having both the compensation temperature and the Curie temperature.

The first aspect utilizing the Curie temperature has been described. In contrast to this, the second aspect of the present invention utilizes decreased coercivity $H_C$ at a predetermined temperature exceeding the room temperature. The second aspect uses a temperature $T_{S1}$ at which the first layer is magnetically coupled to the second layer, in place of the temperature $T_{C1}$ in the first aspect. In addition, instead of the temperature $T_{C2}$, a temperature $T_{S2}$ at which the second layer is reversed under the influence of the field Hb is used. Thereby, the second aspect can provide the same effect as in the first aspect.

In the second aspect, the coercivity of the first layer is represented by $H_{C1}$; that of the second layer, $H_{C2}$; a temperature at which the first layer is magnetically coupled to the second layer, $T_{S1}$; a temperature at which the direction of magnetization of the second layer is reversed upon influence of the field Hb, $T_{S2}$; room temperature, $T_R$; a temperature of the medium when a low-level laser beam is applied thereto, $T_L$; a temperature of the medium when a high-level laser beam is applied thereto; $T_H$, a coupling field applied to the first layer, $H_{D1}$; and a coupling field applied to the second layer, $H_{D2}$. In this case, the recording medium satisfies the following Formula 6, and satisfies Formulas 7 to 10 at the room temperature.

$$T_R<T_{S1}\approx T_L<T_{S2}\approx T_H \quad \text{Formula 6}$$

$$H_{C1}>H_{C2}+|H_{D1}\mp H_{D2}| \quad \text{Formula 7}$$

$$H_{C1}>H_{D1} \quad \text{Formula 8}$$

$$H_{C2}>H_{D2} \quad \text{Formula 9}$$

$$H_{C2}+H_{D2}<|H{\rm ini.}|<H_{C1}\pm H_{D1} \quad \text{Formula 10}$$

In the above formulas, upper signs of double signs ± and ∓ correspond to an A (antiparallel) type medium, and lower signs correspond to a P (parallel) type medium (these media will be described later).

In the first and second aspects, the recording medium is constituted by the first and second layers, each of which preferably comprises an amorphous ferrimagnetic material selected from transition metal (e.g., Fe, Co )—heavy rare earth metal (e.g., Gd, Tb, Dy, and the like) alloy compositions.

When the first and second layers are both selected from the transition metal—heavy rare earth metal alloy compositions, the direction and level of magnetization appearing outside the alloy are determined by the relationship between the direction and level of spin of transition metal atoms (to be referred to as TM hereinafter) and those of heavy rare earth metal atoms (to be referred to as RE hereinafter) inside the alloy. For example as shown in FIG. 9A, the direction and level of TM spin are represented by a dotted vector TM-1, those of RE spin are indicated by a solid vector RE-1, and the direction and level of magnetization of the alloy as a whole are represented by a double-solid vector MA-1. In this case, the vector MA-1 represents the sum of vectors TM-1 and RE-1. However, in the alloy, the vectors TM and RE are directed in opposite directions due to the mutual effect of the TM spin and the RE spin. Therefore, when these vectors are equal to each other, the sum of vectors TM-2 and RE-1 or the sum of vectors TM-2 and RE-1 is zero (i.e., the level of magnetization appearing outside the alloy is zero). The alloy composition making the sum of vectors zero is called a compensation composition. When the alloy has another composition, it has a strength equal to a difference between the strengths of both the spins, and has a vector (MA-1 or MA-2) having a direction equal to that of larger vector. Magnetization of this vector appears outside the alloy. For example, as shown in FIG. 9B, a pair of vectors correspond to a vector MA-1 (model 1), and a pair of vectors correspond to a vector MA-2 (model 2.

When one of the strengths of the vectors of the RM spin and TM spin is larger than the other, the alloy composition is referred to as "xx rich" named after the larger spin name (e. g., RE rich).

The first and second layers can be classified into TM rich and RE rich compositions. Therefore, if the composition of the first layer is plotted along the ordinate and that of the second layer is plotted along the abscissa, the types of the recording media according to the present invention can be classified into four quadrants, as shown in FIG. 10. The P type medium described previously belongs to Quadrant I and III, and the A type medium belongs to Quadrant II and IV. Referring to FIG. 10, the intersection (origin) of the abscissa and the ordinate represents the compensation composition of both the layers.

In view of a change in coercivity against a change in temperatures, a certain alloy composition has characteristics wherein the coercivity temporarily increases infinitely and then abruptly decreases before a temperature reaches the Curie temperature (at which the coercivity is zero). The temperature corresponding to the infinite coercivity is called a compensation temperature (Tcomp.). No compensation temperature is present between the room temperature and the Curie temperature in the TM rich alloy composition. The compensation temperature below the room temperature is irrelevant in magnetooptical recording, and hence, it is assumed in this specification that the compensation temperature is present between the room temperature and the Curie temperature.

If the first and second layers are classified in view of the presence/absence of the compensation temperature, the recording medium can be classified into four types. The recording medium in Quadrant I includes all the four types of media. The graphs of FIGS. 11A to 11D respectively show the relationship between the coercivity and the temperature of the four types of media. Note that thin curves represent characteristics of the first layer and bold curves represent those of the second layer.

When the first (recording) layer and the second (reference) layer are classified in view of their RE or TM rich characteristics and in view of the presence/absence of the compensation temperature, they can be classified into 9 classes.

TABLE 1

| Class | First layer: RE rich | Second layer: RE rich | Type |
|---|---|---|---|
| | | Quadrant I | |
| 1 | $T_{comp.}$ | $T_{comp.}$ | 1 |
| 2 | No $T_{comp.}$ | $T_{comp.}$ | 2 |
| 3 | $T_{comp.}$ | No $T_{comp.}$ | 3 |
| 4 | No $T_{comp.}$ | No $T_{comp.}$ | 4 |
| | | Quadrant II | |
| 5 | $T_{comp.}$ | No $T_{comp.}$ | 3 |
| 6. | No $T_{comp.}$ | No $T_{comp.}$ | 4 |
| | | Quadrant III | |
| 7 | No $T_{comp.}$ | No $T_{comp.}$ | 4 |
| | | Quadrant IV | |
| 8 | No $T_{comp.}$ | $T_{comp.}$ | 2 |
| 9 | No $T_{comp.}$ | No $T_{comp.}$ | 4 |

With the medium disclosed in detail in the specification of the prior application, it is difficult to provide an over write capable magnetooptical recording medium with a high C/N ratio without decreasing recording sensitivity.

SUMMARY OF THE INVENTION

It is an object of the present invention to provide an overwritable method of magnetooptical recording with a high C/N ratio without decreasing recording sensitivity.

A magnetooptical recording medium used in the present invention has a multilayered structure which comprises a first layer having a perpendicular magnetic anisotropy as a recording layer, and a second layer having a perpendicular magnetic anisotropy as a reference layer. when one of upward and downward directions with respect to a layer surface is defined as an "A direction" and the other is defined as a "non-A direction", only a magnetization of the second layer is aligned along the "A direction" by an initial field Hini. until immediately before recording. When a high-level laser beam is radiated, the "A-directed" magnetization of the second layer is reversed to the "non-A-directed" magnetization by a bias field Hb, and a bit having the "non-A-directed" magnetization (or "A-directed" magnetization) is formed in the first layer under the influence of the "non-A-directed" magnetization of the second layer. When a low-level laser beam is radiated, a bit having the "A-directed" magnetization (or the "non-A-directed" magnetization) is formed in the first layer under the influence of the "A-directed" magnetization of the second layer. The medium used in the present invention satisfies the following condition:

$$T_R<T_L<T_{C1}<T_H \leq T_{C2}$$

and satisfies the following four conditions at room temperature:

$$H_{C1}>H_{C2}+|H_{D1} \mp H_{D2}|$$

$$H_{C1}>H_{D1}$$

$$H_{C2}>H_{D2}$$

$$H_{C2}+H_{D2}<|Hini.|<H_{C1} \pm H_{D1}$$

where $T_R$: room temperature $T_{C1}$: Curie temperature of first layer $T_{C2}$: Curie temperature of second layer $T_L$: temperature of recording medium when low-level laser beam is radiated $T_H$: temperature of recording medium when high-level laser beam is radiated $H_{C1}$: coercivity of first layer $H_{C2}$: coercivity of second layer $H_{D1}$: coupling field applied to first layer $H_{D2}$: coupling field applied to second layer Hini.: initial field In general, when the Curie temperature $T_{C1}$ of the recording layer (first layer) is high, Kerr rotational angle θk becomes large, and C/N ratio is increased.

However, in the medium disclosed in detail in the specification of the prior application, since $T_{C1} \approx T_L$, if $T_{C1}$ is increased, $T_L$ must also be increased.

In this case, $T_H$ must be further increased in order to assure a margin for preventing generation of a high-temperature cycle ($T_H$) in a low-temperature cycle ($T_L$).

For this reason, it was found that when the high-level beam was radiated, the medium temperature could not be easily increased to $T_H$, and as a result, recording sensitivity was low.

Further studies revealed the following facts. That is, since information was recorded by bits having an "A-directed" magnetization and bits having a "non-A-directed" magnetization, when an over-write operation was performed, a new bit had to be formed ① when an already recorded bit was different from a bit to be newly recorded (formed); ② when the already recorded bit was the same as a bit to be newly recorded (formed), the already recorded bit could be left unchanged, resulting in no problem.

In the case of ①, the direction of the magnetization of the first layer is reversed by the over-write operation. A magnetization state of a bit before recording is shown in FIG. 12 in consideration of a state wherein the direction of the magnetization of the second layer is aligned along the "A direction" by the field Hini.

It was found that for a bit of either type, an interface wall was formed between the first and second layers in a state immediately before recording. This state accumulated an interface wall energy ($δ_w$: also called an exchange coupling force), and corresponded to a quasi-stable state. As described above, regardless of an external field, conditions for maintaining this state are the following two conditions given by:

$$H_{C1} > \frac{\delta_w}{2M_{S1}t_1} \quad \text{Formula 1}$$

$$H_{C2} > \frac{\delta_w}{2M_{S2}t_2} \quad \text{Formula 2}$$

These conditions are necessary conditions for the following reasons. When a medium is assumed to be a normal disk-like medium, a bit recorded in the first layer inevitably receives the field Hini. from an Hini. applying means in a recording apparatus during one revolution, and is in the above-mentioned quasistable state. In this case, it is wasteful if information in the first layer recorded with an effort is erased by the magnetization of the second layer or the magnetization of the second layer initialized by the field Hini. with an effort is disturbed by the information (magnetization) recorded in the first layer.

However, this state is the quasi-stable state, and the first layer is influenced by the magnetization of the second layer thorugh $δ_w$.

According to the further studies, it was found that when the temperature of the medium was increased from a room temperature $T_R$ (e.g., 10° to 45° C.) to a higher temperature (e.g., 75° C.), since the coercivity $H_{C1}$ of the first layer was decreased, the direction of the magnetization of the first layer was reversed to a stable state by the magnetization of the second layer. More specifically, it was found that when the temperature of the first layer was increased to $T_{C1}$, its magnetization could be reversed although it did not disappear.

In the present invention, this reversing temperature is represented by $T_L$, and a low-temperature cycle is executed while $T_L < T_{C1}$. The temperature $T_L$ is preferably set to be 75° C. or higher to have a margin of 35° C. from the normal room temperature $T_R$ (e.g., 10° to 45° C.) in favor of a safer operation.

$T_{C1}$ can be set to be high regardless of $T_L$, and the Kerr rotational angle θk can be increased, thus increasing the C/N ratio. However, since $T_L$ can be designed to be low regardless of $T_{C1}$, recording sensitivity can be improved.

The present inventors found that for particular media of Classes 1, 2, and 8 in which the second layer has a compensation temperature, when the first layer having a higher Curie temperature $T_{C1}$ than a compensation temperature $T_{comp.2}$ of the second layer was selected, a C/N ratio was satisfactorily high.

It is another object of the present invention to provide an overwritable method of magnetooptical recording in which a Curie temperature $T_{C1}$ of a first layer is higher than a compensation temperature $T_{comp.2}$ of the second layer.

The present inventors also found that a medium which could satisfy the following condition:

$$T_R < T_L < T_H \leq T_{C1} \leq T_{C2}$$

has a high C/N ratio, and its recording sensitivity is not low.

Therefore, an over write capable magnetooptical recording medium used in the present invention has a multilayered structure which comprises a first layer having a perpendicular magnetic anisotropy as a recording layer, and a second layer having a perpendicular magnetic anisotropy as a reference layer. When one of upward and downward directions with respect to a layer surface is defined as an "A direction" and the other is defined as a "non-A direction", only a magnetization of the second layer is aligned along the "A direction" by an initial field Hini. until immediately before recording. (1) When a high-level laser beam is radiated and a medium temperature is increased to a high temperature $T_H$, the magnetizations of the first and second layers are lost or weakened. Therefore, the magnetizations of both the layers obey the direction of a bias field Hb. As a result, when laser-beam radiation is stopped and the medium temperature is decreased to room temperature, the magnetization of the second layer is aligned along the "non-A direction", and a bit having the "non-A-directed" magnetization (or the "A-directed" magnetization) is formed in the first layer according to the type of medium. (2) When a low-level laser beam is radiated and the medium temperature is increased to a low temperature $T_L$ lower than the high temperature $T_H$, the magnetization of the first layer obeys that of the second layer although the first and second layers are still magnetized. As a result, when laser-beam radiation is stopped and the medium temperature is decreased to room temperature, the magnetization of the second layer is aligned along the "A direction", and a bit having the "A-directed" magnetization (or the "non-A-directed" magnetization) is formed in the first layer according to the type of medium. This medium satisfies:

$$T_R < T_L < T_H \leq T_{C1} \leq T_{C2}$$

In the present invention, a low-temperature cycle is performed as in FIG. 12. In contrast to this, a high-temperature cycle is performed as follows. More specifically, when the medium temperature is $T_H$, ① the magnetization of the first layer disappears, and a weak magnetization is left in the second layer, or ② a weak magnetization is left in both the first and second layers.

In the case of ①, a relation $H_{C2} < Hb$ is established, and for this reason, the magnetization of the second layer obeys the direction of Hb. When the bit falls outside a laser beam spot region and the medium temperature is slightly decreased from $T_H$, the magnetization having the same direction as that of the second magnetization appears in the first layer under the influence of the magnetization of the second layer and Hb.

In the case of ②, since $T_H$ is a relatively high temperature, the coercivities of the first and second layers are small, and one of the following relations (1) to (3) is satisifed:

$$|H_{C1} - H_{C2}| < \frac{\delta_w}{2M_{S1}t_1} + \frac{\delta_w}{2M_{S2}t_2} \quad (1)$$

and $$Hb > \frac{M_{S1}t_1 H_{C1} + M_{S2}t_2 H_{C2}}{M_{S1}t_1 + M_{S2}t_2}$$

$$Hb > H_{C1} + \frac{\delta_w}{2M_{S1}t_1} \quad (2)$$

and $$Hb > H_{C2} - \frac{\delta_w}{2M_{S2}t_2}$$

$$Hb > H_{C1} - \frac{\delta_w}{2M_{S1}t_1} \quad (3)$$

and $$Hb > H_{C2} + \frac{\delta_w}{2M_{S2}t_2}$$

For this reason, the magnetizations of both the layers are reversed at almost the same time, and, obey the direction of Hb.

In either of the cases ① and ②, when the medium temperature is returned to room temperature from this state, a bit having the "non-A-directed" magnetization (or the "A-directed" magnetization) is formed in the first layer according to the type of medium. The "non-A-directed" magnetization is present in the second layer corresponding to this bit, and no interface wall is present between the first and second layers.

BRIEF DESCRIPTION OF THE DRAWINGS

FIG. 4A is a diagram of a multilayered structure of a recording medium;

FIG. 4B is a diagram showing the direction of magnetization of a recording layer and a reference layer;

FIG. 5 is a graph showing the relationship between coercivity and temperature;

FIG. 6 illustrates changes in the direction of magnetization at high level;

FIG. 7 illustrates changes in the direction of magnetization at low level;

FIGS. 9A and 9B are views for explaining various magnetic fields;

FIG. 10 is a map wherein the types of media used in the present invention are classified into four quadrants;

FIGS. 14 and 15 are diagrams showing changes in the direction of magnetization in high- and low-temperature cycles of a medium No. 1-1;

FIG. 28 is a graph showing the relationship between the coercivity and the temperature for a medium No. 3;

FIGS. 29 and 30 are diagrams showing the changes in the direction of magnetization in high- and low-temperature cycles of the medium No. 3;

FIGS. 32 and 33 are diagrams showing the changes in the direction of magnetization in high- and low-temperature cycles of the medium No. 4-1;

FIGS. 35 and 36 are diagrams showing the changes in the direction of magnetization in high- and low-temperature cycles of the medium No. 4-2;

FIGS. 41 and 42 are diagrams showing the changes in the direction of magnetization in high- and low-temperature cycles of the medium No. 5-2;

FIG. 43 is a graph showing the relationship between the coercivity and the temperature for a medium No. 6;

FIGS. 44 and 45 are diagrams showing the changes in the direction of magnetization in high- and low-temperature cycles of the medium No. 6;

FIG. 52 is a graph showing the relationship between the coercivity and the temperature for a medium No. 8-1;

FIGS. 53 and 54 are diagrams showing the changes in the direction of magnetization in high- and low-temperature cycles of the medium No. 8-1;

FIG. 55 is a graph showing the relationship between the coercivity and the temperature for a medium No. 8-2;

FIG. 58 is a graph showing the relationship between the coercivity and the temperature for a medium No. 8-3;

FIGS. 59 and 60 are diagrams showing the changes in the direction of magnetization in high- and low-temperature cycles of the medium No. 8-3;

FIG. 61 is a graph showing the relationship between the coercivity and the temperature for a medium No. 9; and FIGS. 62 and 63 are diagrams showing the changes in the direction of magnetization in high- and low-temperature cycles of the medium No. 9;

PRINCIPLE OF THE OVER-WRITE OPERATION

The principle of the over-write operation will be described in detail below with reference to a specific medium belonging to Class 1 recording medium (P type, Quadrant I, type 1) shown in Table 1.

The medium No. 1-1 satisfies Formula 11-1:

$$T_R < T_{comp.1} < T_L < T_{C1} < T_H \leq T_{C2} \qquad \text{Formula 11-1}$$

Figure 1:
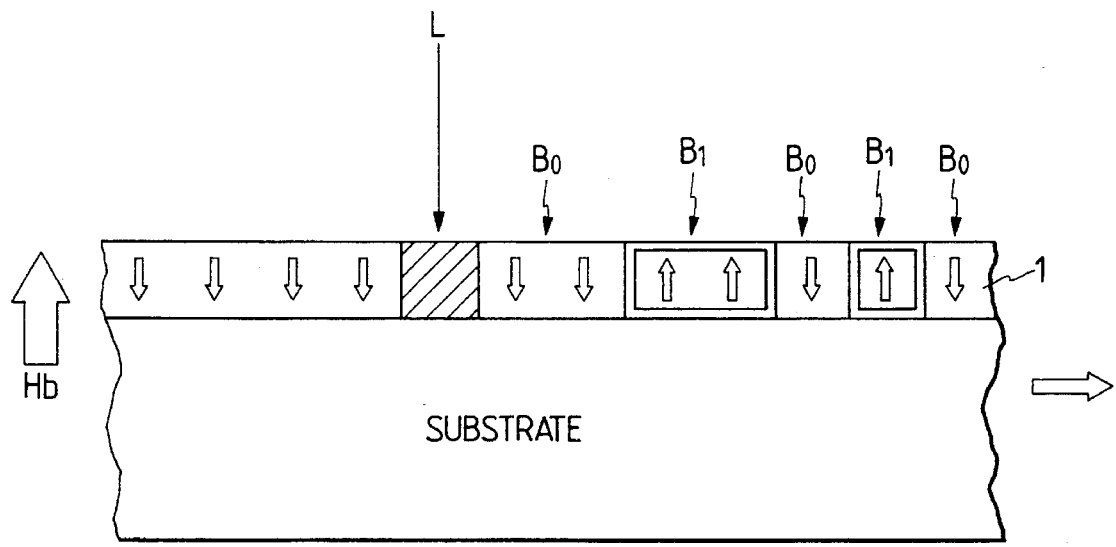
FIG. 1 is an illustration for explaining a recording principle of a magnetooptical recording method.
Figure 2:
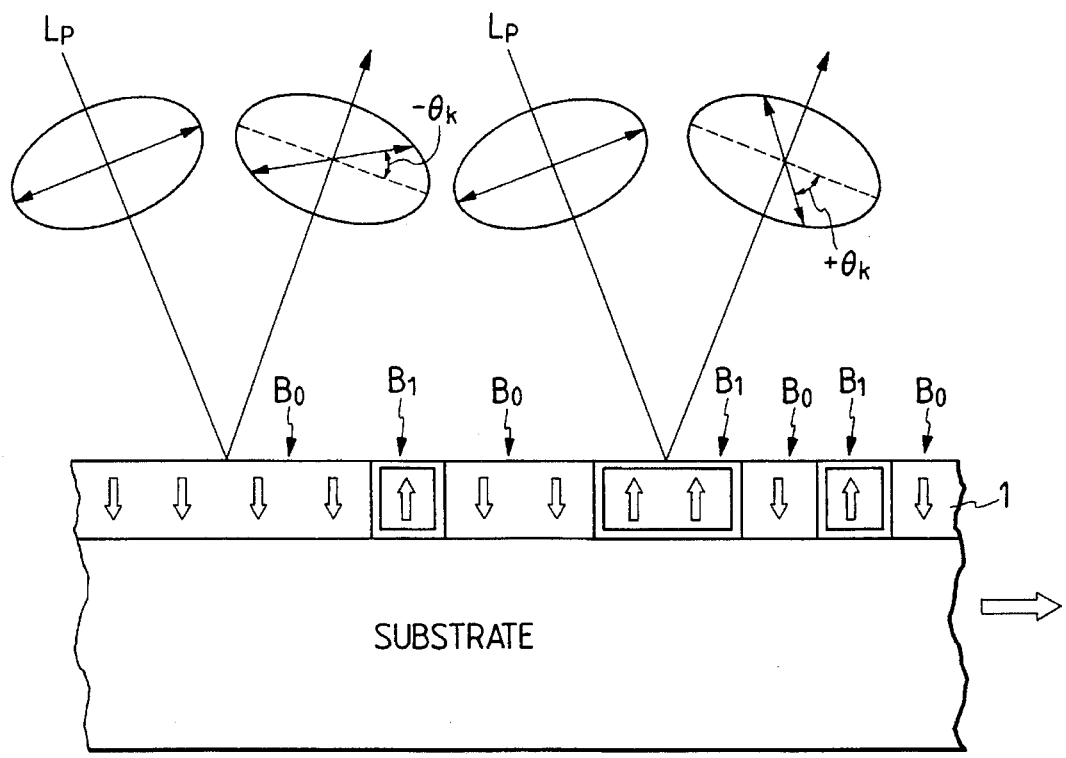
FIG. 2 is an illustration for explaining a reading principle of the magnetooptical recording method.
Figure 3A:
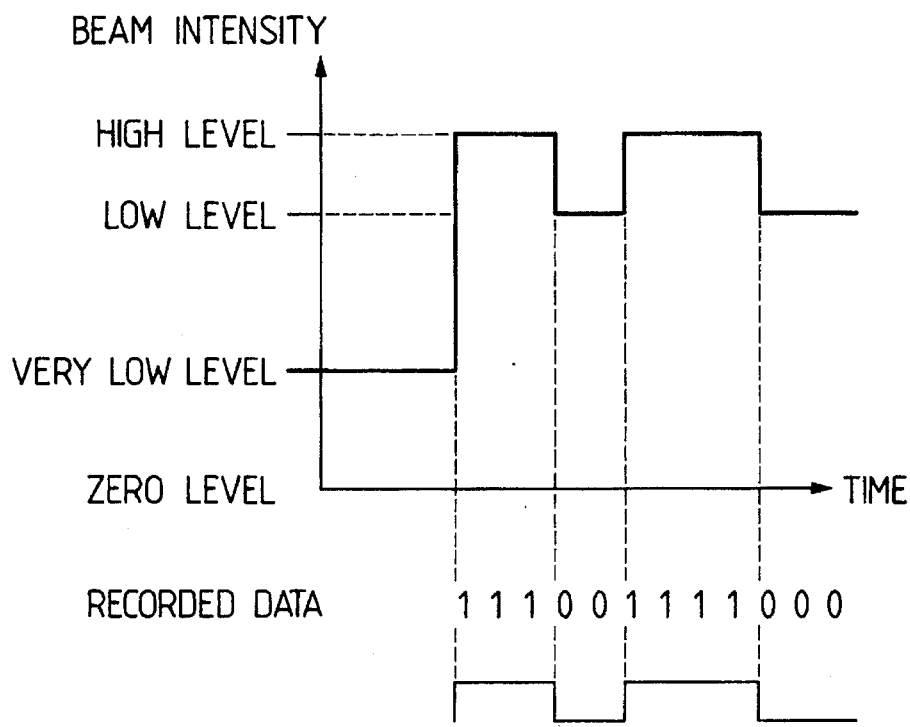
FIGS. 3A and 3B are timing charts showing laser beam intensities.
Figure 3B:
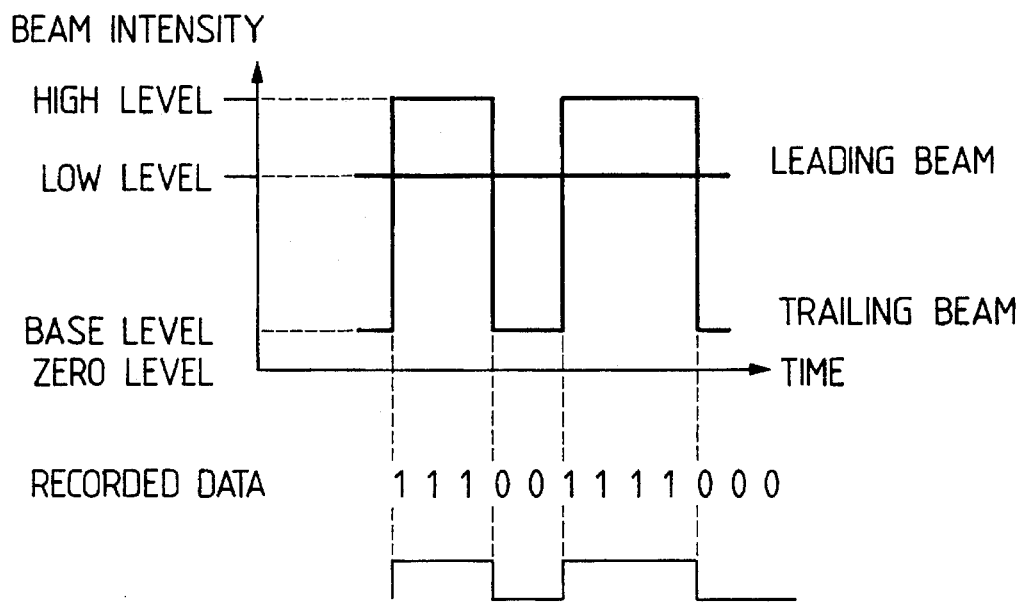
Figure 8:
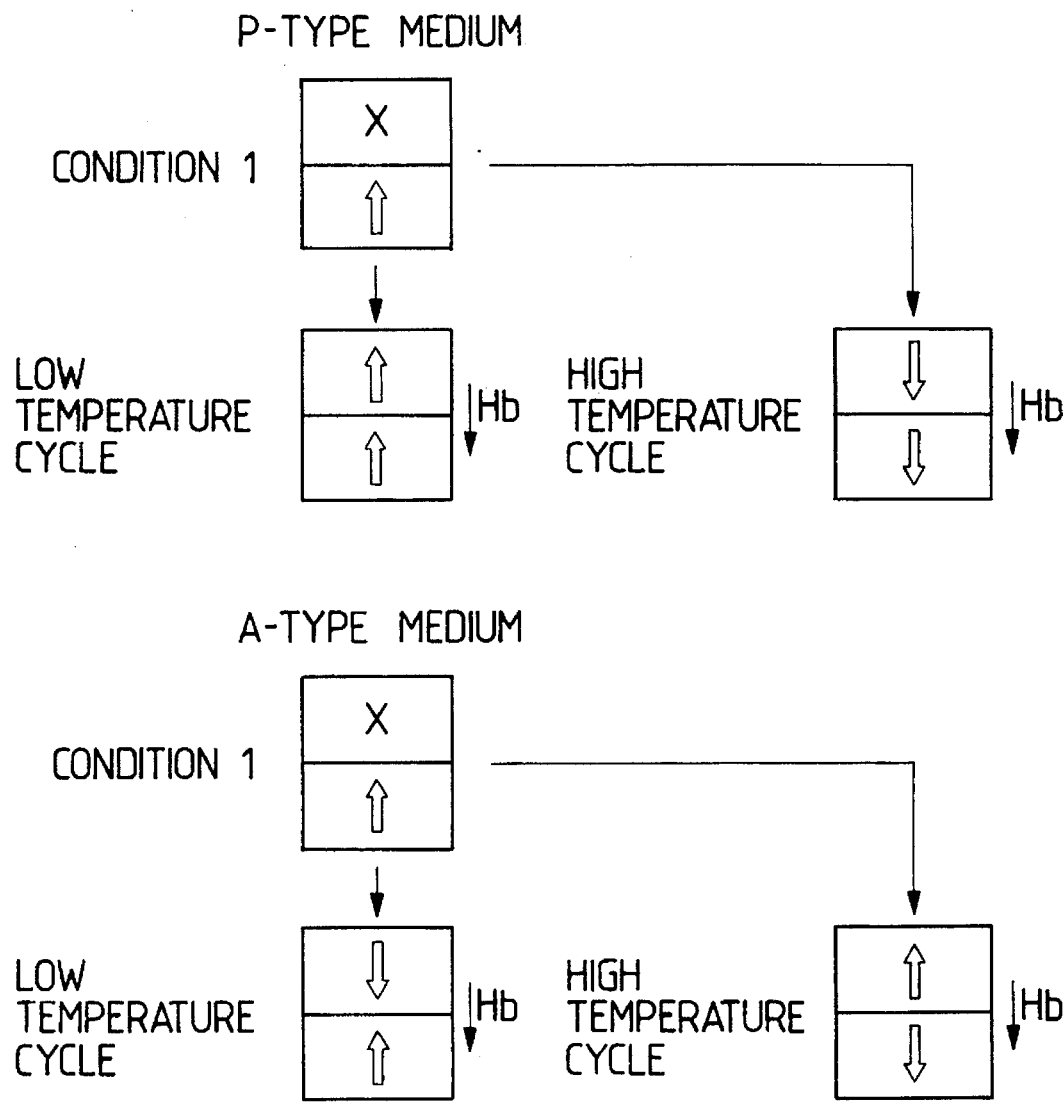
FIG. 8 illustrates flows of the changes in the direction of magnetization shown in FIGS. 5 and 6 for respective P- and A-type media.
Figure 11A:
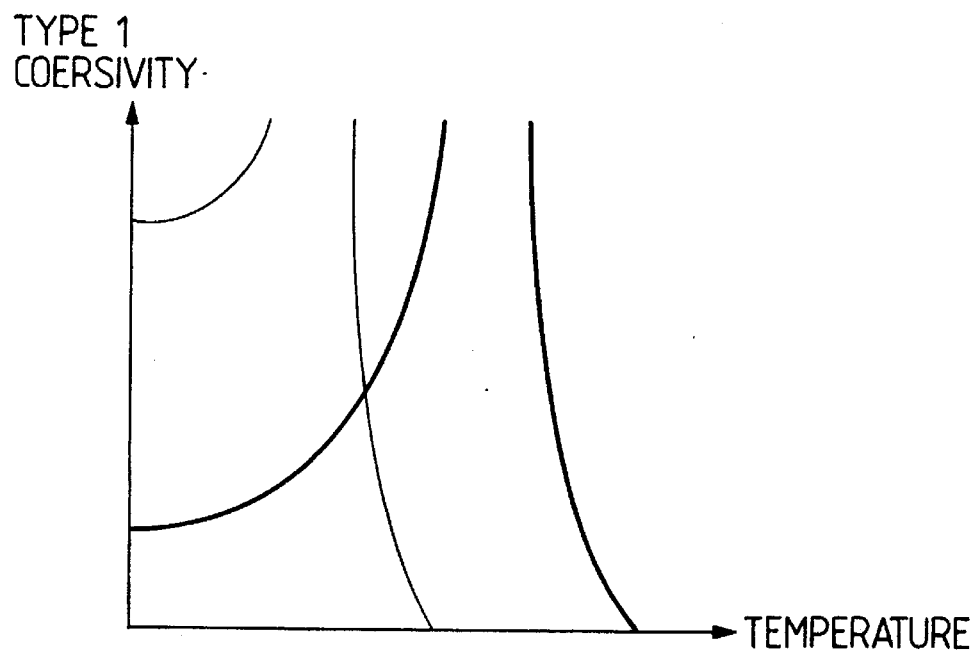
FIGS. 11A to 11D are graphs showing the relationship between the coercivity and the temperature respectively for media of Types I to IV.
Figure 11B:
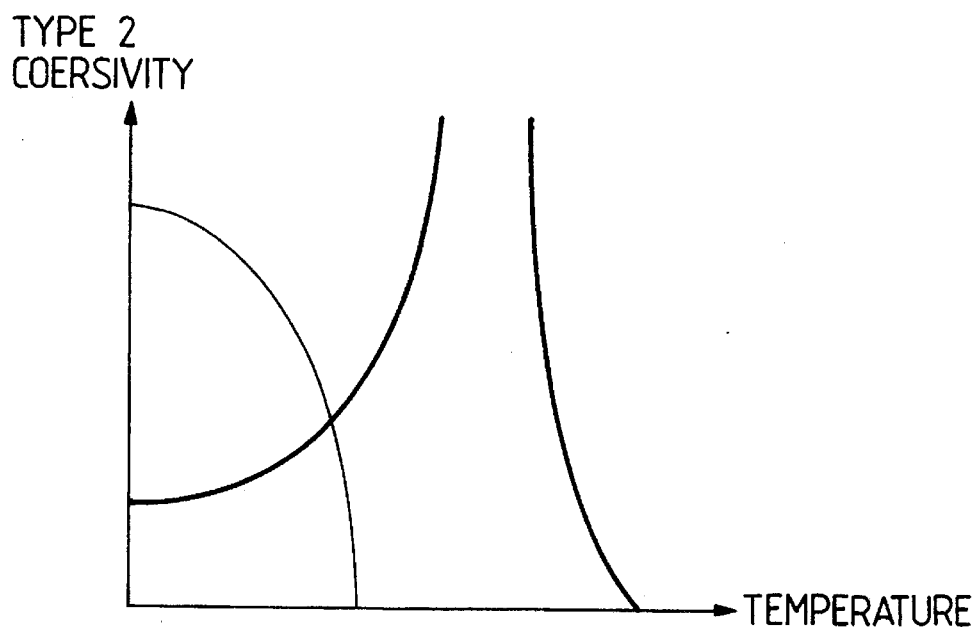
Figure 11C:
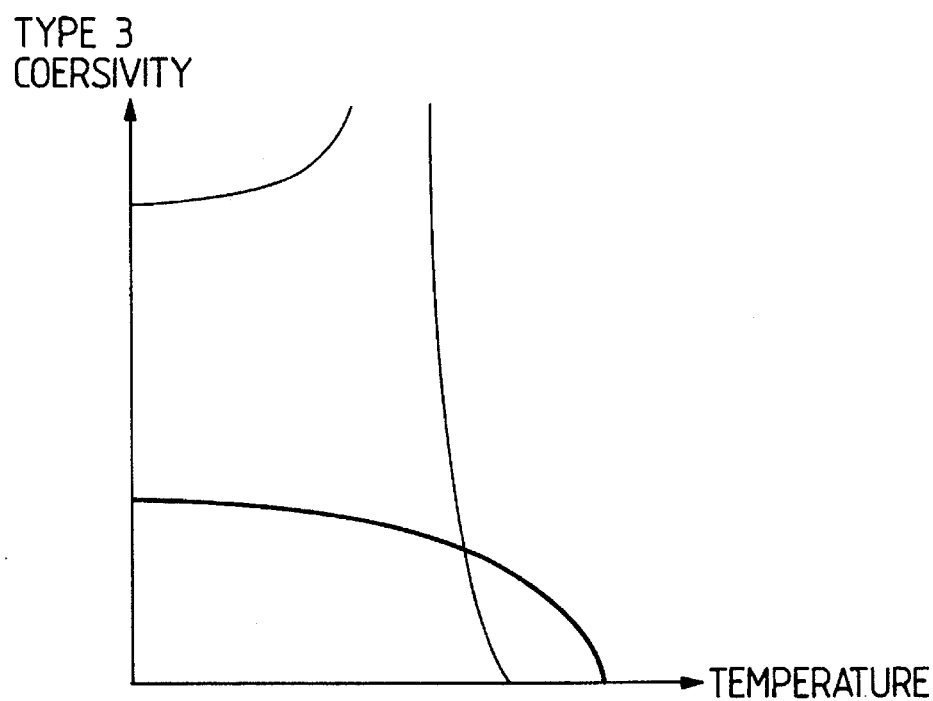
Figure 11D:
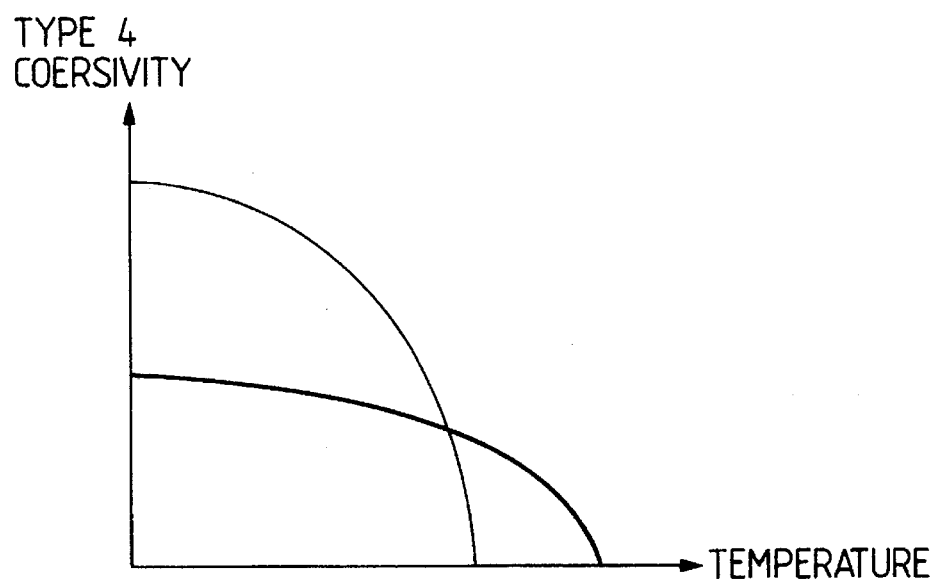
Figure 12:
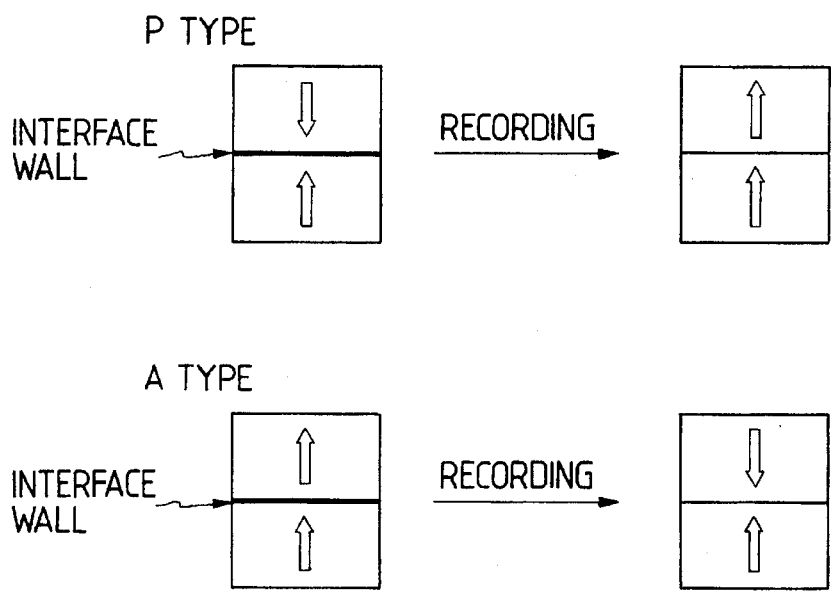
FIG. 12 shows reversal of a magnetization upon recording.
Figure 13:
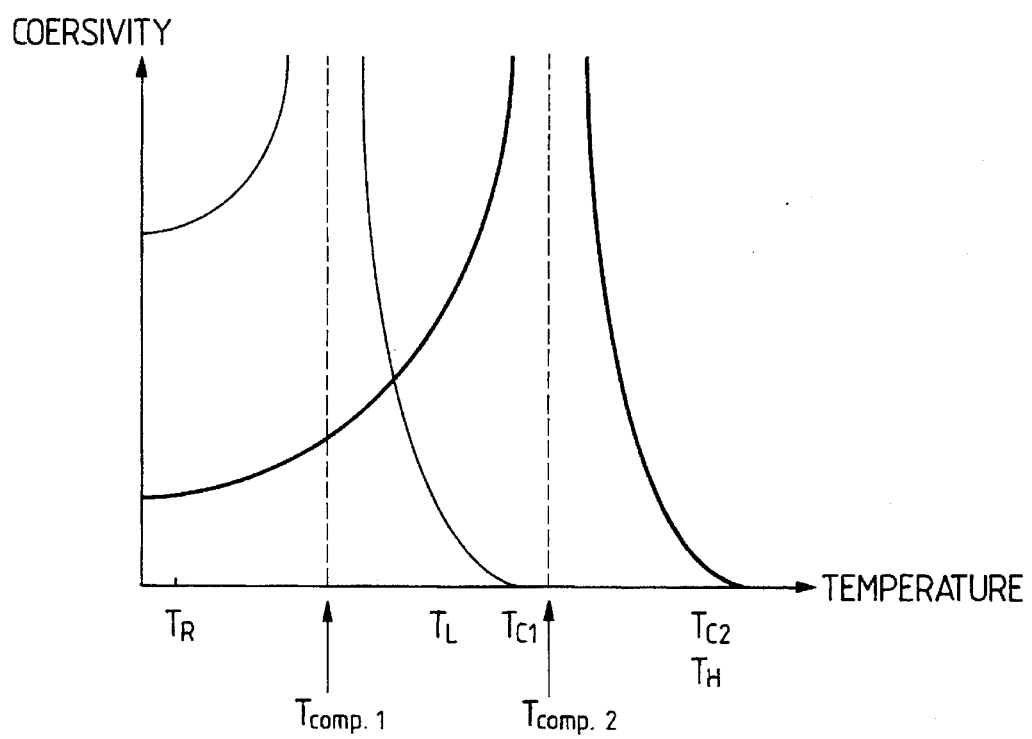
FIG. 13 is a graph showing the relationship between the coercivity and the temperature for a medium No. 1-1.

The condition of $T_{comp.2}$ is not particularly limited. However, the following description will be made under the condition of $T_L < T_{C1} < T_{comp.2}$. The graph of FIG. 13 shows this relation. Note that thin curves indicate the first layer, and bold curves indicate the second layer. Those identifications are the same in the following graphs.

A condition that reverses the direction of magnetization of the second layer without reversing that of the first layer by the initial field (Hini.) at the room temperature $T_R$ is represented by Formula 12. The medium No. 1-1 satisfies Formula 12 at the $T_R$.

$$H_{C1} > H_{C2} + (\sigma_w/2M_{S1}t_1) + (\sigma_w/2M_{S2}t_2) \qquad \text{Formula 12}$$

where $H_{C1}$: coercivity of first layer $H_{C2}$: coercivity of second layer $M_{S1}$: saturation magnetization of first layer $M_{S2}$: saturation magnetization of second layer $t_1$: film thickness of first layer $t_2$: film thickness of second layer $\delta_w$: interface wall energy (Exchange coupling force)

At this time, a condition for the Hini. is represented by Formula 15. If the Hini. disappears, reversed magnetization of the second layer is influenced by magnetization of the first layer due to an exchange coupling force. The condition that can hold the direction of magnetization of the second layer is represented by Formulas 13 and 14. The medium No. 1-1 satisfies Formulas 13 and 14.

$$H_{C1} > (\delta_w/2M_{S1}t_1) \qquad \text{Formula 13}$$

$$H_{C2} > (\delta_w/2M_{S2}t_2) \qquad \text{Formula 14}$$

$$H_{C2} + (\delta_w/2M_{S2}t_2) < |Hini.| < H_{C1} - (\delta_w/2M_{S1}t_1) \qquad \text{Formula 15}$$

The layer 2's magnetization of the recording medium which can satisfy Formulas 12 to 14 at the $T_R$ is aligned along the "A direction" model 1, in FIG. 9B by the Hini. which satisfies Formula 15. At this time, the recording layer 1 is maintained in the recorded state (Condition 1a or 1b in FIGS. 14 and 15).

Condition 1a or 1b is held to a point immediately before the recording. In this case, the bias field (Hb) is applied in the upward direction.

The high-temperature cycle will now be described with reference to FIG. 14.

High-Temperature Cycle

In Condition 1a or 1b, when the medium temperature increases and slightly exceeds the Curie temperature $T_{C1}$ of the first layer upon irradiation of the high-level laser beam, of magnetization of the first layer 1 disappears (Condition $2_H$).

When the laser-beam radiation further continues, the temperature of the medium increases accordingly. When the temperature of the medium slightly exceeds the temperature $T_{comp.2}$ of the second layer, the relationship between the strengths of the vectors is reversed (from the model 1 to the model 2, in FIG. 9B) although the directions of the RE and TM spins remain the same. For this reason, the direction of magnetization of the second layer is reversed to be along the "non-A direction" (Condition $3_H$).

However, since the coercivity $H_{C2}$ is still high at this temperature, the direction of magnetization of the second layer will not be reversed by the field Hb. When the temperature further increases and reaches the temperature $T_H$, the temperature of the second layer reaches near the Curie temperature $T_{C2}$, and magnetization of the second layer is reversed by the field Hb (Condition $4_H$).

In Condition $4_H$, when an irradiated portion is separated from the laser beam spot, the temperature of the medium begins to decrease. When the temperature of the medium decreases below the temperature $T_{comp.2}$, the relationship between the strengths of the vectors is reversed (from the model 3 to the model 4, in FIG. 9B) although the directions of the RE and TM spins remain the same. As a result, the direction of magnetization of the alloy as a whole is reversed from "A direction" to the "non-A direction" (Condition $5_H$).

In Condition $5_H$, since the temperature of the medium is higher than the temperature $T_{C1}$, magnetization of the first layer has not yet appeared. In addition, since the coercivity $H_{C2}$ at this temperature is high, the direction of magnetization of the second layer cannot be reversed by the field Hb.

When the temperature of the medium decreases and is slightly below the temperature $T_{C1}$, magnetization appears in the first layer. At this time, the interface wall energy from the second layer acts to align each of the RE and TM spins of the first and second layers. Since the temperature of the first layer is higher than the temperature $T_{comp.1}$, the TM spin is larger than the RE spin, and hence, magnetization of the model 3 of FIG. 9B appears in the first layer. This state is Condition $6_H$.

When the temperature of the medium is decreased from the temperature in Condition $6_H$ and is below the temperature $T_{comp.1}$, the relationships between the strengths of the RE and TM spins of first layer is reversed (from the model 3 to the model 4, in FIG. 9B). As a result, magnetization of "non-A direction" appears (Condition $7_H$).

Then, the temperature of the medium decreases from the temperature in Condition $7_H$ to the room temperature. Since the coercivity $H_{C1}$ at the room temperature is sufficiently high, Condition $7_H$ is maintained without reversing the direction of magnetization of the first layer by the field Hb. In this way, bit formation in the "non-A direction" is completed.

Next, the low-temperature cycle will be described with reference to FIG. 15.

Low-Temperature Cycle

In Conditions 1a or 1b immediately before recording, the medium temperature is increased to $T_{comp.1}$ upon irradiation of the low-level laser beam. The relationship between the strength of the vectors in reversed although the directions of the RE and TM spins of the first layer remain the same. As a result, the magnetization of the first layer is reversed (Condition 1a→Condition $2_{La}$, Condition 1b→Condition $2_{Lb}$). In this Condition, the A type medium is temporarily formed.

When the temperature is further increased from this state and reaches $T_L$, the following relation is established:

$$H_{C1} + Hb < \frac{\delta_w}{2M_{S1}t_1}$$

and, Condition $2_{La}$ changes to Condition $3_L$. On the other hand, since Condition $2_{Lb}$ is maintained, the same Condition $3_L$ as Condition $2_{Lb}$ is set.

In Condition $2_L$, when an irradiated portion is separated from the laser beam spot, the medium temperature begins to fall. When the medium temperature is below the temperature $T_{comp.1}$, the relationship between the strengths of the vectors of the RE and TM spins of the first layer is reversed (from the model 2 to the model 1, in FIG. 9B). As a result, magnetization of the first layer is "A direction" (Condition $4_L$). In this condition, the medium returns to P type.

Condition $4_L$ is maintained even if the medium temperature is decreased to the room temperature. In this way, bit formation in the "A direction" is completed.

Next, the principle, of the over-write operation will be described in detail below with reference to a specific medium belonging to Class 1 recording medium (P type, Quadrant I, type 1) shown in Table 1.

The medium No. 1-2 satisfies Formulas 11-1 and 11-2

$$T_{comp.2} < T_{C1} \quad \text{Formula 11-2}$$

Figure 16:
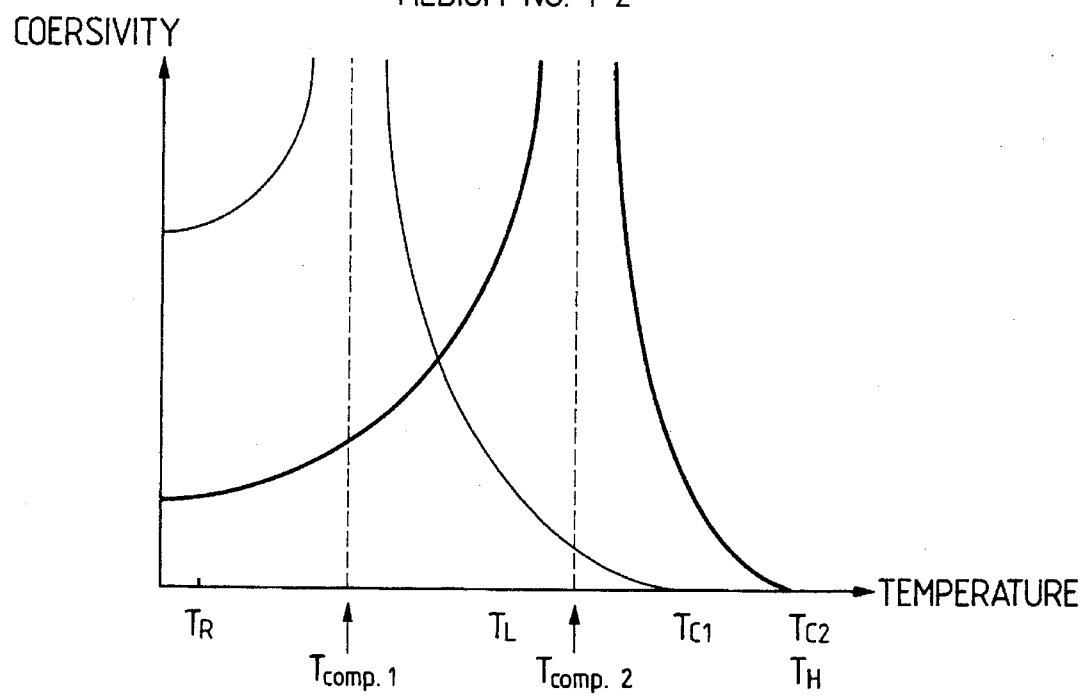
FIG. 16 is a graph showing the relationship between the coercivity and the temperature for the medium No. 1-2.

In the following description, $T_L < T_{comp.2}$. The graph of FIG. 16 shows this relation.

A condition that reverses the direction of magnetization of the second layer without reversing that of the first layer by the initial field (Hini.) at the room temperature $T_R$ is represented by Formula 12. The medium No. 1-2 satisfies Formula 12 at the $T_R$.

At this time, a condition for the Hini. is represented by Formula 15. If the Hini. disappears, reversed magnetization of the first and second layers are influenced by each other due to the interface wall energy. The condition that can hold the direction of magnetization of the second layer is represented by Formulas 13 and 14. The medium No. 1-2 satisfies Formulas 13 and 14.

The layer 2's magnetization of the recording medium which can satisfy Formulas 12 to 14 at the $T_R$ is aligned along the "A direction" (model 1 in FIG. 9B) by the Hini. which satisfies Formula 15. At this time, the recording layer 1 is maintained in the recorded state (Condition 1a or 1b in FIGS. 17 and 18).

Condition 1a or 1b is held to a point immediately before the recording.

Note that the bias field Hb is difficult to focus on an identical range to a radiation region (spot region) of a laser beam like a general magnetic field. When a medium is a disk-like medium, once recorded information (bit) is influenced by the field Hini. during one revolution of the medium, and is in Conditions 1a and 1b. The bit passes by a track next to a radiation region (spot region) of the laser beam during the next revolution of the medium. In this case, the bit in Conditions 1a and 1b is influenced by the bias field Hb. If the direction of the magnetization of the first layer of the bit in Condition 1a having the direction of magnetization opposite to that of Hb is reversed by Hb, information recorded one revolution before the current revolution is lost. A condition for preventing this is given by:

$$H_{C1} > Hb + \frac{\delta_w}{2M_{S1}t_1} \quad \text{Formula 15-2}$$

The disk-like medium must satisfy this formula at room temperature. In other words, one condition for determining Hb is expressed by Formula 15-2.

The-bit in Conditions 1a and 1b then reaches the spot region of the laser beam.

Figure 18:
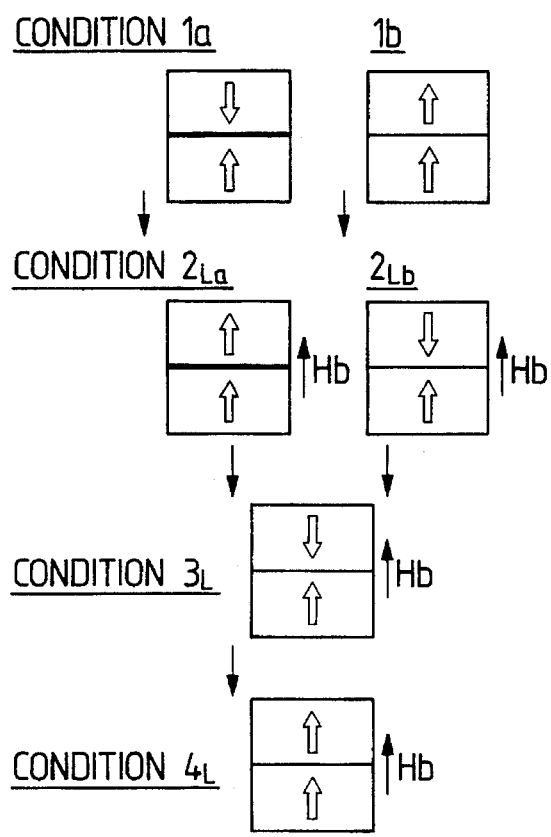

A low-temperature cycle is shown in FIG. 18. However, this cycle is the same as that shown in FIG. 15, and a description thereof will be omitted.

Figure 17:
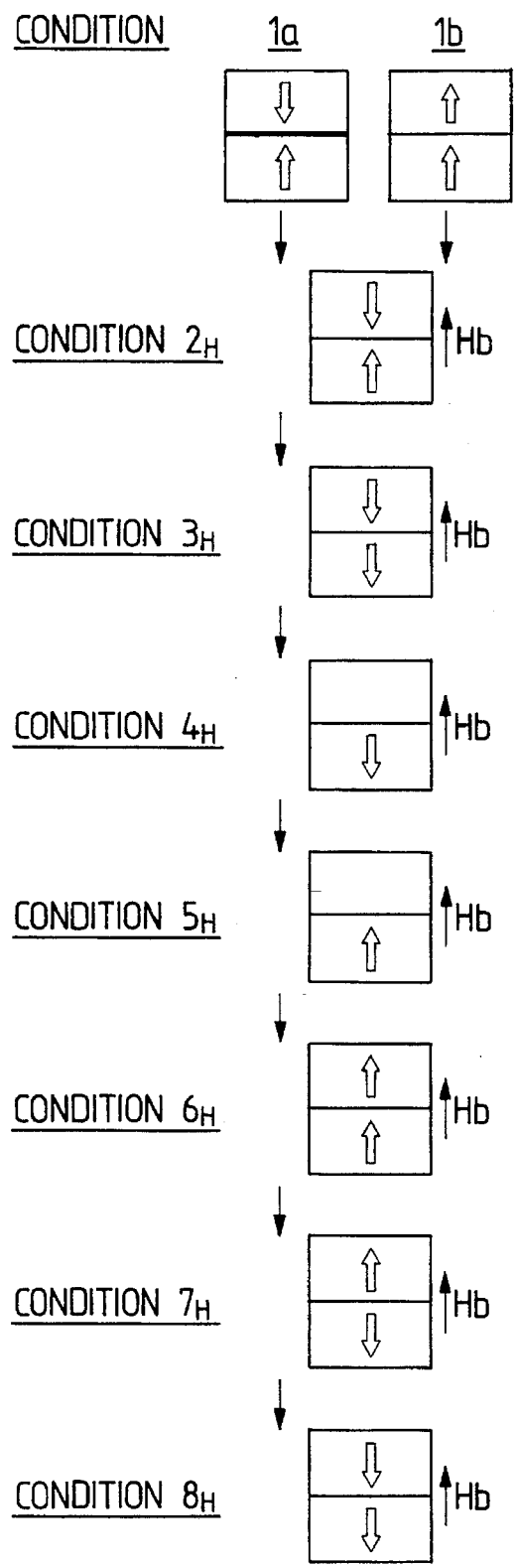
FIGS. 17 and 18 are diagrams showing the changes in the direction of magnetization in high- and low-temperature cycles of a medium No. 1-2.

The high-temperature cycle will now be described with reference to FIG. 17.

High-temperature Cycle

When the medium temperature is increased to $T_L$ via $T_{comp.1}$ upon irradiation of the high-level laser beam, Condition 1a or 1b changes into Condition $2_H$.

When the laser-beam radiation further continues, the temperature of the medium increases accordingly. When the temperature of the medium slightly exceeds the temperature $T_{comp.2}$ of the second layer, the relationship between the strengths of the vectors is reversed (from the model 1 to the model 2) although the directions of the RE and TM spins remain the same. For this reason, the direction of magnetization of the second layer is reversed to be along the "non-A direction" (Conditions $3_H$).

However, since the coercivity $H_{C2}$ is still high at this temperature, the direction of magnetization of the second layer will not be reversed by the field Hb.

When the temperature further increases and reaches $T_{C1}$, magnetization of the first layer disappears (Condition $4_H$). When the temperature further increases and reaches the temperature $T_H$, the temperature of the second layer approaches to the Curie temperature $T_{C2}$, and magnetization of the second layer is reversed by the field Hb (Condition $5_H$).

In Condition $5_H$, when an irradiated portion is separated from the laser beam spot, the temperature of the medium begins to decrease.

when the temperature of the medium decreases and is slightly below the temperature $T_{C1}$, magnetization appears in the first layer. At this time, the interface wall energy from the second layer acts to align each of the RE and TM spins of the first and second layers. Since the temperature of the first layer is higher than the temperature $T_{comp.1}$, the TM spin is larger than the RE spin, and hence, magnetization of the model 3 of FIG. 9B appears in the first layer. This state is Condition $6_H$.

When the temperature of the medium decreases below the temperature $T_{comp.2}$, the relationship between the strengths of the vectors is reversed (from the model 3 to the model 4) although the directions of the RE and TM spins remain the same. As a result, the direction of magnetization of the alloy as a whole is reversed from the "A direction" to the "non-A direction" (Condition $7_H$).

When the temperature of the medium is decreased from the temperature in Condition $7_H$ and is below the temperature $T_{comp.1}$, the relationships between the strengths of the RE and TM spins of first layer is reversed (from the model 3 to the model 4). As a result, magnetization of the "non-A direction" appears (Condition $8_H$).

Then, the temperature of the medium decreases from the temperature in Condition $8_H$ to the room temperature. Since the coercivity $H_{C1}$ at the room temperature is sufficiently high (referring to Formula 15-3), Condition $8_H$ is maintained without reversing the direction of magnetization of the first layer by the field Hb. In this way, bit formation in the "non-A direction" is completed.

$$Hb < H_{C1} + \frac{\delta_w}{2M_{S1}t_1} \quad \text{Formula 15-3}$$

Next, the principle of the over-write operation will be described in detail below with reference to a specific medium belonging to Class 1 recording medium (P type, Quadrant I, type 1) shown in Table 1.
The medium No. 1-3 satisfies Formulas 11-2 and 11-3

$$T_R < T_{comp.1} < T_L < T_H \leq T_{C1} \leq T_{C2} \quad \text{Formula 11-3}$$

Figure 19:
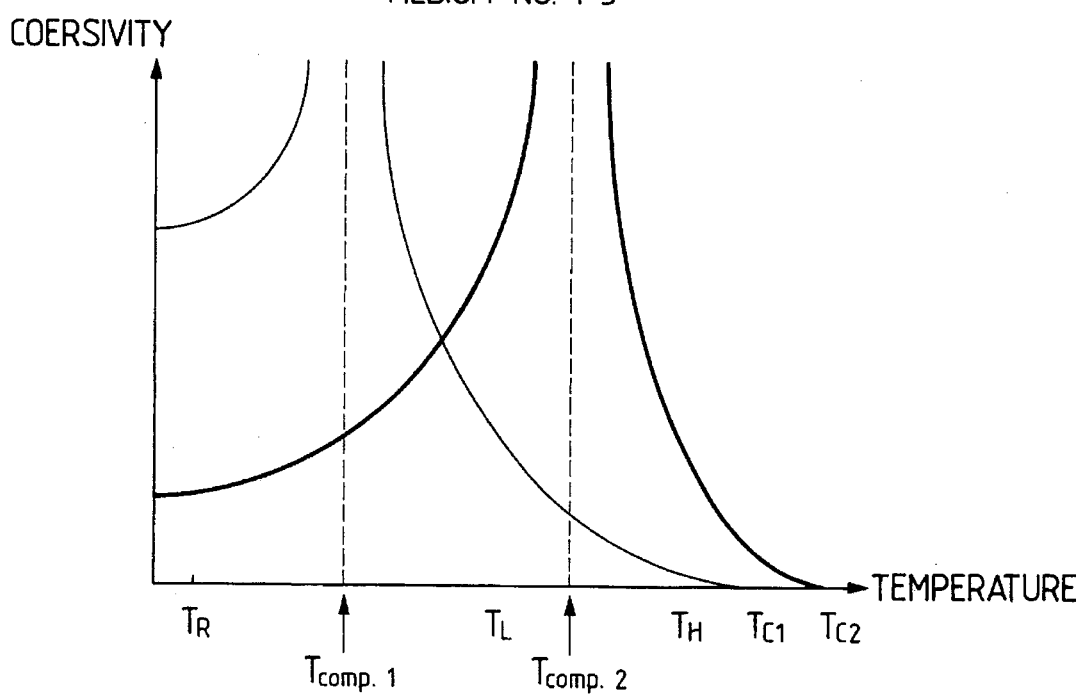
FIG. 19 is a graph showing the relationship between the coercivity and the temperature for a medium No. 1-3.

For the sake of simplicity the following description will be given under the conditions of $T_H < T_{C1} < T_{C2}$ and $T_L < T_{comp.2}$. The graph of FIG. 19 shows this relation.

A condition that reverses the direction of magnetization of the second layer without reversing that of the first layer by the initial field (Hini.) at the room-temperature $T_R$ is represented by Formula 12. The medium No. 1-3 satisfies Formula 12 at the $T_R$.

At this time, a condition for the Hini. is represented by Formula 15. If the Hini. disappears, reversed magnetization of the first and second layers are influenced by each other due to the interface wall energy. The condition that can hold the direction of magnetization of the second layer is represented by Formulas 13 and 14. The medium No. 1-3 satisfies Formulas 13 and 14.

The layer 2's magnetization of the recording medium which can satisfy Formulas 12 to 14 at the $T_R$ is aligned along the "A direction" by the Hini. which satisfies Formula 15. At this time, the recording layer 1 is maintained in the recorded state (Condition 1a and 1b in FIGS. 20 and 21).

Figure 21:
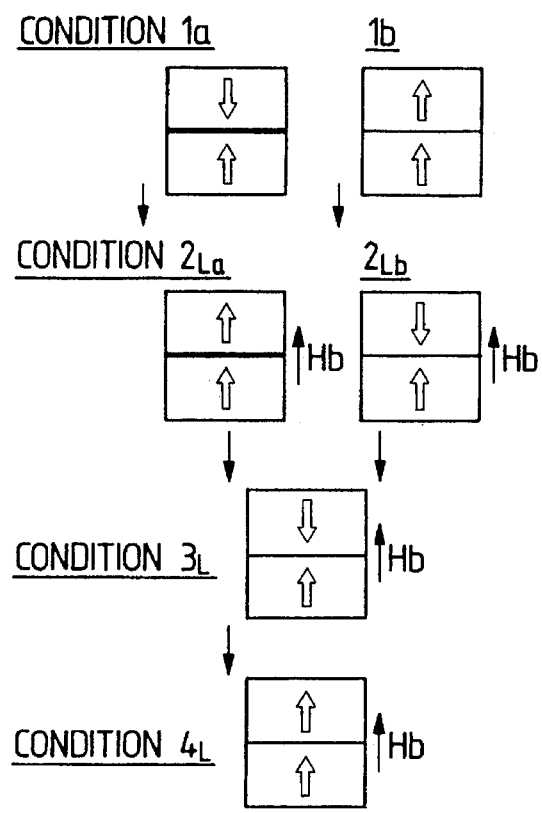

The low-temperature cycle is shown in FIG. 21. However, this cycle is the same as that of the medium No. 1-2, and a detailed description thereof will be omitted.

Figure 20:
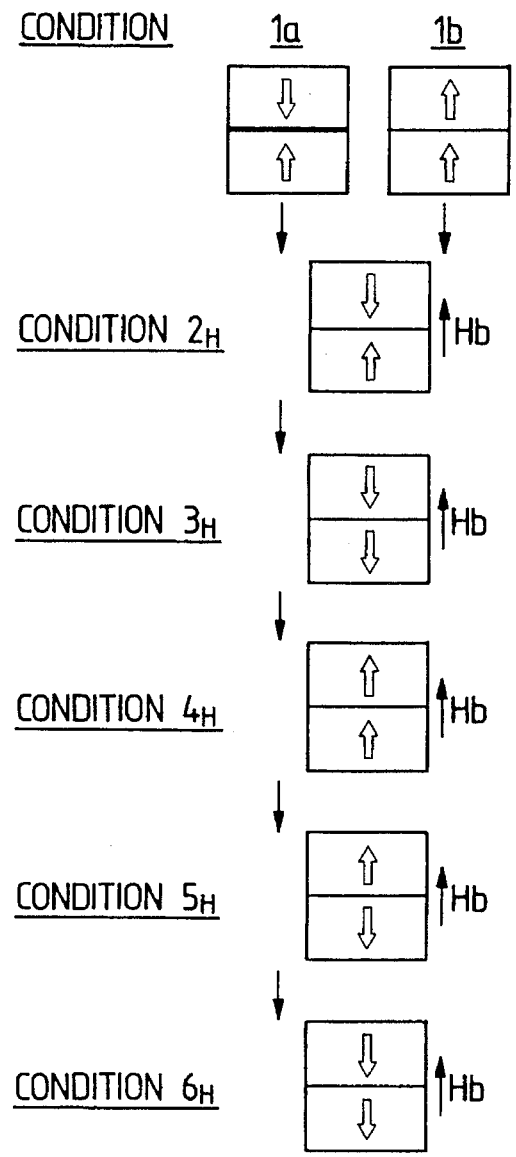
FIGS. 20 and 21 are diagrams showing the changes in the direction of magnetization in high- and low-temperature cycles of the medium No. 1-3.

The high-temperature cycle will now be described with reference to FIG. 20.

High-Temperature Cycle

When the medium temperature is increased to $T_L$ via $T_{comp.1}$ upon irradiation of the high-level laser beam, Condition 1a or 1b changes into Condition $2_H$.

When the laser-beam radiation further continues, the temperature of the medium increases accordingly. When the temperature of the medium slightly exceeds the temperature $T_{comp.2}$ of the second layer, the medium changes from A type to P type and the relationship between the strengths of the vectors is reversed (from the model 1 to the model 2) although the directions of the RE and TM spins remain the same. For this reason, the direction of magnetization of the second layer is reversed to be along the "non-A direction" (Condition $3_H$). However, since the coercivity $H_{C2}$ is still high at this temperature, the direction of magnetization of the second layer will not be reversed by the field Hb (see Condition 3H). When the temperature further increases and reaches the temperature $T_H$, the temperature of the first and second layers substantially corresponds to the Curie temperature, and the coercivities decrease.

As a result, the medium satisfies one of the following relations (1) to (3):

$$|H_{C1} - H_{C2}| < \frac{\delta_w}{2M_{S1}t_1} + \frac{\delta_w}{2M_{S2}t_2} \qquad (1)$$

and $$Hb > \frac{M_{S1}t_1 H_{C1} + M_{S2}t_2 H_{C2}}{M_{S1}t_1 + M_{S2}t_2}$$

$$Hb > H_{C1} + \frac{\delta_w}{2M_{S1}t_1} \qquad (2)$$

and $$Hb > H_{C2} - \frac{\delta_w}{2M_{S2}t_2}$$

$$Hb > H_{C1} - \frac{\delta_w}{2M_{S1}t_1} \qquad (3)$$

and $$Hb > H_{C2} + \frac{\delta_w}{2M_{S2}t_2}$$

For this reason, the magnetizations of both the layers are reversed at almost the same time, and obey the direction of Hb. This state is Condition $4_H$.

In Condition $4_H$, when an irradiated portion is separated from the laser beam spot, the temperature of the medium begins to decrease. When the temperature of the medium decreases below the temperature $T_{comp.2}$, the medium changes from P type to A type and the relationship between the strengths of the vectors is reversed from the model 3 to the model 4. As a result, the direction of magnetization of the second layer is reversed from the "A direction" to the "non-A direction" (Condition $5_H$).

When the temperature of the medium further decreases below $T_{comp.1}$, the medium returns from A type to P type and the relationship between the strengths of the vectors is reversed from the model 3 to the model 4. As a result, the direction of magnetization of the first layer is reversed from the "A direction" to the "non-A direction" (Condition $6_H$).

Then, the temperature of the medium decreases from the temperature in Condition $6_H$ to the room temperature. Since the coercivity $H_{C1}$ at the room temperature is sufficiently high, Condition $6_H$ is maintained without reversing the direction of magnetization of the first layer by the field Hb. In this way, bit formation in the "non-A direction" is completed.

Next, the principle of the method of the prior application invention will be described in detail using a specific medium No. 2-1 belonging to Class 2 (P type, Quadrant I, Type 2) shown in Table 1, and the principle of the method of the present invention will be described in detail using a specific medium No. 2-1.

The medium No. 2-1 satisfies Formula 16

$$T_R < T_L < T_{C1} < T_H \leq T_{C2} \qquad \text{Formula 16}$$

Figure 22:
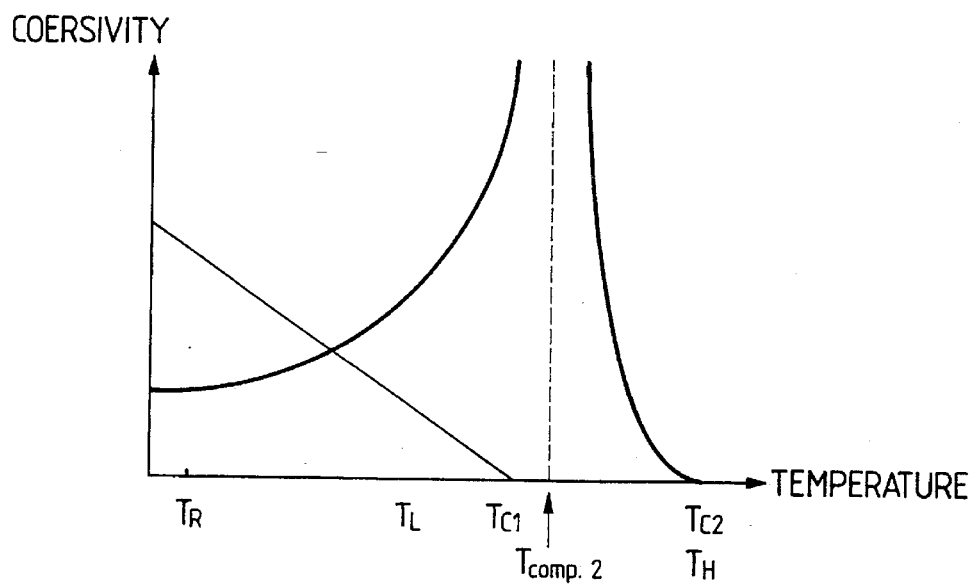
FIG. 22 is a graph showing the relationship beteen the coercivity and the temperature for a medium No. 2-1.

For $T_{comp.2}$, the following description will be given under the condition of $T_L < T_{C1} < T_{comp.2}$. The graph of the FIG. 22 shows this relation.

A condition that reverses the direction of magnetization of the second layer without reversing that of the first layer by the initial field (Hini.) at the room temperature $T_R$ is represented by Formula 17. The medium No. 2-1 satisfies Formula 17 at the $T_R$:

$$H_{C1} > H_{C2} + (\delta_w/2M_{S1}t_1) + (\delta_w/2M_{S2}t_2) \qquad \text{Formula 17}$$

At this time, a condition for the Hini. is represented by Formula 20. If the Hini. disappears, reversed magnetization of the second layer is influenced by magnetization of the first layer due to the interface wall energy. The condition that can hold the direction of magnetization of the second layer is represented by Formulas 18 and 19. The medium No. 2-1 satisfies Formulas 18 and 19.

$$H_{C1} > (\delta_w/2M_{S1}t_1) \qquad \text{Formula 18}$$

$$H_{C2} > (\delta_w/2M_{S2}t_2) \qquad \text{Formula 19}$$

$$H_{C2} + (\delta_w/2M_{S2}t_2) < |Hini.| < H_{C1} - (\delta_w/2M_{S1}t_1) \qquad \text{Formula 20}$$

The second layer's magnetization of the recording medium which can satisfy Formulas 17 to 19 at the $T_R$ is aligned along the "A direction" (model 1, in FIG. 9B) by the Hini. which satisfies Formula 20. At this time, the first layer is maintained in the recorded state (Condition 1a or 1b in FIGS. 23 and 24).

Condition 1a or 1b is held to a point immediately before the recording.

Figure 23:
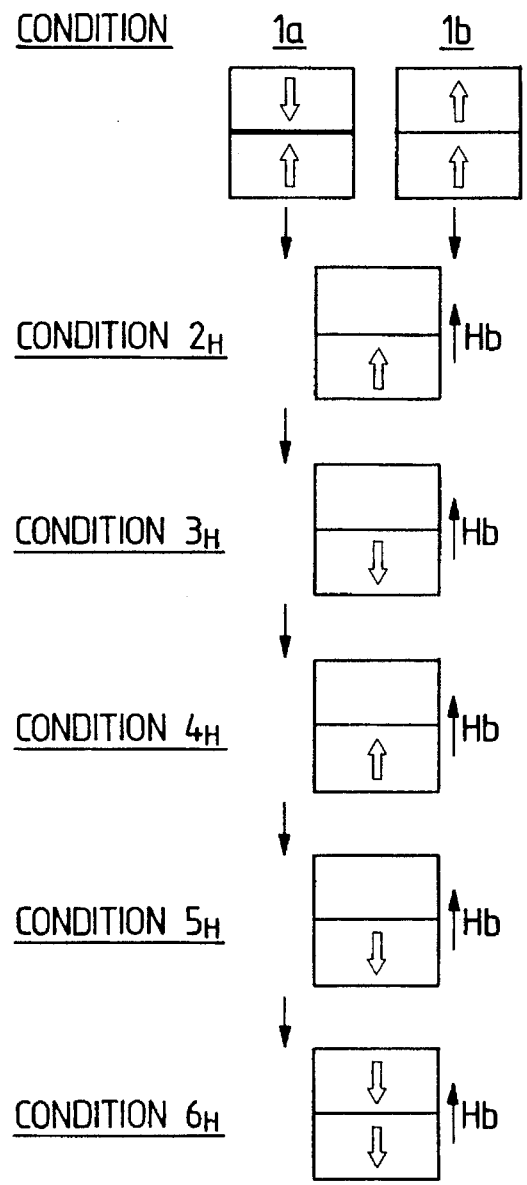
FIGS. 23 and 24 are diagrams showing the changes in the direction of magnetization in high- and low-temperature Cycles of the medium No. 2-1.

The high-temperature cycle will now be described with reference to FIG. 23.

High-temperature Cycle

In Condition 1, when the medium temperature increases slightly above the Curie temperature $T_{C1}$ of the first layer, magnetization of the first layer disappears (Condition $2_H$).

When the laser-beam radiation further continues, the temperature of the medium increases accordingly. When the temperature of the medium slightly exceeds the temperature $T_{comp.2}$ of the second layer, the relationship between the strengths of the vectors is reversed (from the model 1 to the model 2, in FIG. 9B) although the directions of the RE and TM spins remain the same. For this reason, the direction of magnetization of the second layer is reversed to the "non-A direction" (Condition $3_H$).

However, since the coercivity $H_{C2}$ is still high at this temperature, the direction of magnetization of the second layer will not be reversed by the field Hb. When the temperature further increases and reaches the temperature $T_H$, the temperature of the second layer reaches near the Curie temperature $T_{C2}$, the coercivity $H_{C2}$ decreases, and magnetization of the second layer reverses by the field Hb (Condition $4_H$).

In Condition $4_H$, when an irradiated portion is separated from the laser beam spot, the temperature of the medium begins to decrease.

When the temperature of the medium decreases below the temperature $T_{comp.2}$, the relationship between the strengths of the vectors is reversed from the model 3 to the model 4 although the directions of the RE and TM spins remain the same. As a result, the direction of magnetization of the alloy as a whole is reversed from "A direction" to the "non-A direction" (Condition $5_H$).

In Condition $5_H$, since the temperature of the medium is higher than the temperature $T_{C1}$, magnetization of the first layer has not yet appeared. In addition, since the coercivity $H_{C2}$ at this temperature is high, the direction of magnetization of the second layer cannot be reversed by the field Hb.

When the temperature of the medium decreases and is slightly below the temperature $T_{C1}$, magnetization appears in the first layer. At this time, the exchange coupling force from the second layer acts to align each of the RE and TM spins of the first and second layers. Thus, magnetization of "non-A direction" appears in the first layer. This state is Condition $6_H$.

Then, the temperature of the medium decreases from the temperature in Condition $6_H$ to the room temperature. Since the coercivity $H_{C1}$ at the room temperature is sufficiently high, Condition $6_H$ is maintained without reversing the direction of magnetization of the first layer by the field Hb. In this way, bit formation in the "non-A direction" is completed.

Figure 24:
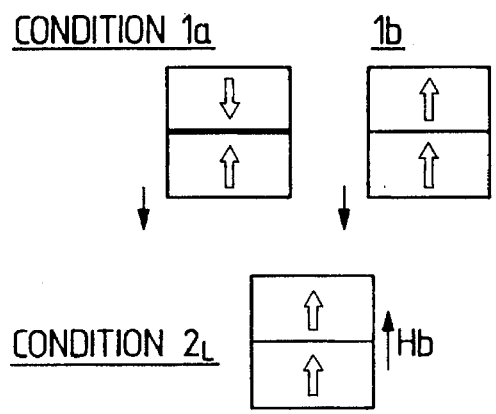

Next, the low-temperature cycle will be described with reference to FIG. 24.

Low-Temperature Cycle

In Condition 1 immediately before recording, the medium temperature is increased to $T_L$ upon irradiation of the low-level laser beam. Thus, the following relation is established:

$$H_{C1} + Hb < \frac{\delta_w}{2M_{S1}t_1}$$

and, Condition 1a changes to Condition $2_L$. On the other hand, since Condition 1b is maintained, the same Condition $2_L$ is set.

Condition $2_L$ is maintained even if the medium temperature is decreased to the room temperature. As a result, a bit in the "A direction" is formed in the first layer.

Next, the principle of the method of the prior application invention will be described in detail using a specific medium No. 2-2 belonging to Class 2 (P type, Quadrant I, Type 2) shown in Table 1, and the principle of the method of the present invention will be described in detail using a specific medium No. 2-2.

The medium No. 2-2 satisfies Formulas 16 and 11-2

$T_R < T_L < T_{C1} < T_H \leq T_{C2}$  Formula 16

Figure 25:
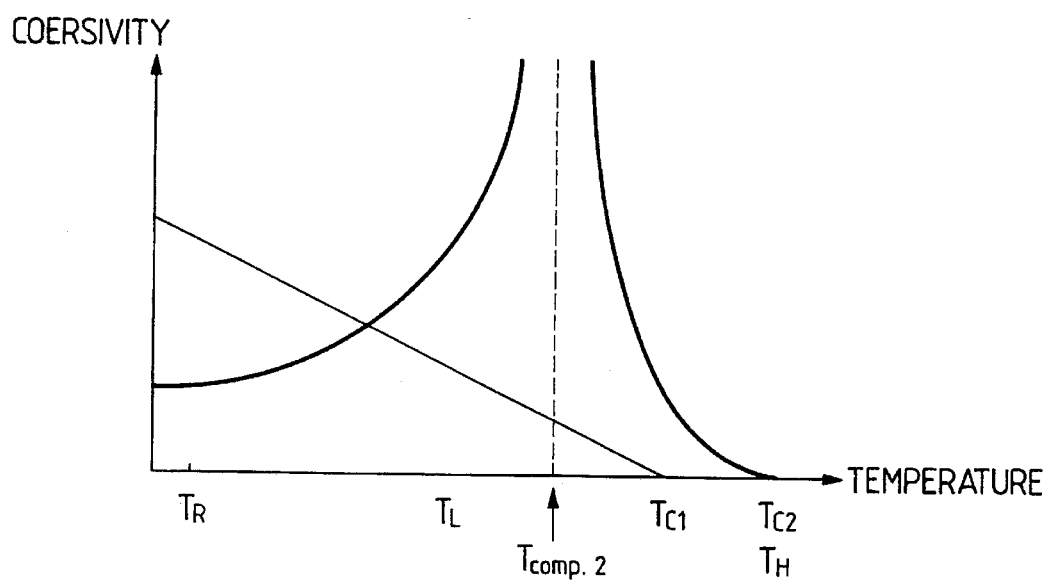
FIG. 25 is a graph showing the relationship between the coercivity and the temperature for a medium No. 2-2.

For $T_{comp.2}$, $T_L < T_{comp.2}$. The graph of the FIG. 25 shows this relation.

A condition that reverses the direction of magnetization of the second layer without reversing that of the first layer by the initial field (Hini.) at the room temperature $T_R$ is represented by Formula 17. The medium No. 2-2 satisfies Formula 17 at the $T_R$.

At this time, a condition for the Hini. is represented by Formula 20. If the Hini. disappears, reversed magnetization of the first and second layers are influenced by each other due to the interface wall energy. The condition that can hold the direction of magnetization of the second layer is represented by Formulas 18 and 19.

The medium No. 2-2 satisfies Formulas 18 and 19

The second layer's magnetization of the recording medium which can satisfy Formulas 17 to 19 at the $T_R$ is aligned along the "A direction" by the Hini. which satisfies Formula 20. At this time, the first layer is maintained in the recorded state (Conditions 1a or 1b in FIGS. 26 and 27).

Figure 27:
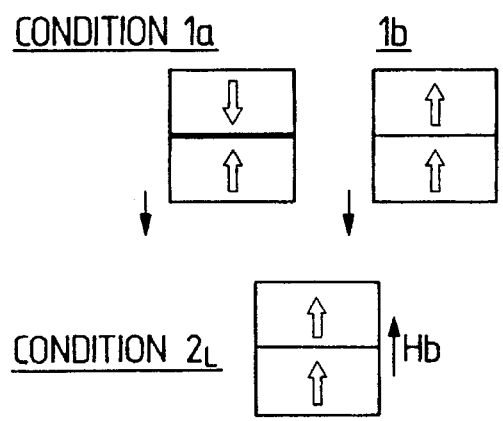

The low-temperature cycle shown in FIG. 27 is the same as that of the medium No. 2-1, and a detailed description thereof will be omitted.

Figure 26:
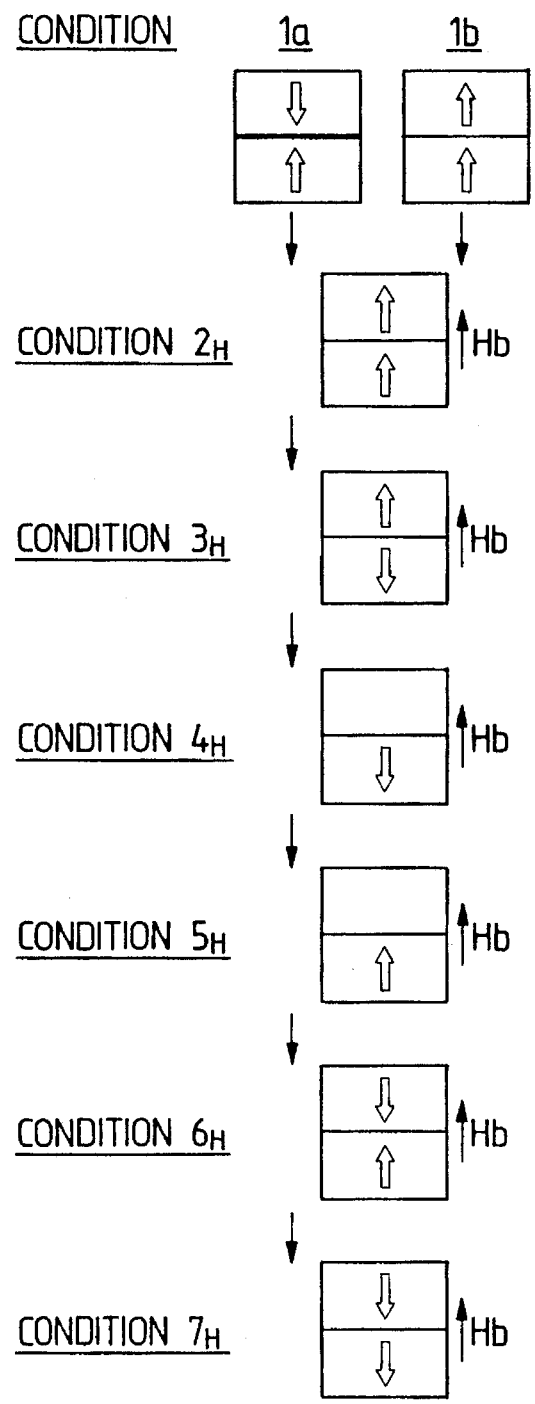
FIGS. 26 and 27 are diagrams showing the changes in the direction of magnetization in high- and low-temperature cycles of the medium No. 2-2.

The high-temperature cycle will now be described with reference to FIG. 26.

High-Temperature Cycle

When the medium temperature is increased to $T_L$ upon irradiation of the high-level laser beam, Condition 1a or 1b changes into Condition $2_H$.

When the laser-beam radiation further continues, the temperature of the medium increases accordingly. When the temperature of the medium slightly exceeds the temperature $T_{comp.2}$ of the second layer, the relationship between the strengths of the vectors is reversed from the model 1 to the model 2 although the directions of the RE and TM spins remain the same. For this reason, the direction of magnetization of the second layer is reversed to the "non-A direction" (Condition $3_H$).

However, since the coercivity $H_{C2}$ is still high at this temperature, the direction of magnetization of the second layer will not be reversed by the field Hb.

When the temperature increases and reaches $T_{C1}$, magnetization of the first layer disappears (Condition $4_H$). When the temperature further increases and reaches the temperature $T_H$, the temperature of the second layer substantially corresponds to the Curie temperature $T_{C2}$, and magnetization of the second layer reversed by the field Hb (Condition $5_H$).

In Condition $5_H$, when an irradiated portion is separated from the laser beam spot, the temperature of the medium beings to decrease.

When the temperature of the medium decreases and is slightly below the temperature $T_{C1}$, magnetization appears in the first layer. At this time, the exchange coupling force from the second layer acts to align each of the RE and TM spins of the first and second layers. Thus, magnetization of the model 4, in FIG. 9B, appears in the first layer. This state is Condition $6_H$.

When the temperature of the medium further decreases below the temperature $T_{comp.2}$, the relationship between the strengths of the vectors is reversed from the model 3 to the model 4 although the directions of the RE and TM spins remain the same. As a result, the direction of magnetization of the second layer as a whole is reversed from the "A direction" to the "non-A direction" (Condition $7_H$).

Then, the temperature of the medium decreases from the temperature in Condition $7_H$ to the room temperature. Since the coercivity $H_{C1}$ at the room temperature is sufficiently high, Condition $7_H$ is maintained without reversing the direction of magnetization of the first layer by the field Hb. In this way, bit formation in the "non-A direction" is completed.

The principle of the method of the present invention will be described in detail using a specific medium No. 3 belonging to Class 3 (P type, Quadrant I, Type 3) shown in Table 1.

The medium No. 3 satisfies Formula 21

$$R_R<T_{comp.1}<T_L<T_{C1}<T_H\leq T_{C2} \quad \text{Formula 21}$$

The graph of FIG. 28 shows this relation.

A condition that reverses the direction of magnetization of the reference layer 2 without reversing that of the recording layer 1 by the initial field (Hini. ) at the room temperature $T_R$ is represented by Formula 22. The medium No. 3 satisfies Formula 22 at the $T_R$;

$$H_{C1}>H_{C2}+(\sigma_w/2M_{S1}t_1)+(\sigma_w/2M_{S2}t_2) \quad \text{Formula 22}$$

At this time, a condition for the Hini. is represented by Formula 25. If the Hini. disappears, reversed magnetization of the reference layer 2 is influenced by magnetization of the recording layer 1 due to an exchange coupling force. The condition that can hold the direction of magnetization of the layer 2 is represented by Formulas 23 and 24. The medium No. 3 satisfies Formulas 23 and 24.

$$H_{C1}>(\sigma_w/2M_{S1}t_1) \quad \text{Formula 23}$$

$$H_{C2}>(\sigma_w/2M_{S2}t_2) \quad \text{Formula 24}$$

$$H_{C2}+(\sigma_w/2M_{S2}t_2)<|Hini.|<H_{C1}-(\sigma_w/2M_{S1}t_1) \quad \text{Formula 25}$$

The layer 2's magnetization of the recording medium which can satisfy Formulas 22 to 24 at the $T_R$ is aligned along the "A direction" (the model 1) by the Hini. which satisfies Formula 25. At this time, the recording layer 1 is maintained in the recorded state (Condition 1a or 1b in FIGS. 29 and 30).

Condition 1a or 1b is held to a point immediately before the recording.

The high-temperature cycle will now be described with reference to FIG. 29.

High-Temperature Cycle

In Condition 1a or 1b, when the medium temperature increases and slightly exceeds the Curie temperature $T_{C1}$ of the first layer upon irradiation of the high-level laser beam, magnetization of the layer 1 disappears (Condition $2_H$).

When the laser-beam radiation further continues, since the temperature $T_H$ of the medium reaches near the temperature $T_{C2}$, magnetization of the second layer reverses by the field Hb (Condition $3_H$).

In Condition $3_H$, when an irradiated portion is separated from the laser beam spot, the temperature of the medium begins to decrease.

When the temperature of the medium decreases and is slightly below the temperature $T_{C1}$, magnetization appears in the layer 1. At this time, the interface wall energy from the layer 2 acts to align each of the RE and TM spins of the layers 1 and 2. Since the temperature of the medium is higher than the temperature $T_{comp.1}$, the TM spin is larger than the RE spin (model 3). As a result, magnetization of "A direction" appears in the layer 1 (Condition $4_H$).

When the medium temperature further decreases from the temperature in Condition $4_H$ and is below the temperature $T_{comp.1}$, the relationship between the strengths of the TM and RE spins of the layer 1 is reversed. For this reason, the direction of magnetization of the layer 1 is reversed to the "non-A direction" (Condition $5_H$).

Then, the temperature of the medium decreases from the temperature in Condition $5_H$ to the room temperature. Since the coercivity $H_{C1}$ at the room temperature is sufficiently high, magnetization of the layer 1 is stably maintained. In this way, bit formation in the "non-A direction" is completed.

The low-temperature cycle shown in FIG. 30 is the same as that of the medium No. 1-1.

The principle of the method of the present invention will be described in detail using a specific medium No. 4-1 belonging to Class 4 (P type, Quadrant I, Type 4) shown in Table 1.

The medium No. 4-1 satisfies Formula 26-1:

$$T_R<T_L<T_{C1}<T_H\leq T_{C2} \quad \text{Formula 26-1}$$

Figure 31:
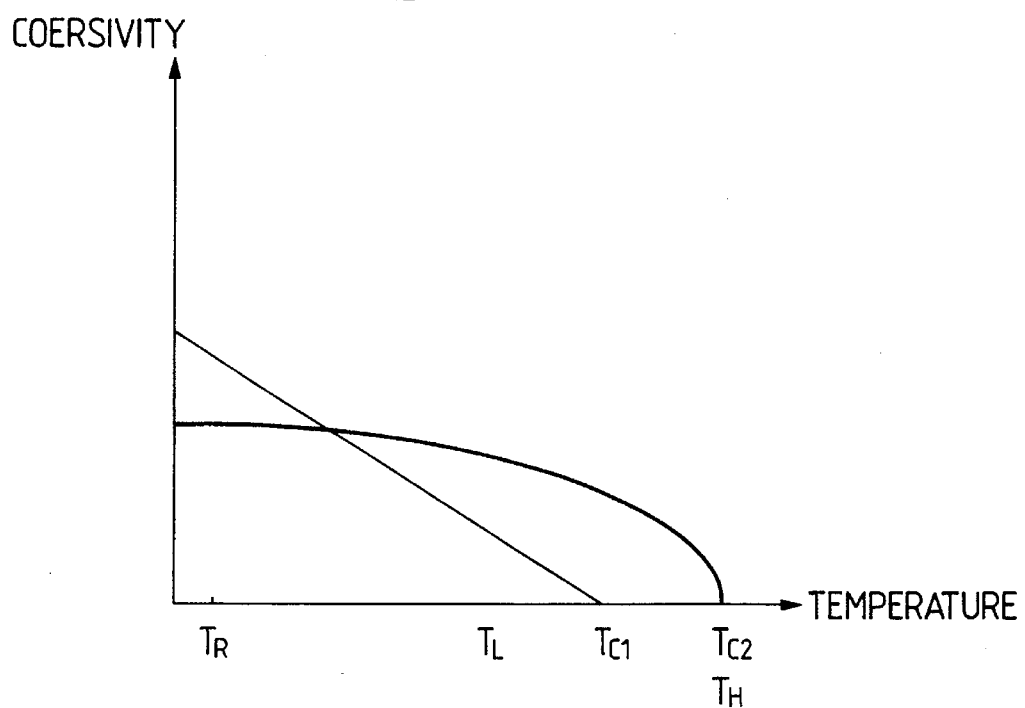
FIG. 31 is a graph showing the relationship between the coercivity and the temperature for a medium No. 4-1.

The graph of FIG. 31 shows this relation.

A condition that reverses the direction of magnetization of the reference layer 2 without reversing that of the recording layer 1 by the initial field (Hini.) at the room temperature $T_R$ is represented by Formula 27. The medium No. 4-1 satisfies Formula 27 at the $T_R$:

$$H_{C1}>H_{C2}30\ (\sigma_w/2M_{S1}t_1)+(\sigma_w/2M_{S2}t_2) \quad \text{Formula 27}$$

At this time, a condition for the Hini. is represented by Formula 30. If the Hini. disappears, reversed magnetization of the reference layer 2 is influenced by magnetization of the recording layer 1 due to the interface wall energy. The condition that can hold the direction of magnetization of the layer 2 is represented by Formulas 28 and 29. The medium No. 4-1 satisfies Formulas 28 and 29.

$$H_{C1}>(\sigma_w/2M_{S1}t_1) \quad \text{Formula 28}$$

$$H_{C2}>(\sigma_w/2M_{S2}t_2) \quad \text{Formula 29}$$

$$H_{C2}+(\sigma_w/2M_{S2}t_2)<|Hini.|<H_{C1}-(\sigma_w/2M_{S1}t_1) \quad \text{Formula 30}$$

The layer 2's magnetization of the recording medium which can satisfy Formulas 27 to 29 at the $T_R$ is aligned along the "A direction" by the Hini. which satisfies Formula 30. At this time, the recording layer 1 is maintained in the recorded state (Condition 1a or 1b in FIGS. 32 and 33).

Condition 1a or 1b is held to a point immediately before the recording.

The high-temperature cycle will now be described with reference to FIG. 32.

High-Temperature Cycle

When the medium temperature is increased slightly upper the Curie temperature $T_{C1}$ upon irradiation of the high-level laser beam, magnetization of the layer 1 disappears (Condition $2_H$).

When the laser-beam radiation further continues and the medium temperature is equal to the temperature $T_H$, since the temperature $T_H$ of the layer 2 reaches near the Curie temperature $T_{C2}$, the coercivity $H_{C2}$ decreases and magnetization of the layer 2 reverses. This state is Condition $3_H$.

In Condition $3_H$, when an irradiated portion is separated from the laser beam spot, the temperature of the medium begins to decrease.

When the temperature of the medium decreases and is slightly below the temperature $T_{C1}$, magnetization appears in the layer 1. At this time, the interface wall energy from the layer 2 acts to align each of the RE and TM spins of the layers 1 and 2. As a result, magnetization of the "non-A direction" appears in the layer 1. This state is Condition $4_H$.

Then, the temperature of the medium decreases from the temperature in Condition $4_H$ to the room temperature. Since the coercivity $H_{C1}$ at the room temperature is sufficiently high, magnetization of the layer 1 is stably maintained. In this way, bit formation in the "non-A direction" is completed.

The low-temperature cycle shown in FIG. 33 is the same as that of the medium No. 2-1.

The principle of the method of the present invention will be described in detail using a specific medium No. 4-2 belonging to Class 4 (P type, Quadrant I, Type 4) shown in Table 1.

The medium No. 4-2 satisfies Formula 26-2:

$$T_R < T_L < T_H \leq T_{C1} < T_{C2} \quad \text{Formula 26-2}$$

For the sake of simplicity, the following description will be given under the condition of $T_H < T_{C1} < T_{C2}$.

Figure 34:
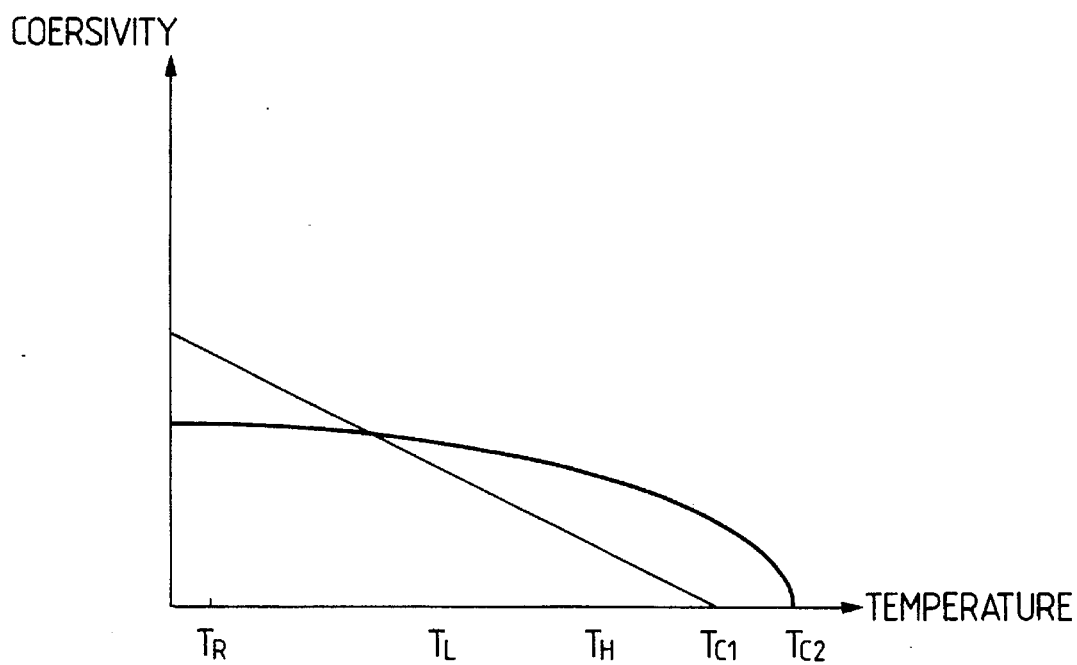
FIG. 34 is a graph showing the relationship between the coercivity and the temperature for a medium No. 4-2.

The graph of FIG. 34 shows this relation.

A condition that reverses the direction of magnetization of the reference layer 2 without reversing that of the recording layer 1 by the initial field (Hini.) at the room temperature $T_R$ is represented by Formula 27. The medium No. 4-2 satisfies Formula 27 at the $T_R$:

At this time, a condition for the Hini. is represented by Formula 30. If the Hini. disappears, reversed magnetization of the reference layers 1 and 2 are influenced by each other due to the interface wall energy. The condition that can hold the direction of magnetization of the layer 2 is represented by Formulas 28 and 29. The medium No. 4-2 satisfies Formulas 28 and 29.

The layer 2's magnetization of the recording medium which can satisfy Formulas 27 to 29 at the $T_R$ is aligned along the "A direction" by the Hini. which satisfies Formula 30. At this time, the recording layer 1 is maintained in the recorded state (Condition $1a$ or $1b$ in FIGS. 35 and 36).

Condition $1a$ or $1b$ is held to a point immediately before the recording.

Note that when the medium is a disk-like medium, a condition for preventing a recorded bit (in particular a bit in the first layer in Condition $1b$ in a direction opposite to that of Hb) from being reversed by Hb when it approaches the Hb applying means is given by the following Formula 30-2:

$$Hb < H_{C1} + \frac{\sigma_w}{2M_{S1}t_1} \quad \text{Formula 30-2}$$

The disk-like medium must satisfy this formula at room temperature. A condition for preventing the initialized second layer from being reversed by Hb when it approaches the Hb applying means is given by the following Formula 30-3:

$$Hb < H_{C2} - \frac{\sigma_w}{2M_{S2}t_2} \quad \text{Formula 30-3}$$

In other words, conditions for determining Hb are given by Formulas 30-2 and 30-3.

The high-temperature cycle will now be described with reference to FIG. 35.

High-Temperature Cycle

When the medium temperature is increased to $T_L$ upon irradiation of the high-level laser beam, Condition $1a$ or $1b$ changes into Condition $2_H$.

When the laser-beam radiation further continues and the medium temperature is equal to the temperature $T_H$, since the temperature $T_H$ reaches near Curie temperatures of the first and second layers, the coercivities of the both layers 1 and 2 are decreased. As a result, the magnetizations of both the layers are simultaneously reversed as in Condition $3_H$ of the medium No. 1-3 (Condition $3_H$).

In Condition $3_H$, when an irradiated portion is separated from the laser beam spot, the temperature of the medium begins to decrease. Then, the temperature of the medium decreases until the room temperature. However Condition $3_H$ is maintained. In this way, bit formation in the "non-A direction" is completed. The low-temperature cycle shown in FIG. 36 is the same as that of the medium No. 4-1.

The principle of the method of the present invention will be described in detail using a specific medium No. 5-1 belonging to Class 5 (A type, Quadrant II, type 3) shown in Table 1.

The medium No. 5-1 satisfies Formula 31-1:

$$T_R < T_{comp.1} < T_L < T_{C1} < T_H \leq T_{C2} \quad \text{Formula 31-1}$$

Figure 37:
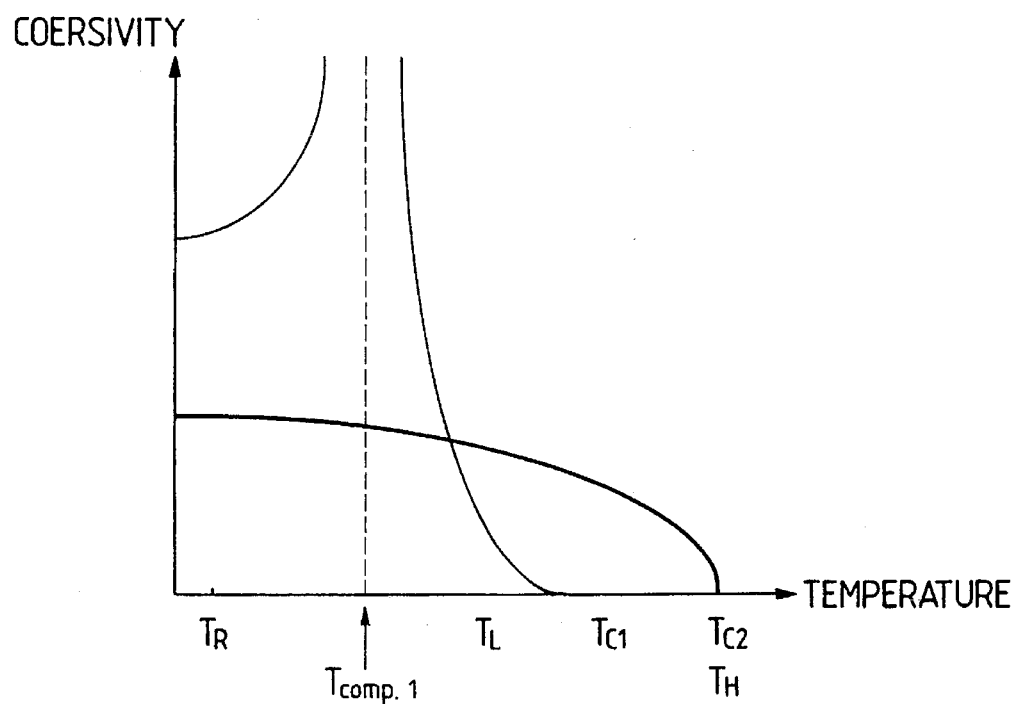
FIG. 37 is a graph showing the relationship between the coercivity and the temperature for a medium No. 5-1.

The graph of FIG. 37 shows this relation.

A condition that reverses the direction of magnetization of the reference layer 2 without reversing that of the recording layer 1 by the initial field (Hini.) at the room temperature $T_R$ is represented by Formula 32. The medium No. 5 satisfies Formula 32 at the $T_R$:

$$H_{C1} > H_{C2} + |(\sigma_w/2M_{S1}t_1) - (\sigma_w/2M_{S2}t_2)| \quad \text{Formula 32}$$

At this time, a condition for the Hini. is represented by Formula 35. If the Hini. disappears, reversed magnetization of the reference layer 2 is influenced by magnetization of the recording layer 1 due to the interface wall energy. The condition that can hold the direction of magnetization of the layer 2 is represented by Formulas 33 and 34. The medium No. 5-1 satisfies Formulas 33 and 34.

$$H_{C1} > (\sigma_w/2M_{S1}t_1) \quad \text{Formula 33}$$

$$H_{C2} > (\sigma_w/2M_{S2}t_2) \quad \text{Formula 34}$$

$$H_{C2} + (\sigma_w/2M_{S2}t_2) < |Hini.| < H_{C1} + (\sigma_w/2M_{S1}t_1) \quad \text{Formula 35}$$

The layer 2's magnetization of the recording medium which can satisfy Formulas 32 to 34 at the $T_R$ is aligned along the "A direction (the model 3) by the Hini. which satisfies Formula 35. At this time, the recording layer 1 is maintained in the recorded state (Condition $1a$ or $1b$ in FIGS. 38 and 39).

Condition $1a$ or $1b$ is held to a point immediately before the recording. In this case, the bias field (Hb) is applied in the downward direction.

Figure 38:
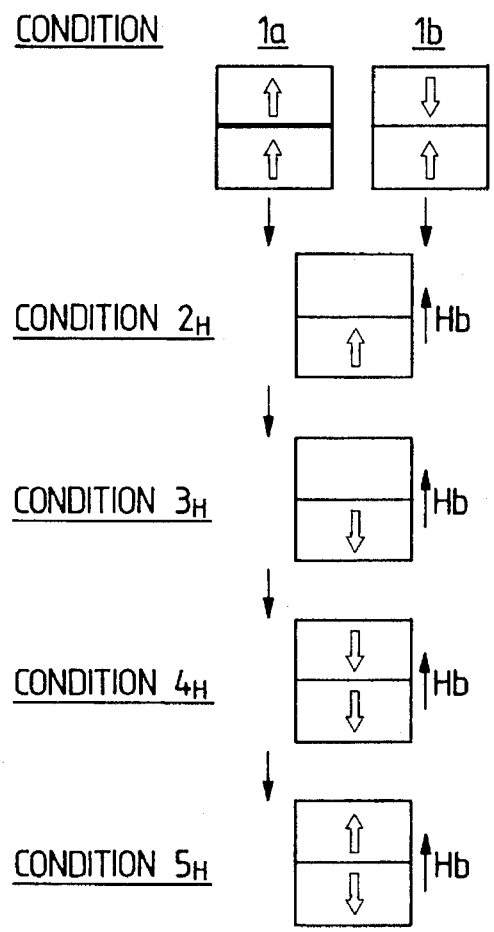
FIGS. 38 and 39 are diagrams showing the changes in the direction of magnetization in high- and low-temperature cycles of the medium No. 5-1.

The high-temperature cycle will now be described with reference to FIG. 38.

High-Temperature Cycle

When the medium temperature increases and slightly exceeds the Curie temperature $T_{C1}$ of the recording layer 1, magnetization of the layer 1 disappears (Condition $2_H$).

When the laser-beam radiation further continues and the medium temperature reaches near the Curie temperature $T_{C2}$, since the coercivity $H_{C2}$ of the layer decreases, magnetization of the layer 2 is reversed by the field Hb (Condition $3_H$).

In Condition $3_H$, when an irradiated portion is separated from the laser beam spot, the temperature of the medium begins to decrease. When the temperature of the medium is decreased slightly below the temperature $T_{C1}$, magnetization appears in the layer 1. At this time, the interface wall energy from the layer 2 acts to align each of the RE and TM spins of the layers 1 and 2. In this case, since the medium temperature is yet higher than the temperature Tcomp.1, the TM spin is larger than the RE spin. As a result, magnetization of the "non-A direction" appears in the layer 2 (Condition $4_H$).

When the medium temperature is decreased below the temperature Tcomp.1 from the temperature in Condition $4_H$, the relationship between the strengths of the TM and RE spins of the layer 1 is reversed (from the model 2 to the model 3). For this reason, magnetization of the layer 1 is reversed to the "A-direction" (Condition $5_H$).

Then, the temperature of the medium decreases from the temperature in Condition $5_H$ to the room temperature. Since the coercivity $H_{C1}$ at the room temperature is sufficiently high, magnetization of the layer 1 is stably maintained. In this way, bit formation in the "A direction" is completed.

Figure 39:
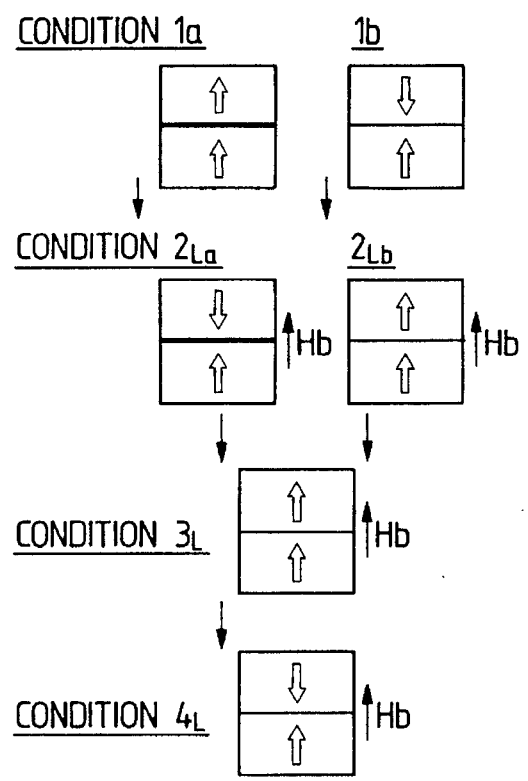

Next, the low-temperature cycle will be described with reference to FIG. 39.

Low-Temperature Cycle

In Condition $1a$ or $1b$ immediately before recording, the medium temperature increases and exceeds Tcomp.1 upon irradiation of the low-level laser beam. The relationship between the strength of the vectors in reversed although the directions of the RE and TM spins of the first layer remain the same. As a result the magnetization of the first layer is reversed (Condition $1a$, Condition $2_{La}$, Condition $1b \rightarrow$ Condition 2Lb). In this Condition the P type medium is temporarily formed.

When the temperature is further increased from this state and reaches $T_L$, the following relation is established:

$$H_{C1} + Hb < \frac{\sigma_w}{2M_{S1}t_1}$$

and, Condition $2_{La}$ changes to Condition $3_L$. On the other hand, since Condition $2_{Lb}$ is maintained, the same Condition $3_L$ as Condition $2_{Lb}$ is set.

In Condition $2_L$, when an irradiated portion is separated from the laser beam spot, the medium temperature begins to fall. When the medium temperature is below the temperature Tcomp.1, the relationship between the strengths of the vectors of the RE and TM spins of the first layer is reversed (from the model 3 to the model 4, in FIG. 9B). As a result, magnetization of the first layer is the "non-A direction" (Condition $4_L$). In this condition, the medium returns to A type.

Condition $4_L$ is maintained even if the medium temperature is decreased to the room temperature. In this way, bit formation in the "non-A direction" is completed.

The principle of the method of the present invention will be described in detail using a specific medium No. 5-2 belonging to Class 5 (A type, Quadrant II, type 3) shown in Table 1.

The medium No. 5-2 satisfies Formula 31-2:

$$T_R < Tcomp.1 < T_L < T_H \leq T_{C1} \leq T_{C2} \qquad \text{Formula 31-2}$$

Figure 40:
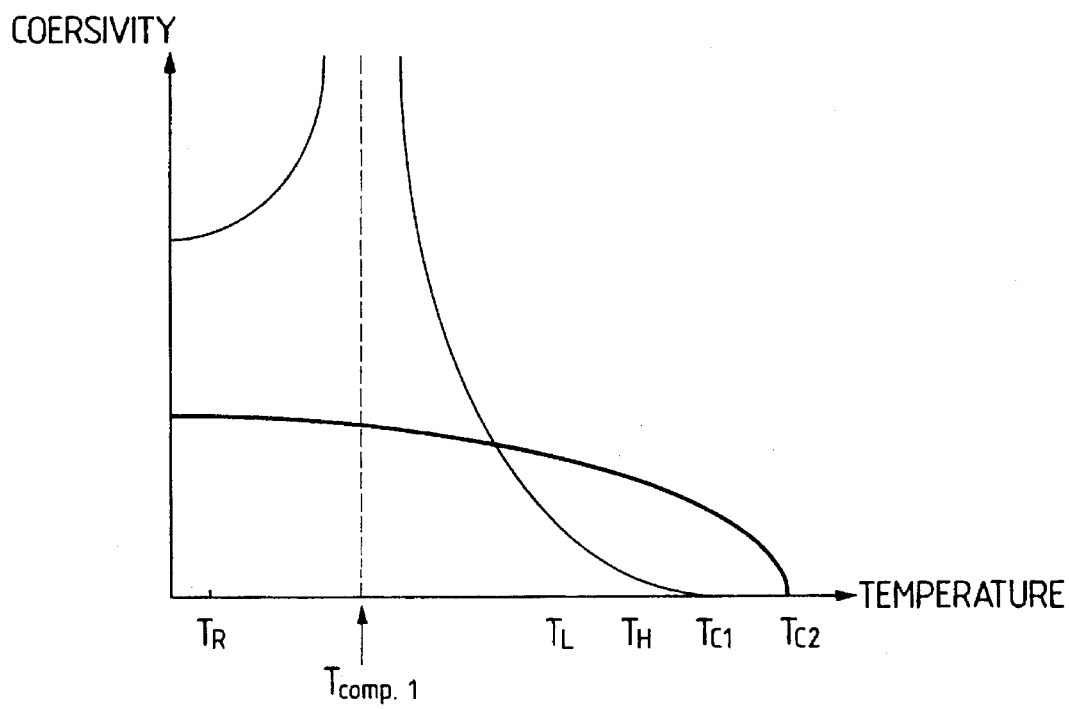
FIG. 40 is a graph showing the relationship between the coercivity and the temperature for a medium No. 5-2.

For the sake of simplicity, the following description will be given under the condition of $T_H < T_{C1} < T_{C2}$. The graph of FIG. 40 shows this relation.

A condition that reverses the direction of magnetization of the reference layer 2 without reversing that of the recording layer 1 by the initial field (Hini.) at the room temperature $T_R$ is represented by Formula 32. The medium No. 5-2 satisfies Formula 32 at the $T_R$.

At this time, a condition for the Hini. is represented by Formula 35. If the Hini. disappears, reversed magnetization of the reference layers 1 and 2 are influenced by each other due to the interface wall energy. The condition that can hold the direction of magnetization of the layer 2 is represented by Formulas 33 and 34. The medium No. 5-2 satisfies Formulas 33 and 34.

The layer 2's magnetization of the recording medium which can satisfy Formulas 32 to 34 at the $T_R$ is aligned along the "A direction" by the Hini. which satisfies Formula 35. At this time, the recording layer 1 is maintained in the recorded state (Condition $1a$ or $1b$ in FIGS. 41 and 42).

Condition 1 is held to a point immediately before the recording. In this case, the bias field (Hb) is applied in the downward direction.

Note that when the medium is a disk-like medium, a condition for preventing a recorded bit (in particular a bit in the first layer in Condition $1b$ in a direction opposite to that of Hb) from being reversed by Hb when it approaches the Hb applying means is given by the following Formula 35-2:

$$Hb < H_{C1} - \frac{\sigma_w}{2M_{S1}t_1} \qquad \text{Formula 35-2}$$

The disk-like medium must satisfy this formula at room temperature. A condition for preventing the initialized second layer from being reversed by Hb when it approaches the Hb applying means is given by the following Formula 35-3:

$$Hb < H_{C2} - \frac{\sigma_w}{2M_{S2}t_2} \qquad \text{Formula 35-3}$$

In other words, conditions for determining Hb are given by Formulas 35-2 and 35-3.

The low-temperature cycle shown in FIG. 42 is the same as that for the medium No. 5-1, except that signs of Formulas are different.

The high-temperature cycle will now be described with reference to FIG. 41.

High-Temperature Cycle

When the medium temperature is increased to $T_L$ upon irradiation of the high-level laser beam, Condition $2_H$ appears.

When the laser-beam radiation further continues and the medium temperature is equal to the temperature TH, since the temperature $T_H$ of the layer 2 reaches near the Curie temperatures $T_{C1}$ and $T_{C2}$, coercivities of both the layers 1 and 2 are decreased. As a result, the magnetizations of both the layers are simultaneously reversed as in Condition $3_H$ of the medium No. 1-3 (Condition $3_H$).

When the medium temperature is decreased below the temperature Tcomp.1, the medium returns to A type from P type and the relationship between the strengths of the TM and RE spins of the layer 1 is reversed. For this reason, magnetization of the layer 1 is reversed to the "A-direction" (Condition $4_H$).

Then, the temperature of the medium decreases from the temperature in Condition $4_H$ to the room temperature. Since the coercivity $H_{C1}$ at the room temperature is sufficiently high, magnetization of the layer 1 is stably maintained. In this way, bit formation in the "A direction" is completed.

The principle of the method of the present invention will be described in detail using a specific medium No. 6 belonging to Class 6 (A type, Quadrant II, Type 4) shown in Table 1.

The medium No. 6 satisfies Formula 36:

$$T_R < T_L < T_{C1} < T_H \leq T_{C2} \qquad \text{Formula 36}$$

The graph of FIG. 43 shows this relation.

A condition that reverses the direction of magnetization of the reference layer 2 without reversing that of the recording layer 1 by the initial field (Hini.) at the room temperature $T_R$ is represented by Formula 37. The medium No. 6 satisfies Formula 37 at the $T_R$:

$$H_{C1} > H_{C2} + |(\sigma_w/2M_{S1}t_1) - (\sigma_w/2M_{S2}t_2)| \qquad \text{Formula 37}$$

At this time, a condition for the Hini. is represented by Formula 40. If the Hini. disappears, reversed magnetization of the reference layer 2 is influenced by magnetization of the recording layer 1 due to the interface wall energy. The condition that can hold the direction of magnetization of the layer 2 is represented by Formulas 38 and 39. The medium No. 6 satisfies Formulas 38 and 39.

$$H_{C1} > (\sigma_w/2M_{S1}t_1) \qquad \text{Formula 38}$$

$$H_{C2} > (\sigma_w/2M_{S2}t_2) \qquad \text{Formula 39}$$

$$H_{C2} + (\sigma_w/2M_{S2}t_2) < |Hini.| < H_{C1} + (\sigma_w/2M_{S1}t_1) \qquad \text{Formula 40}$$

The layer 2's magnetization of the recording medium which can satisfy Formulas 37 to 39 at the $T_R$ is aligned along the "A direction" by the Hini. which satisfies Formula 40. At this time, the recording layer 1 is maintained in the recorded state (Condition 1a or 1b in FIGS. 44 and 45).

Condition 1a or 1b is held to a point immediately before the recording. In this case, the bias field (Hb) is applied in the downward direction.

The high-temperature cycle will now be described with reference to FIG. 44.

High-Temperature Cycle

In Condition 1a or 1b, when the medium temperature increases and exceeds the Curie temperature $T_{C1}$ upon irradiation of the high-level laser beam, magnetization of the layer 1 disappears (Condition $2_H$).

When the laser-beam radiation further continues and the medium temperature is equal to the temperature $T_H$, since the temperature $T_H$ of the layer 2 reaches near the Curie temperature $T_{C2}$, coercivity $H_{C2}$ decreases and magnetization of the layer 2 is reversed by the field Hb. This state is Condition $3_H$.

In Condition $3_H$, when an irradiated portion is separated from the laser beam spot, the temperature of the medium begins to decrease. When the temperature of the medium is further decreased slightly below the temperature $T_{C1}$, magnetization appears in the layer 1. At this time, the interface wall energy from the layer 2 acts to align each of the RE and TM spins of the layers 1 and 2. For this reason, magnetization of the model 1, in FIG. 9B, without regard to the bias field Hb, appears in the layer 1. This state is Condition $4_H$.

Then, the temperature of the medium decreases from the temperature in Condition $4_H$ to the room temperature. Since the coercivity $H_{C1}$ at the room temperature is sufficiently high, magnetization of the layer 1 is stably maintained. In this way, bit formation in the "A direction" is completed.

Next, the low-temperature cycle will be described with reference to FIG. 45.

Low-Temperature Cycle

In Condition 1 immediately before recording, the medium temperature is increased to $T_L$ upon irradiation of the low-level laser beam. A state allowing the following relation to be established is set:

$$H_{C1} - Hb < \frac{\sigma_w}{2M_{S1}t_1}$$

and, Condition 1a changes to Condition $2_L$. On the other hand, since Condition 1b is maintained, the same Condition $2_L$ as Condition 1b is set.

In Condition $2_L$, when the bit falls outside the spot region of the laser beam, the medium temperature begins to decrease. Condition $2_L$ is maintained even if the medium temperature is decreased to room temperature. As a result, a bit having the "non-A-directed" magnetization is formed in the first layer.

The principle of the method of the present invention will be described in detail using a specific medium No. 7-1 belonging to Class 7 (P type, Quadrant III, Type 4) shown in Table 1.

The medium No. 7-1 satisfies Formula 41-1:

$$T_R < T_L < T_{C1} < T_H \leq T_{C2} \qquad \text{Formula 41-2}$$

Figure 46:
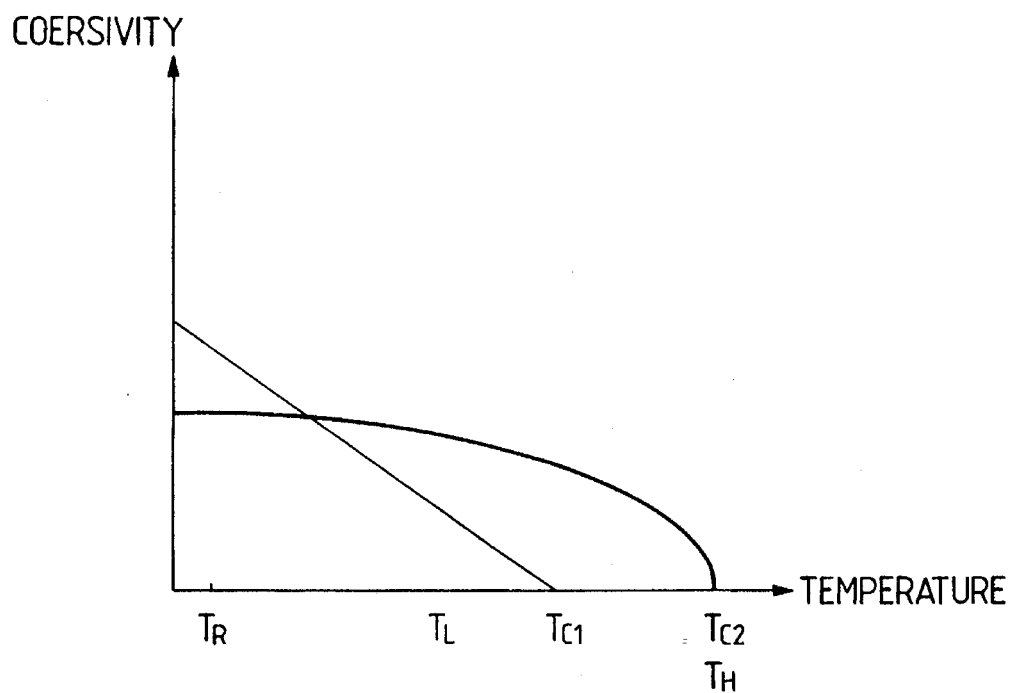
FIGS. 46 is a graph showing the relationship between the coercivity and the temperature for a medium No. 7-1.

The graph of FIG. 46 shows this relation.

A condition that reverses the direction of magnetization of the reference layer 2 without reversing that of the recording layer 1 by the initial field (Hini.) at the room temperature $T_R$ is represented by Formula 42. The medium No. 7-1 satisfies Formula 42 at the $T_R$:

$$H_{C1} > H_{C2} + (\sigma_w/2M_{S1}t_1) + (\sigma_w/2M_{S2}t_2) \qquad \text{Formula 42}$$

At this time, a condition for the Hini. is represented by Formula 45. If the Hini. disappears, reversed magnetization of the reference layer 2 is influenced by magnetization of the recording layer 1 due to an exchange coupling force. The condition that can hold the direction of magnetization of the layer 2 is represented by Formulas 43 and 44. The medium No. 7-1 satisfies Formulas 43 and 44.

$$H_{C1} > (\sigma_w/2M_{S1}t_1) \qquad \text{Formula 43}$$

$$H_{C2} > (\sigma_w/2M_{S2}t_2) \qquad \text{Formula 44}$$

$$H_{C2} + (\sigma_w/2M_{S2}t_2) < |Hini.| < H_{C1} - (\sigma_w/2M_{S1}t_1) \qquad \text{Formula 45}$$

The layer 2's magnetization of the recording medium which can satisfy Formulas 42 to 44 at the $T_R$ is aligned along the "A direction" by the Hini. which satisfies Formula 45. At this time, the recording layer 1 is maintained in the recorded state (Condition 1a or 1b in FIGS. 47 and 48).

Condition 1a or 1b is held to a point immediately before the recording. In this case, the bias field (Hb) is applied in the downward direction.

Figure 47:
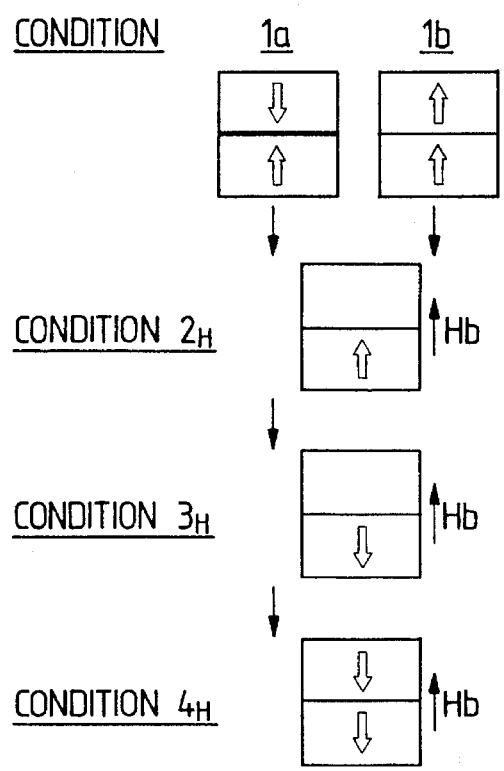
FIGS. 47 and 48 are diagrams showing the changes in the direction of magnetization in high- and low-temperature cycles of the medium No. 7-1.

The high-temperature cycle will now be described with reference to FIG. 47.

High-Temperature Cycle

In Condition 1a or 1b, when the medium temperature increases and exceeds the Curie temperature $T_{C1}$ upon irradiation of the high-level laser beam, magnetization of the layer 1 disappears (Condition $2_H$).

When the laser-beam radiation continues and the medium temperature is equal to the temperature $T_H$, since the temperature $T_H$ of the layer 2 reaches near the Curie temperature $T_{C2}$, coercivity $HC_{C2}$ decreases and magnetization of the layer 2 is reversed by the field Hb. This state is Condition $3_H$.

In Condition $3_H$, when an irradiated portion is separated from the laser beam spot, the temperature of the medium begins to decrease. When the temperature of the medium is further decreased slightly below the temperature $T_{C1}$, magnetization appears in the layer 1. At this time, the interface wall energy from the layer 2 acts to align each of the RE and TM spins of the layers 1 and 2. For this reason, magnetization of the model 2 appears in the layer 1. This state is Condition $4_H$.

Then, the temperature of the medium decreases from the temperature in Condition $4_H$ to the room temperature. Since the coercivity $H_{C1}$ at the room temperature is sufficiently high, magnetization of the layer 1 is stably maintained. In this way, bit formation in the "non-A direct" ion is completed.

Figure 48:
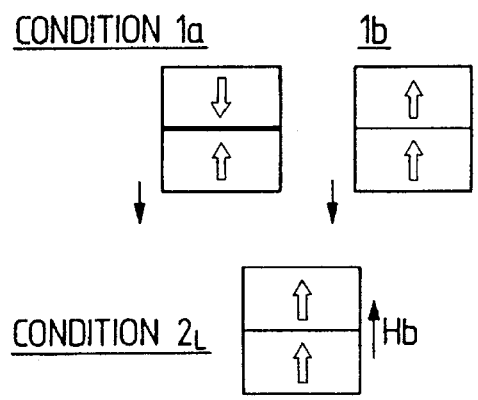

The low-temperature cycle is shown in FIG. 48. This cycle is substantially the same as that of the medium No. 6 except for the direction of a bit in Condition 2L, and a detailed description thereof will be omitted.

The principle of the method of the present invention will be described in detail using a specific medium No. 7-2 belonging to Class 7 (P type, Quadrant III, Type 4) shown in Table 1.

The medium No. 7-2 satisfies Formula 41-2:

$$T_R<T_L<T_H \leq T_{C1} \leq T_{C2} \qquad \text{Formula 41-2}$$

Figure 49:
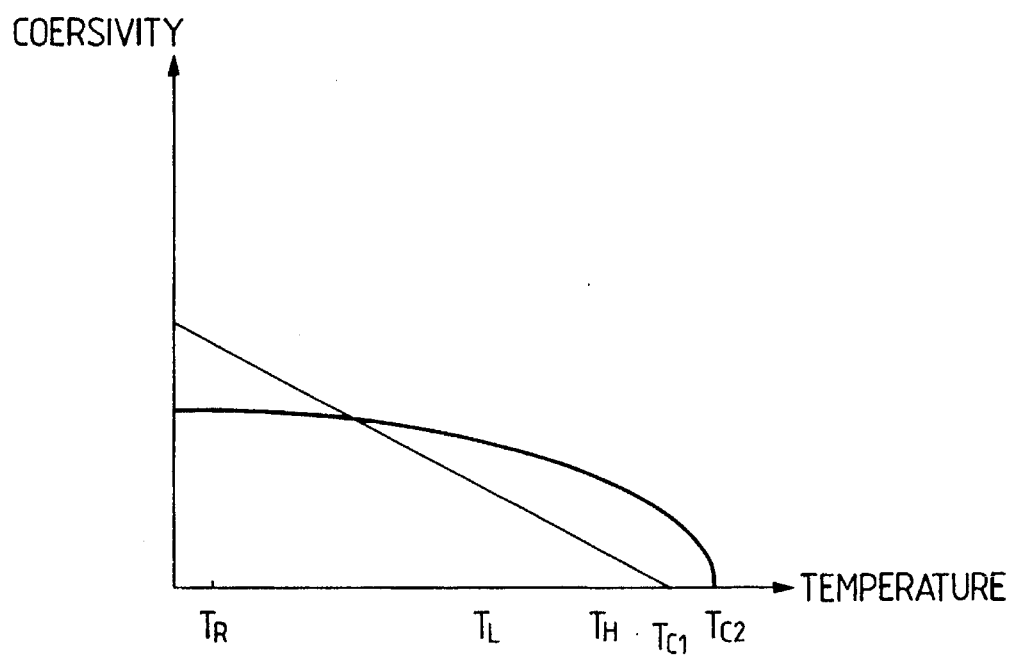
FIG. 49 is a graph showing the relationship between the coercivity and the temperature for a medium No. 7-2.

For the sake of simplicity, the following description will be given under the condition of $T_H<T_{C1}<T_{C2}$. The graph of FIG. 49 shows this relation.

A condition that reverses the direction of magnetization of the reference layer 2 without reversing that of the recording layer 1 by the initial field (Hini.) at the room temperature $T_R$ is represented by Formula 42. The medium No. 7-2 satisfies Formula 42 at the $T_R$.

At this time, a condition for the Hini. is represented by Formula 45. If the Hini. disappears, reversed magnetization of the reference layers 1 and 2 are influenced by each other due to the interface wall energy. The condition that can hold the direction of magnetization of the layer 2 is represented by Formulas 43 and 44. The medium No. 7-2 satisfies Formulas 43 and 44.

The layer 2's magnetization of the recording medium which can satisfy Formulas 42 to 44 at the $T_R$ is aligned along the "A direction" by the Hini. which satisfies Formula 45. At this time, the recording layer 1 is maintained in the recorded state (Condition 1a or 1b in FIGS. 50 and 51).

Condition 1a or 1b is held to a point immediately before the recording. In this case, the bias field (Hb) is applied in the downward direction. Note that in this medium No. 7-2, the conditions given by Formulas 30-2 and 30-3 are applicable.

Figure 50:
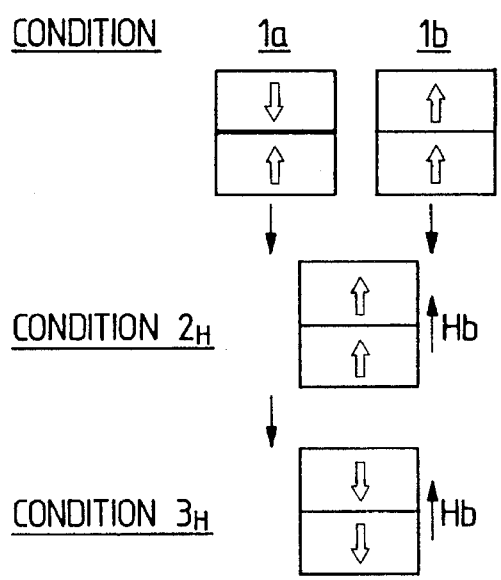
FIGS. 50 and 51 are diagrams showing the changes in the direction of magnetization in high- and low-temperature cycles of the medium No. 7-2.

The high-temperature cycle will now be described with reference to FIG. 50.

High-Temperature Cycle

In Condition 1a or 1b, when the medium temperature is increased to $T_L$ upon irradiation of the high-level laser beam, Condition $2_H$ appears.

When the laser-beam radiation continues and the medium temperature is equal to the temperature $T_H$, since the temperature $T_H$ of the layer 2 reaches near the Curie temperatures $T_{C1}$ and $T_{C2}$, the medium satisfies one of formulas (1)–(3), shown for the medium No. 3-1. This state is Condition $3_H$.

In Condition $3_H$, when an irradiated portion is separated from the laser beam spot, the temperature of the medium begins to decrease. Then, the temperature of the medium decreases from the temperature in Condition $3_H$ to the room temperature. Since the coercivity $H_{C1}$ at the room temperature is sufficiently high, magnetization of the layer 1 is stably maintained. In this way, bit formation in the "non-A direction" is completed.

Figure 51:
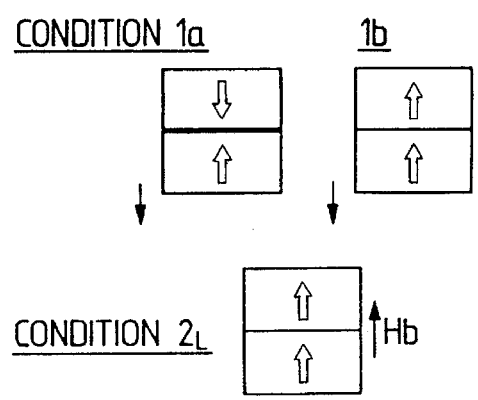

The low-temperature cycle is shown in FIG. 51. This cycle is substantially the same as that of the medium No. 7-1 except for the signs of the formulas, and a detailed description thereof will be omitted.

The principle of the method of the present invention will be described in detail using a specific medium No. 8-1 belonging to Class 8 (A type, Quadrant IV, Type 2) shown in Table 1.

The medium No. 8-1 satisfies Formula 46-1:

$$T_R<T_L<T_{C1}<T_H \leq T_{C2} \qquad \text{Formula 46-1}$$

In the following description, $T_L<T_{C1}<T\text{comp.}2$.

The graph of FIG. 52 shows this relation.

A condition that reverses the direction of magnetization of the reference layer 2 without reversing that of the recording layer 1 by the initial field (Hini.) at the room temperature $T_R$ is represented by Formula 47. The medium No. 8-1 satisfies Formula 47 at the $T_R$:

$$H_{C1}>H_{C2}+|(\sigma_w/2M_{S1}t_1)-(\sigma_w/2M_{S2}t_2)| \qquad \text{Formula 47}$$

At this time, a condition for the Hini. is represented by Formula 50. If the Hini. disappears, reversed magnetization of the reference layer 2 is influenced by magnetization of the recording layer 1 due to the interface wall energy. The condition that can hold the direction of magnetization of the layer 2 is represented by Formulas 48 and 49. The medium No. 8-1 satisfies Formulas 48 and 49.

$$H_{C1}>(\sigma_w/2M_{S1}t_1) \qquad \text{Formula 48}$$

$$H_{C2}>(\sigma_w/2M_{S2}t_2) \qquad \text{Formula 49}$$

$$H_{C2}+(\sigma_w/2M_{S2}t_2)<|Hini.|<H_{C1}+(\sigma_w/2M_{S1}t_1) \qquad \text{Formula 50}$$

The layer 2's magnetization of the recording medium which can satisfy Formulas 47 to 49 at the $T_R$ is aligned along the "A direction" by the Hini. Which satisfies Formula 50. At this time the recording layer is maintained in the recorded state (Condition 1a or 1b in FIGS. 53 and 54).

Condition 1a or 1b is held to a point immediately before the recording. In this case, the bias field (Hb) is applied in the upward direction.

The high-temperature cycle will now be described with reference to FIG. 53.

High-Temperature Cycle

In Condition 1a or 1b, when the medium temperature increases and exceed the Curie temperature $T_{C1}$ upon irradiation of the high-level laser beam, magnetization of the layer 1 disappears (Condition $2_H$).

When the laser-beam radiation continues and the medium temperature is slightly higher than the temperature Tcomp.2, the relationship between the strengths of the RE and TM spins is reversed although the directions thereof remain the same. As a result, the direction of the magnetization of the layer 2 is reversed to "non-A direction". This state is Condition $3_H$.

At this temperature, however, since the coercivity $H_{C2}$ is yet high, magnetization of the layer 2 will not be reversed by the bias field Hb. Assume that the laser-beam radiation further continues and the medium temperature is increased to $T_H$. Since the temperature $T_H$ reaches near the temperature $T_{C2}$, coercivity $H_{C2}$ decreases and magnetization of the layer 2 reverses by the field Hb (Condition $4_H$).

In Condition $4_H$, when an irradiated portion is separated from the laser beam spot, the temperature of the medium begins to decrease. When the temperature of the medium is further decreased slightly below the temperature Tcomp.2, the relationship between the strengths of the RE and TM spins is reversed without reversing the directions thereof. As a result, the direction of magnetization of the layer 2 is reversed to "non-A direction". In this state, since the coercivity $H_{C2}$ is already sufficiently high, magnetization of the layer 2 will not be reversed by the bias field Hb. In this case, since the medium temperature is yet higher than the temperature $T_{C1}$, no magnetization appears in the layer 1. This state is Condition $5_H$.

When the medium temperature further decreases slightly below the temperature $T_{C1}$, magnetization also appears in the layer 1. At this time, magnetization of the layer 1 influences the layer 1 due to the interface wall energy to align each of the RE and TM spins of the layers 1 and 2. For this reason, magnetization of the "A direction" appears in the layer 1 (Condition $6_H$).

Then, the temperature of the medium decreases from the temperature in Condition $6_H$ to the room temperature. Since the coercivity $H_{C1}$ at the room temperature is sufficiently high, magnetization of the layer 1 is stably maintained. In this way, bit formation in the "A direction" is completed.

The low-temperature cycle is shown in FIG. 54. This cycle is substantially the same as that of the medium No. 7-2 except for the direction of a bit in Condition $2_L$, and a detailed description thereof will be omitted.

The principle of the method of the present invention will be described in detail using a specific medium No. 8-2 belonging to Class 8 (A type, Quadrant IV, Type 2) shown in Table 1.

The medium No. 8-2 satisfies Formulas 46-2 and 11-2:

$$T_R<T_L<T_{C1}<T_H\leq T_{C2} \qquad \text{Formula 46-2}$$

In the following description, $T_L<$Tcomp.2.

The graph of FIG. 55 shows this relation.

A condition that reverses the direction of magnetization of the reference layer 2 without reversing that of the recording layer 1 by the initial field (Hini.) at the room temperature $T_R$ is represented by Formula 47. The medium No. 8-2 satisfies Formula 47 at the $T_R$.

At this time, a condition for the Hini. is represented by Formula 50. If the Hini. disappears, reversed magnetization of the reference layers 1 and 2 are influenced by each other due to the interface wall energy. The condition that can hold the direction of magnetization of the layer 2 is represented by Formulas 48 and 49. The medium No. 8-2 satisfies Formulas 48 and 49.

The layer 2's magnetization of the recording medium which can satisfy Formulas 47 to 49 at the $T_R$ is aligned along the "A direction" by the Hini. Which satisfies Formula 50. At this time the recording layer 1 is maintained in the recorded state (Condition 1$a$ or 1$b$ in FIGS. 56 and 57).

Condition 1$a$ or 1$b$ is held to a point immediately before the recording. Note that in this medium No. 8-2, the condition given by Formula 30-2 is quoted.

Figure 56:
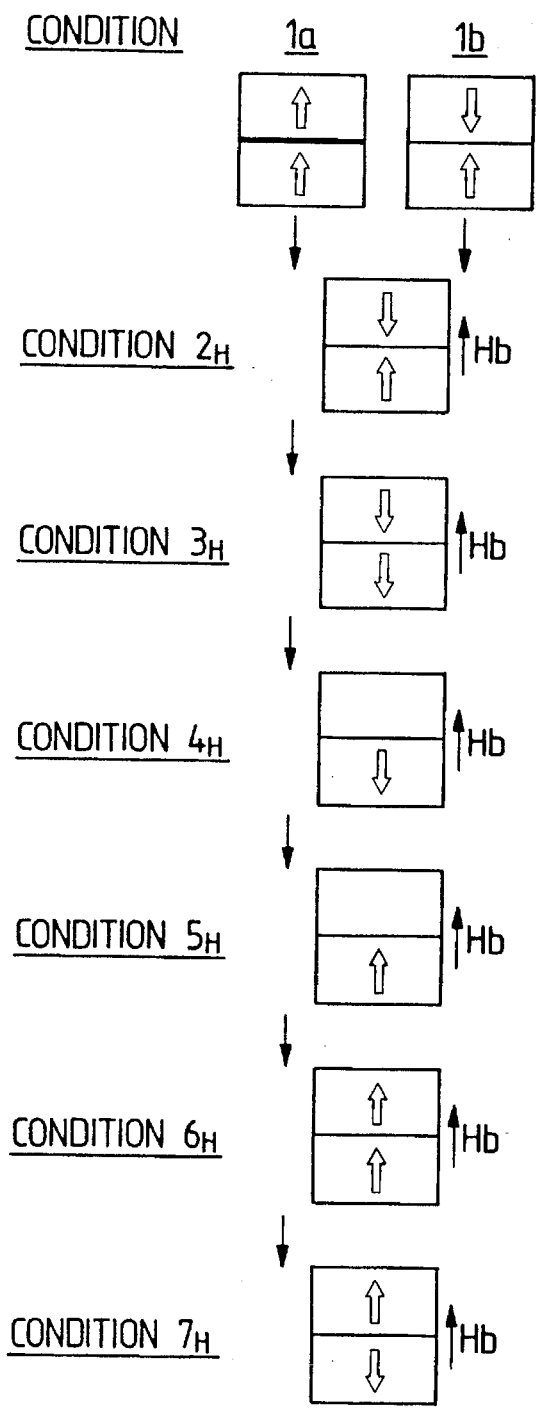
FIGS. 56 and 57 are diagrams showing the changes in the direction of magnetization in high- and low-temperature cycles of the medium No. 8-2.

The high-temperature cycle will now be described with reference to FIG. 56.

High-Temperature Cycle

In Condition 1, when the medium temperature is increased to $T_L$ upon irradiation of the high-level laser beam, Condition $2_H$ appears.

When the laser-beam radiation continues and the medium temperature is slightly higher than the temperature Tcomp.2, the relationship between the strengths of the RE and TM spins is reversed although the directions thereof remain the same. As a result, the direction of the magnetization of the layer 2 is reversed to "non-A direction". This state is Condition $3_H$.

At this temperature, however, since the coersivity $H_{C2}$ is yet high, magnetization of the layer 2 will not be reversed by the bias field Hb. The medium temperature is substantially equal to the Curie temperature $T_{C1}$ of the recording layer 1, magnetization of the layer 1 disappears (Condition $4_H$). The medium temperature is increased to $T_H$, since the temperature $T_H$ is substantially equal to the temperature $T_{C2}$, magnetization of the layer reverses by the field Hb (Condition $5_H$).

In Condition $5_H$, when an irradiated portion is separated from the laser beam spot, the temperature of the medium begins to decrease.

When the medium temperature decreases slightly below the temperature $T_{C1}$, magnetization also appears in the layer 1. At this time, magnetization of the layer 2 influences the layer 1 due to the interface wall energy to align each of the RE and TM spins of the layers 1 and 2. For this reason, magnetization of the "A direction" appears in the layer 1 (Condition $6_H$).

When the temperature of the medium is further decreased slightly below the temperature Tcomp.2, the relationship between the strengths of the RE and TM spins is reversed without reversing the directions thereof. As a result, the direction of magnetization of the layer 2 is reversed to "non-A direction". This state is Condition $7_H$.

Then, the temperature of the medium decreases from the temperature in Condition $7_H$ to the room temperature. In this way, bit formation in the "A direction" is completed.

Figure 57:
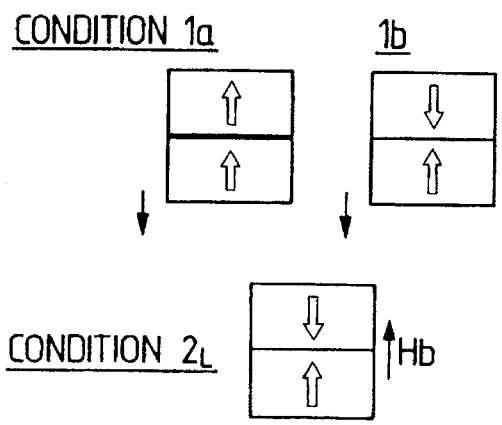

Next, the low-temperature cycle is shown in FIG. 57. Since this cycle is the same as that of the medium No. 8-1, a detailed description thereof will be omitted.

The principle of the method of the present invention will be described in detail using a specific medium No. 8-3 belonging to Class 8 (A type, Quadrant Iv, Type 2) shown in Table 1.

The medium No. 8-3 satisfies Formula 46-3:

$$T_R<T_L<T_H\leq T_{C1}\leq T_{C2} \qquad \text{Formula 46-3}$$

In the following description, $T_H<T_{C1}<T_{C2}$ and $T_L<$Tcomp.2$<T_{C1}$. The graph of FIG. 58 shows this relation.

A condition that reverses the direction of magnetization of the reference layer 2 without reversing that of the recording layer 1 by the initial field (Hini.) at the room temperature $T_R$ is represented by Formula 47. The medium No. 8-3 satisfies Formula 47 at the $T_R$.

At this time, a condition for the Hini. is represented by Formula 50. If the Hini. disappears, reversed magnetization of the reference layers 1 and 2 are influenced by each other due to the interface wall energy. The condition that can hold the direction of magnetization of the layer 2 is represented by Formulas 48 and 49. The medium No. 8-3 satisfies Formulas 48 and 49.

The layer 2's magnetization of the recording medium which can satisfy Formulas 47 to 49 at the $T_R$ is aligned along the "A direction" by the Hini. Which satisfies Formula 50. At this time the recording layer 1 is maintained in the recorded state (Condition 1a or 1b in FIGS. 59 and 60).

Condition 1 is held to a point immediately before the recording. In this case, the bias field (Hb) is applied in the upward direction.

The high-temperature cycle will now be described with reference to FIG. 59.

High-Temperature Cycle

In Condition 1a or 1b, when the medium temperature is increased to $T_L$ upon irradiation of the high level laser beam, Condition $2_H$ appears.

When the laser-beam radiation continues and the medium temperature is slightly higher than the temperature Tcomp.2, the medium changes from A type into P type and the relationship between the strengths of the RE and TM spins is reversed although the directions thereof remain the same. As a result, the direction of the magnetization of the layer 2 is reversed to "non-A direction". This state is Condition $3_H$.

At this temperature, however, since the coercivity $H_{C2}$ is yet high, magnetization of the layer 2 will not be reversed by the bias field Hb. Assume that the laser-beam radiation further continues and the medium temperature is increased to $T_H$. Since the temperature $T_H$ reaches near the temperature $T_{C2}$, coercivities of both layers 1 and 2 decrease and the medium satisfies one of formulas (1)–(3), shown for the medium No. 3-1. This state is Condition $4_H$.

In Condition $4_H$, when an irradiated portion is separated from the laser beam spot, the temperature of the medium begins to decrease and the medium returns into A type from P type. And then, the relationship between the strengths of the RE and TM spins is reversed without reversing the directions thereof. As a result, the direction of magnetization of the layer 2 is reversed to "non-A direction". In this state, since the coercivity $H_{C2}$ is already sufficiently high, magnetization of the layer 2 will not be reversed by the bias field Hb. This state is Condition $5_H$.

Then, the temperature of the medium decreases from the temperature in Condition $5_H$ to the room temperature. Since the coercivity $H_{C1}$ at the room temperature is sufficiently high, magnetization of the layer 1 is stably maintained. In this way, bit formation in the "A direction" is completed.

The low-temperature cycle is shown in FIG. 60. Since this cycle is the same as that of the medium No. 8-1, a detailed description thereof will be omitted.

The principle of the method of the present invention will be described in detail using a specific medium No. 9 belonging to Class 9 (A type, Quadrant IV, Type 4) shown in Table 1.

The medium No. 9 satisfies Formula 51:

$$T_R < T_L < T_{C1} < T_H \leq T_{C2} \quad \text{Formula 51}$$

The graph of FIG. 61 shows this relation.

A condition that reverses the direction of magnetization of the reference layer 2 without reversing that of the recording layer 1 by the initial field (Hini.) at the room temperature $T_R$ is represented by Formula 52. The medium No. 9 satisfies Formula 52 at the $T_R$:

$$H_{C1} > H_{C2} + |(\sigma_w/2M_{S1}t_1) - (\sigma_w/2M_{S2}t_2)| \quad \text{Formula 5}$$

At this time, a condition for the Hini. is represented by Formula 55. If the Hini. disappears, reversed magnetization of the reference layer 2 is influenced by magnetization of the recording layer 1 due to the interface wall energy. The condition that can hold the direction of magnetization of the layer 2 is represented by Formulas 53 and 54. The medium No. 9 satisfies Formulas 53 and 54.

$$H_{C1} > (\sigma_w/2M_{S1}t_1) \quad \text{Formula 53}$$

$$HC_2 > (\sigma_w/2M_{S2}t_2) \quad \text{Formula 54}$$

$$H_{C2} + (\sigma_w/2M_{S2}t_2) < |Hini.| < H_{C1} + (\sigma_w/2M_{S1}t_1) \quad \text{Formula 55}$$

The layer 2's magnetization of the recording medium which can satisfy Formulas 52 to 54 at the $T_R$ is aligned along the "A direction" by the Hini. which satisfies Formula 55. At this time, the recording layer 1 is maintained in the recorded state (Condition 1a or 1b in FIGS. 62 and 63).

Condition 1a or 1b is held to a point immediately before the recording. In this case, the bias field (Hb) is applied in the downward direction.

The high-temperature cycle will now be described with reference to FIG. 62.

High-Temperature Cycle

In Condition 1, when the medium temperature increases and exceeds the Curie temperature $T_{C1}$ upon irradiation of the high-level laser beam, magnetization of the layer 1 disappears (Condition $2_H$).

When the laser beam radiation continues and the medium temperature is equal to the temperature $T_H$, the temperature $T_H$ reaches near the temperature $T_{C2}$, magnetization of the layer 2 is reversed by the field Hb. This state is Condition $3_H$.

In Condition $3_H$, when an irradiated portion is separated from the laser beam spot, the temperature of the medium begins to decrease. When the temperature of the medium is further decreased slightly below the temperature $T_{C1}$, magnetization appears in the layer 1. At this time, the interface wall energy from the layer 2 acts to align each of the RE and TM spins of the layers 1 and 2. For this reason, magnetization, without regard to the bias field Hb, appears in the layer 1o This state is Condition $4_H$.

Then, the temperature of the medium decreases from the temperature in Condition $4_H$ to the room temperature. Since the coercivity $H_{C1}$ at the room temperature is sufficiently high, magnetization of the layer 1 is stably maintained. In this way, bit formation in the "A direction" is completed.

The low-temperature cycle is shown in FIG. 63. Since this cycle is the same as that of the medium No. 6, a detailed description thereof will be omitted.

Figure 64:
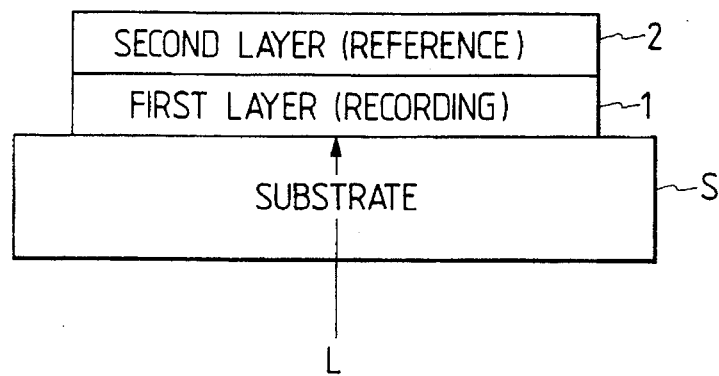
FIG. 64 is a diagram of a multilayered structure of a recording medium according to the embodiment of the present invention.

The present invention will be described in detail below by way of its examples. The structure of a medium formed in each example is constituted by a substrate S, a first layer (recording layer) 1, and a second layer (reference layer) 2, as shown in FIG. 64. (Example 1 . . . Class 1, Medium No. 1-1)

A three-element RF magnetron sputtering apparatus was used, and two targets, i.e., a TbFeCo alloy and a GdTbFeCo alloy were placed therein. A glass substrate having a thickness of 1.2 mm and a diameter of 200 mm was set in a chamber of the apparatus.

After the interior of the chamber of the apparatus was evacuated to a vacuum of $7 \times 10^{-7}$ Torr. or less, an Ar gas was introduced therein to a vacuum of $5 \times 10^{-3}$ Torr. Sputtering was then performed at a deposition rate of about 2 Å/sec.

First, a first layer (recording layer) of a 700-Å thick $Tb_{24}Fe_{71}Co_5$ (numerals of suffixes are in units of atomic %: this applies to the following description) perpendicular magnetic film was formed on the substrate using the TbFeCo alloy as the target.

Then, the target was replaced with the GdTbFeCo alloy while maintaining the vacuum state, and sputtering was similarly performed. As a result, a second layer (reference layer) of a 1,000-Å thick $Gd_{12}Tb_{15}Fe_{55}Co_{18}$ perpendicular magnetic film was formed on the first layer.

In this manner, a two-layered magnetooptical recording medium No. 1-1 belonging to Class 1 (P Type, Quadrant I, Type 1) was manufactured. Table 2 summarizes the manufacturing conditions and characteristics of this medium.

In Table 2, values of Ms, Hc, and $\sigma_w$ are those at 25° C.

TABLE 2

|  | FIRST LAYER | SECOND LAYER |
|---|---|---|
| COMPOSITION (FIRST LAYER) | $Tb_{24}Fe_{71}Co_5$ |  |
| COMPOSITION (SECOND LAYER) |  | $Gd_{13}Tb_{14}Fe_{54}Co_{17}$ |
| FILM THICKNESS | 700 | 1000 |
| $M_S$ (emu/cc) | 60 | 170 |
| $H_C$ (Oe) | 8000 | 2200 |
| $T_C$ (°C.) | 175 | 350 |
| $T_{comp.}$ (°C.) | 110 | 190 |
| $\sigma_w$ | 1.8 erg/cm² | |

This medium satisfies Formula 12:

$$H_{c1} = 8000 \text{ Oe} > H_{c2} + \frac{\sigma_w}{2M_{s1}t_1} + \frac{\sigma_w}{2M_{s2}t_2} = 4872 \text{ Oe}$$

In Formula 15, since $$H_{c2} + \frac{\sigma_w}{2M_{s2}t_2} = 2729 \text{ Oe}$$

$$H_{c1} - \frac{\sigma_w}{2M_{s1}t_1} = 5857 \text{ Oe}$$

if the initial field Hini. is set to be 5,200 Oe in the "A direction", Formula 15 can be satisfied. Thus, the magnetization of the first layer is not reversed by the field Hini. at room temperature, and only the magnetization of the second layer is reversed.

Furthermore, this medium satisfies Formula 13:

$$H_{c1} = 8000 \text{ Oe} > \frac{\sigma_w}{2M_{s1}t_1} = 2143 \text{ Oe}$$

and, Formula 14:

$$H_{c2} = 2200 \text{ Oe} > \frac{\sigma_w}{2M_{s2}t_2} = 529 \text{ Oe}$$

Therefore, if the field Hini. is removed, the magnetizations of the first and second layers are maintained.

If the bias field Hb is set to be 300 Oe in the same "A direction" as the field Hini., the medium satisfies Formula 15-2 at room temperature:

$$H_{c1} = 8000 > Hb + \frac{\sigma_w}{2M_{s1}t_1} = 2443 \text{ Oe}$$

Therefore, the "non-A-directed" magnetization of the first layer of the recorded bit is no longer reversed even if it is again influenced by Hb after one revolution.

Furthermore, when a bit having the "non-A-directed" magnetization is formed in the first layer in the high-temperature cycle, this bit is influenced by Hb immediately thereafter. However, this medium satisfies Formula 15-3 at room temperature:

$$Hb = 300 \text{ Oe} < H_{c1} + \frac{\sigma_w}{2M_{s1}t_1} = 10143 \text{ Oe}$$

Therefore, the "non-A-directed" magnetization is no longer reversed by Hb.

This medium exhibits the following values at 130° C.:

$M_{s1}$=15 emu/cc
$H_{c1}$=2100 Oe
$\sigma_w$ =0.54

More specifically, the medium satisfies the formula:

$$H_{c1} + Hb = 2400 < \frac{\sigma_w}{2M_{s1}t_1} = 2571$$

and, at 130° C., the magnetization of the first layer is reversed by the magnetization of the second layer even if Hb is present.

If $T_L$=130° C. and $T_H$=270° C. are set, this medium can satisfy Formula 11-1:

$$T_R < T_{comp.1} < T_L < T_{C1} < T_H \leq T_{C2}$$

and, an over-write operation can be achieved.

(Example 2 . . . Class 1, Medium No. 1-2)

A two-layered magnetooptical recording medium No. 1-2 belonging to Class 1 (P Type, Quadrant I, Type 1) shown in Table 3 below was manufactured following the same procedures as in Example 1.

Table 3 below summarizes the manufacturing conditions and characteristics. Note that values of Ms, Hc, and $\sigma_w$ are those at 25° C.

TABLE 3

|  | FIRST LAYER | SECOND LAYER |
|---|---|---|
| COMPOSITION (FIRST LAYER) | $Tb_{24}Fe_{71}Co_5$ |  |
| COMPOSITION (SECOND LAYER) |  | $Gd_{12}Tb_{15}Fe_{55}Co_{18}$ |
| FILM THICKNESS | 700 | 1000 |
| $M_S$ (emu/cc) | 60 | 150 |
| $H_C$ (Oe) | 8000 | 2700 |
| $T_C$ (°C.) | 175 | 350 |
| $T_{comp.}$ (°C.) | 110 | 140 |
| $\sigma_w$ | 1.8 erg/cm² | |

This medium satisfies Formula 12:

$$H_{c1} = 8000 \text{ Oe} > H_{c2} + \frac{\sigma_w}{2M_{s1}t_1} + \frac{\sigma_w}{2M_{s2}t_2} = 5443 \text{ Oe}$$

In Formula 15, since $$H_{c2} + \frac{\sigma_w}{2M_{s2}t_2} = 3300 \text{ Oe}$$

$$H_{c1} - \frac{\sigma_w}{2M_{s1}t_1} = 5857 \text{ Oe}$$

if the initial field Hini. is set to be 5,200 Oe in the "A direction", Formula 15 can be satisfied. Thus, the magnetization of the first layer is not reversed by the field Hini. at room temperature, and only the magnetization of the second layer is reversed.

Furthermore, this medium satisfies Formula 13:

$$H_{c1} = 8000 \text{ Oe} > \frac{\sigma_w}{2M_{s1}t_1} = 2143 \text{ Oe}$$

and, Formula 14:

$$H_{c2} = 2700 \text{ Oe} > \frac{\sigma_w}{2M_{s2}t_2} = 600 \text{ Oe}$$

Therefore, if the field Hini. is removed, the magnetizations of the first and second layers are maintained.

If the bias field Hb is set to be 300 Oe in the same "A direction" as the field Hini., the medium satisfies Formula 15-2 at room temperature:

$$H_{c1} = 8000 > Hb + \frac{\sigma_w}{2M_{s1}t_1} = 2443 \text{ Oe}$$

Therefore, the "non-A-directed" magnetization of the first layer of the recorded bit is no longer reversed even if it is again influenced by Hb after one revolution.

Furthermore, when a bit having the "non-A-directed" magnetization is formed in the first layer in the high-temperature cycle, this bit is influenced by Hb immediately thereafter at room temperature. However, this medium satisfies Formula 15-3:

$$Hb = 300 \text{ Oe} < H_{c1} + \frac{\sigma_w}{2M_{s1}t_1} = 10143 \text{ Oe}$$

Therefore, the "non-A-directed" magnetization is no longer reversed by Hb.

This medium exhibits the following values at 130° C:

$M_{S1}$=15 emu/cc
$H_{C1}$=2100 Oe
$\sigma_w$=0.54

More specifically, the medium satisfies the formula:

$$H_{c1} + Hb = 2400 < \frac{\sigma_w}{2M_{s1}t_1} = 2571$$

and, at 130° C., the magnetization of the first layer is reversed by the magnetization of the second layer even if Hb is present.

If $T_L$=130° C. and $T_H$=250° C. are set, this medium can satisfy Formula 11-1:

$$T_R < T_{comp.1} < T_L < T_{C1} < T_H \leq T_{C2}$$

and, an over-write operation can be achieved.

This medium satisfies Formula 11-2:

$$T_{comp.2} = 140° \text{ C.} < T_{C1} = 175° \text{ C.}$$

(Example 3 ... Class 2, Medium No. 2-1)

A 2-element electron beam heating vacuum deposition apparatus was used, and evaporation sources shown in Table 4 below were placed at two positions.

A glass substrate having a thickness of 1.2 mm and a diameter of 200 mm was set in a chamber of the apparatus. The interior of the chamber of the apparatus was evacuated to a vacuum of $1 \times 10^{-6}$ Torr. or less. Thereafter, deposition was performed at a deposition rate of about 3 Å/sec while maintaining the vacuum of 1 to $2 \times 10^{-6}$ Torr. Thus, a first layer (recording layer) of an 800-Å thick $Gd_{11}Tb_{16}Fe_{70}Co_3$ (numerals of suffixes are in units of atomic %) film was formed on the substrate.

Subsequently, the evaporation source was replaced while maintaining the vacuum state. Deposition was similarly performed, and a second layer (reference layer) of a 1,000-Å thick $Dy_{25}Fe_{53}Co_{22}$ film was formed on the first layer. The first and second layers were perpendicular magnetic films.

In this manner, a two-layered magnetooptical recording medium No. 2-1 belonging to Class 2 (P Type, Quadrant I, Type 2) was manufactured.

Table 4 below summarizes the manufacturing conditions and characteristics of this medium.

TABLE 4

|  | FIRST LAYER | SECOND LAYER |
| --- | --- | --- |
| EVAPORATION SOURCE (2 ELEMENTS) | GdTb ALLOY FeCo ALLOY | Dy FeCo ALLOY |
| FILM THICKNESS | 800 | 1000 |
| $M_S$ (emu/cc) | 54 | 158 |
| $H_C$ (Oe) | 6200 | 1370 |
| $T_C$ (°C.) | 190 | 250 |
| $T_{comp.}$ (°C.) | NONE | 200 |
| $\sigma_w$ ROOM TEMPERATURE | 2.0 erg/cm² | |

This medium satisfies Formula 17:

$$H_{c1} = 6200 \text{ Oe} > H_{c2} + \frac{\sigma_w}{2M_{s1}t_1} + \frac{\sigma_w}{2M_{s2}t_2} = 4320 \text{ Oe}$$

In Formula 20, since $$H_{c2} + \frac{\sigma_w}{2M_{s2}t_2} = 2000 \text{ Oe}$$

$$H_{c1} - \frac{\sigma_w}{2M_{s1}t_1} = 3890 \text{ Oe}$$

if the initial field Hini. is set to be 3,000 Oe, Formula 20 can be satisfied. Thus, the magnetization of the first layer is not reversed by the field Hini. at room temperature, and only the magnetization of the second layer is reversed.

Furthermore, this medium satisfies Formula 18:

$$H_{c1} = 6200 \text{ Oe} > \frac{\sigma_w}{2M_{s1}t_1} = 2310 \text{ Oe}$$

and, Formula 19:

$$H_{c2} = 1370 \text{ Oe} > \frac{\sigma_w}{2M_{s2}t_2} = 630 \text{ Oe}$$

Therefore, if the field Hini. is removed, the magnetizations of the first and second layers are maintained.

Thus, the initial field Hini.=3,000 Oe is applied in the "A direction", and the bias field Hb=300 Oe is applied in the "A direction".

This medium exhibits the following values at 138° C.:

$M_{S1}$=41 emu/cc $H_{C1}=1024$ Oe
$\sigma_w=0.487$
More specifically, the medium satisfies the formula:

$$H_{c1} - Hb = 724 < \frac{\sigma_w}{2M_{s1}t_1} = 742$$

and, at 138° C., the magnetization of the first layer is reversed by the magnetization of the second layer.

If $T_L=138°$ C. and $T_H=250°$ C. are set, this medium can satisfy Formula 16:

$$T_R<T_L<T_{C1}<T_H\leq T_{C2}$$

and, an over-write operation can be achieved.
(Example 4 . . . Class 2, Medium 2-1)

A two-layered magnetooptical recording medium No. 2-1 belonging to Class 1 (P Type, Quadrant I, Type shown in Table 5 below was manufactured following the same procedures as in Example 1.

In Table 5, values of Ms, Hc, and $\sigma_w$ are those at 25° C.

TABLE 5

|  | FIRST LAYER | SECOND LAYER |
|---|---|---|
| COMPOSITION (FIRST LAYER) | $Tb_{25.5}Fe_{69.5}Co_5$ | |
| COMPOSITION (SECOND LAYER) | | $Gd_{13}Tb_{16}Fe_{54}Co_{17}$ |
| FILM THICKNESS | 700 | 1000 |
| $M_S$ (emu/cc) | 75 | 170 |
| $H_C$ (Oe) | 6200 | 2200 |
| $T_C$ (°C.) | 175 | 350 |
| $T_{comp.}$ (°C.) | NONE | 190 |
| $\sigma_w$ | 1.5 erg/cm² | |

This medium satisfies Formula 17:

$$H_{c1} = 6200 \text{ Oe} > H_{c2} + \frac{\sigma_w}{2M_{s1}t_1} + \frac{\sigma_w}{2M_{s2}t_2} = 4070 \text{ Oe}$$

In Formula 20, since $$H_{c2} + \frac{\sigma_w}{2M_{s2}t_2} = 2641 \text{ Oe}$$

$$H_{c1} - \frac{\sigma_w}{2M_{s1}t_1} = 4771 \text{ Oe}$$

if the initial field Hini. is set to be 4,200 Oe in the "A direction", Formula 20 can be satisfied. Thus, the magnetization of the first layer is not reversed by the field Hini. at room temperature, and only the magnetization of the second layer is reversed.

Furthermore, this medium satisfies Formula 18:

$$H_{c1} = 6200 \text{ Oe} > \frac{\sigma_w}{2M_{s1}t_1} = 1429 \text{ Oe}$$

and, Formula 19:

$$H_{c2} = 2200 \text{ Oe} > \frac{\sigma_w}{2M_{s2}t_2} = 441 \text{ Oe}$$

Therefore, if the field Hini. is removed, the magnetizations of the first and second layers are maintained.

If the bias field Hb is set to be 300 Oe in the same "A direction" as the field Hini., the medium satisfies Formula 20-2 at room temperature:

$$H_{c1} = 6200 > Hb + \frac{\sigma_w}{2M_{s1}t_1} = 1729 \text{ Oe}$$

Therefore, the "non-A-directed" magnetization of the first layer of the recorded bit is no longer reversed even if it is again influenced by Hb after one revolution.

Furthermore, when a bit having the "non-A-directed" magnetization is formed in the first layer in the high-temperature cycle, this bit is influenced by Hb immediately thereafter. However, this medium satisfies Formula 20-3 at room temperature:

$$Hb = 300 \text{ Oe} < H_{c1} + \frac{\sigma_w}{2M_{s1}t_1} = 7629 \text{ Oe}$$

Therefore, the "non-A-directed" magnetization is no longer reversed by Hb.

This medium exhibits the following values at 125° C.:
$M_{S1}=24$ emu/cc
$H_{C1}=1700$ Oe
$\sigma_w=0.48$
More specifically, the medium satisfies the formula:

$$H_{c1} - Hb = 1400 < \frac{\sigma_w}{2M_{s1}t_1} = 1429$$

and, at 125° C., the magnetization of the first layer is reversed by Hb and the magnetization of the second layer.

If $T_L=125°$ C. and $T_H=270°$ C. are set, this medium can satisfy Formula 16:

$$T_R<T_L<T_{C1}<T_H\leq T_{C2}$$

and, an over-write operation can be achieved.
(Example 5 . . . Class 2, Medium 2-2)

A two-layered magnetooptical recording medium No. 2-2 belonging to Class 2 (P Type, Quadrant I, Type 2) shown in Table 6 below was manufactured following the same procedures as in Example 1.

In Table 6, values of Ms, Hc, and $\sigma_w$ are those at 25° C.

TABLE 6

|  | FIRST LAYER | SECOND LAYER |
|---|---|---|
| COMPOSITION (FIRST LAYER) | $Tb_{25.5}Fe_{69.5}Co_5$ | |
| COMPOSITION (SECOND LAYER) | | $Gd_{12}Tb_{15}Fe_{55}Co_{18}$ |
| FILM THICKNESS | 700 | 1000 |
| $M_S$ (emu/cc) | 75 | 150 |
| $H_C$ (Oe) | 6200 | 2700 |
| $T_C$ (°C.) | 175 | 350 |
| $T_{comp.}$ (°C.) | NONE | 140 |
| $\sigma_2$ ROOM TEMPERATURE | 1.5 erg/cm² | |

This medium satisfies Formula 17:

$$H_{c1} = 6200 \text{ Oe} > H_{c2} + \frac{\sigma_w}{2M_{s1}t_1} + \frac{\sigma_w}{2M_{s2}t_2} = 4629 \text{ Oe}$$

In Formula 20, since $$H_{c2} + \frac{\sigma_w}{2M_{s2}t_2} = 3200 \text{ Oe}$$

-continued $$H_{c1} - \frac{\sigma_w}{2M_{s1}t_1} = 4771 \text{ Oe}$$

if the initial field Hini. is set to be 4,200 Oe in the "A direction", Formula 20 can be satisfied. Thus, the magnetization of the first layer is not reversed by the field Hini. at room temperature, and only the magnetization of the second layer is reversed.

Furthermore, this medium satisfies Formula 18:

$$H_{c1} = 6200 \text{ Oe} > \frac{\sigma_w}{2M_{s1}t_1} = 1429 \text{ Oe}$$

and, Formula 19:

$$H_{c2} = 2700 \text{ Oe} > \frac{\sigma_w}{2M_{s2}t_2} = 500 \text{ Oe}$$

Therefore, if the field Hini. is removed, the magnetizations of the first and second layers are maintained.

If the bias field Hb is set to be 300 Oe in the same "A direction" as the field Hini., the medium satisfies Formula 20-2 at room temperature:

$$H_{c1} = 6200 > Hb + \frac{\sigma_w}{2M_{s1}t_1} = 1729 \text{ Oe}$$

Therefore, the "non-A-directed" magnetization of the first layer of the recorded bit is no longer reversed even if it is again influenced by Hb after one revolution.

Furthermore, when a bit having the "non-A-directed" magnetization is formed in the first layer in the high-temperature cycle, this bit is influenced by Hb immediately thereafter at room temperature. However, this medium satisfies Formula 20-3 at room temperature:

$$Hb = 300 \text{ Oe} < H_{c1} + \frac{\sigma_w}{2M_{s1}t_1} = 7629 \text{ Oe}$$

Therefore, the "non-A-directed" magnetization is no longer reversed by Hb.

This medium exhibits the following values at 125° C.:

$M_{S1}$=24 emu/cc $H_{C1}$=1700 Oe $\sigma_w$=0.48

More specifically, the medium satisfies the formula:

$$H_{c1} - Hb = 1400 < \frac{\sigma_w}{2M_{s1}t_1} = 1429$$

and, at 125° C., the magnetization of the first layer is reversed by Hb and the magnetization of the second layer.

If $T_L$=125° C. and $T_H$=250° C. are set, this medium can satisfy Formula 16:

$$T_R < T_L < T_{C1} < T_H \leq T_{C2}$$

and, an over-write operation can be achieved.

This medium satisfies Formula 11-2:

$$T_{comp.2} = 140° \text{ C.} < T_{C1} = 175° \text{ C.}$$

(Example 6 . . . Class 3, Medium No. 3)

Following the same procedures as in Example 1, a first layer of a 750-Å thick $Gd_{11}Tb_{11}Fe_{78}$ film was formed on a substrate, and a second layer of a 1,500-Å thick $Gd_8Tb_{18}Fe_{68}Co_6$ film was formed on the first layer. Thus, a medium No. 3 belonging to Class 3 (P Type, Quadrant I, Type 3) was manufactured.

Table 7 below summarizes the manufacturing conditions and characteristics of this medium.

TABLE 7

|  | FIRST LAYER | SECOND LAYER |
|---|---|---|
| EVAPORATION SOURCE (2 ELEMENTS) | GdTb ALLOY Fe | GdTb ALLOY FeCo ALLOY |
| FILM THICKNESS | 750 | 1500 |
| $M_S$ (emu/cc) | 21 | 166 |
| $H_C$ (Oe) | 11000 | 2750 |
| $T_C$ (°C.) | 180 | 210 |
| $T_{comp.}$ (°C.) | 50 | NONE |
| $\sigma_w$ ROOM TEMPERATURE | 2.0 erg/cm² | |

This medium satisfies Formula 22:

$$H_{c1} = 11000 \text{ Oe} > H_{c2} + \frac{\sigma_w}{2M_{s1}t_1} + \frac{\sigma_w}{2M_{s2}t_2} = 9500 \text{ Oe}$$

In Formula 25, since $$H_{c2} + \frac{\sigma_w}{2M_{s2}t_2} = 3150 \text{ Oe}$$

$$H_{c1} - \frac{\sigma_w}{2M_{s1}t_1} = 4650 \text{ Oe}$$

if the initial field Hini. is set to be 3,500 Oe, Formula 25 can be satisfied. Thus, the magnetization of the first layer is not reversed by the field Hini. at room temperature, and only the magnetization of the second layer is reversed.

Furthermore, this medium satisfies Formula 23:

$$H_{c1} = 11000 \text{ Oe} > \frac{\sigma_w}{2M_{s1}t_1} = 6350 \text{ Oe}$$

and, Formula 24:

$$H_{c2} = 2750 \text{ Oe} > \frac{\sigma_w}{2M_{s2}t_2} = 400 \text{ Oe}$$

Therefore, if the field Hini. is removed, the magnetizations of the first and second layers are maintained.

Thus, the initial field Hini.=3,500 Oe is applied in the "A direction", and the bias field Hb=300 Oe is applied in the "non-A direction".

This medium exhibits the following values at 129° C.:

$M_{S1}$=36 emu/cc $H_{C1}$=1242 Oe $\sigma_w$=0.521

More specifically, the medium satisfies the formula:

$$H_{c1} - Hb = 942 < \frac{\sigma_w}{2M_{s1}t_1} = 965$$

and, at 129° C., the magnetization of the first layer is reversed by the magnetization of the second layer.

If $T_L$=129° C. and $T_H$=210° C. are set, this medium can satisfy Formula 21:

$$T_R < T_{comp.1} < T_L < T_{C1} < T_H \leq T_{C2}$$

and, an over-write operation can be achieved.

(Example 7 . . . Class 5, Medium No. 5-1)

Following the same procedures as in Example 1, a first layer of a 530-Å thick $Gd_{11}Tb_{11}Fe_{78}$ film was formed on a substrate, and a second layer of a 700-Å thick $Gd_{12}Tb_8Fe_{78}Co_2$ film was formed on the first layer. Thus, a medium No. 5-1 belonging to Class 5 (A Type, Quadrant II, Type 3) was manufactured. Table 8 below summarizes the manufacturing conditions and characteristics of this medium.

TABLE 8

|  | FIRST LAYER | SECOND LAYER |
|---|---|---|
| EVAPORATION SOURCE (2 ELEMENTS) | GdTb ALLOY Fe | GdTb ALLOY FeCo ALLOY |
| FILM THICKNESS | 530 | 700 |
| $M_S$ (emu/cc) | 21 | 65 |
| $H_C$ (Oe) | 11000 | 3700 |
| $T_C$ (°C.) | 180 | 200 |
| $T_{comp.}$ (°C.) | 50 | NONE |
| $\sigma_w$ ROOM TEMPERATURE | 2.0 erg/cm² | |

This medium satisfies Formula 32:

$$H_{c1} = 11000 > H_{c2} + \left| \frac{\sigma_w}{2M_{s1}t_1} - \frac{\sigma_w}{2M_{s2}t_2} \right| = 10480 \text{ Oe}$$

In Formula 35, since $$H_{c2} + \frac{\sigma_w}{2M_{s2}t_2} = 5900 \text{ Oe}$$

$$H_{c1} + \frac{\sigma_w}{2M_{s1}t_1} = 19980 \text{ Oe}$$

if the initial field Hini. is set to be 7,000 Oe, Formula 35 can be satisfied. Thus, the magnetization of the first layer is not reversed by the field Hini. at room temperature, and only the magnetization of the second layer is reversed.

Furthermore, this medium satisfies Formula 33:

$$H_{c1} = 11000 \text{ Oe} > \frac{\sigma_w}{2M_{s1}t_1} = 8980 \text{ Oe}$$

and, Formula 34:

$$H_{c2} = 3700 \text{ Oe} > \frac{\sigma_w}{2M_{s2}t_2} = 2200 \text{ Oe}$$

Therefore, if the field Hini. is removed, the magnetizations of the first and second layers are maintained.

Thus, the initial field Hini.=7,000 Oe is applied in the "A direction" and the bias field Hb=200 Oe is applied in the "non-A direction".

This medium exhibits the following values at 99° C.:

$M_{S1}$=32 emu/cc $H_{C1}$=2695 Oe $\sigma_w$=0.996

More specifically, the medium satisfies the formula:

$$H_{c1} + Hb = 2895 < \frac{\sigma_w}{2M_{s1}t_1} = 2936$$

and, at 99° C., the magnetization of the first layer is reversed by the magnetization of the second layer.

If $T_L$=99° C. and $T_H$=200° C. are set, this medium can satisfy Formula 31-1:

$$T_R < T_{comp.1} < T_L < T_{C1} < T_H \leq T_{C2}$$

and, an over-write operation can be achieved.
(Example 8 . . . Class 6, Medium No. 6)

Following the same procedures as in Example 1, a first layer of a 500-Å thick $Gd_{11}Tb_{16}Fe_{70}Co_3$ film was formed on a substrate, and a second layer of a 1,000-Å thick $Gd_{12}Tb_8Fe_{78}Co_2$ film was formed on the first layer. Thus, a medium No. 6 belonging to Class 6 (A Type, Quadrant II, Type 4) was manufactured.

Table 9 below summarizes the manufacturing conditions and characteristics of this medium.

TABLE 9

|  | FIRST LAYER | SECOND LAYER |
|---|---|---|
| EVAPORATION SOURCE (2 ELEMENTS) | GdTb ALLOY FeCo ALLOY | GdTb ALLOY FeCo ALLOY |
| FILM THICKNESS | 500 | 1000 |
| $M_S$ (emu/cc) | 54 | 65 |
| $H_C$ (Oe) | 6200 | 3700 |
| $T_C$ (°C.) | 190 | 200 |
| $T_{comp.}$ (°C.) | NONE | NONE |
| $\sigma_w$ ROOM TEMPERATURE | 1.5 erg/cm² | |

This medium satisfies Formula 37:

$$H_{c1} = 6200 \text{ Oe} > H_{c2} + \left| \frac{\sigma_w}{2M_{s1}t_1} - \frac{\sigma_w}{2M_{s2}t_2} \right| = 5860 \text{ Oe}$$

In Formula 40, since $$H_{c2} + \frac{\sigma_w}{2M_{s2}t_2} = 5240 \text{ Oe}$$

$$H_{c1} + \frac{\sigma_w}{2M_{s1}t_1} = 9900 \text{ Oe}$$

if the initial field Hini. is set to be 7,000 Oe, Formula 40 can be satisfied. Thus, the magnetization of the first layer is not reversed by the field Hini. at room temperature, and only the magnetization of the second layer is reversed.

Furthermore, this medium satisfies Formula 38:

$$H_{c1} = 6200 \text{ Oe} > \frac{\sigma_w}{2M_{s1}t_1} = 3700 \text{ Oe}$$

and, Formula 39:

$$H_{c2} = 3700 \text{ Oe} > \frac{\sigma_w}{2M_{s2}t_2} = 1540 \text{ Oe}$$

Therefore, if the field Hini. is removed, the magnetizations of the first and second layers are maintained.

Thus, the initial field Hini.=7,000 Oe is applied in the "A direction", and the bias field Hb=200 Oe is applied in the "non-A direction".

This medium exhibits the following values at 114° C.:

$M_{S1}$=46 emu/cc $H_{C1}$=2027 Oe $\sigma_w$=0.848

More specifically, the medium satisfies the formula:

$$H_{C1} - Hb = 1827 < \frac{\sigma_w}{2M_{s1}t_1} = 1843$$

and, at 114° C., the magnetization of the first layer is reversed by the magnetization of the second layer.

If $T_L$=114° C. and $T_H$=200° C. are set, this medium can satisfy Formula 36:

$$T_R < T_L < T_{C1} < T_H \leq T_{C2}$$

and, an over-write operation can be achieved.
(Example 9 . . . Class 8, Medium No. 8-1)

A two-layered magnetooptical recording medium No. 8-1 belonging to Class 8 (A Type, Quadrant IV, Type 2) shown in Table 10 below was manufactured following the same procedures as in Example 1.

In Table 10, values of Ms, Hc, and $\sigma_w$ are those at 25° C.

TABLE 10

|  | FIRST LAYER | SECOND LAYER |
|---|---|---|
| COMPOSITION (FIRST LAYER) | $Tb_{21}Fe_{74}Co_5$ | |
| COMPOSITION (SECOND LAYER) | | $Tb_{28}Fe_{47.5}Co_{24.5}$ |
| FILM THICKNESS | 700 | 500 |
| $M_S$ (emu/cc) | 50 | 175 |
| $H_C$ (Oe) | 10000 | 4000 |
| $T_C$ (°C.) | 180 | 360 |
| $T_{comp.}$ (°C.) | NONE | 200 |
| $\sigma_w$ ROOM TEMPERATURE | 4.2 erg/cm² | |

This medium satisfies Formula 47:

$$H_{C1} = 10000 > H_{C2} + \left| \frac{\sigma_w}{2M_{s1}t_1} - \frac{\sigma_w}{2M_{s2}t_2} \right| = 7600 \text{ Oe}$$

In Formula 50, since $$H_{C2} + \frac{\sigma_w}{2M_{s2}t_2} = 6400 \text{ Oe}$$

$$H_{C1} + \frac{\sigma_w}{2M_{s1}t_1} = 16000 \text{ Oe}$$

if the initial field Hini. is set to be 8,000 Oe in the "A direction" Formula 50 can be satisfied Thus, the magnetization of the first layer is not reversed by the field Hini. at room temperature, and only the 0magnetization of the second layer is reversed.

Furthermore, this medium satisfies Formula 48:

$$H_{C1} = 10000 \text{ Oe} > \frac{\sigma_w}{2M_{s1}t_1} = 6000 \text{ Oe}$$

and, Formula 49:

$$H_{C2} = 4000 \text{ Oe} > \frac{\sigma_w}{2M_{s2}t_2} = 2400 \text{ Oe}$$

Therefore, if the field Hini. is removed, the magnetizations of the first and second layers are maintained.

If the bias field Hb is set to be 350 Oe in the same "A direction" as the field Hini., the medium satisfies Formula 50-2 at room temperature:

$$Hb = 350 < H_{C1} + \frac{\sigma_w}{2M_{s1}t_1} = 16000 \text{ Oe}$$

Therefore, the "non-A-directed" magnetization of the first layer of the recorded bit is no longer reversed even if it is again influenced by Hb after one revolution.

Furthermore, when a bit having the "non-A-directed" magnetization is formed in the first layer in the low-temperature cycle, this bit is influenced by Hb immediately thereafter at room temperature. However, since this medium satisfies the above-mentioned Formula 50-2 at room temperature, the "non-A-directed" magnetization is no longer reversed by Hb.

This medium exhibits the following values at 120° C.:
$M_{S1}$=65 emu/cc.
$H_{C1}$=1400 Oe More specifically, the medium satisfies the formula:

$$H_{C1} + Hb = 1750 < \frac{\sigma_w}{2M_{s1}t_1} = 1791$$

and, at 120° C., the magnetization of the first layer is reversed by the magnetization of the second layer even if Hb is present. If $T_L$=120° C. and $T_H$=270° C. are set, this medium can satisfy Formula 46-1:

$$T_R < T_L < T_{C1} < T_H \leq T_{C2}$$

and, an over-write operation can be achieved.

(Example 10 . . . Class 8, Medium No. 8-2)

A two-layered magnetooptical recording medium No. 8-2 belonging to Class 8 (A Type, Quadrant IV, Type 2) shown in Table 11 below was manufactured following the same procedures as in Example 1.

In Table 11, values of Ms, Hc, and $\sigma_w$ are those at 25° C.

TABLE 11

|  | FIRST LAYER | SECOND LAYER |
|---|---|---|
| COMPOSITION (FIRST LAYER) | $Tb_{21}Fe_{74}Co_5$ | |
| COMPOSITION (SECOND LAYER) | | $Tb_{27}Fe_{48}Co_{25}$ |
| FILM THICKNESS | 700 | 500 |
| $M_S$ (emu/cc) | 50 | 160 |
| $H_C$ (Oe) | 10000 | 4500 |
| $T_C$ (°C.) | 180 | 360 |
| $T_{comp}$ (°C.) | NONE | 140 |
| $\sigma_w$ ROOM TEMPERATURE | 4.2 erg/cm² | |

This medium satisfies Formula 47:

$$H_{C1} = 10000 > H_{C2} + \left| \frac{\sigma_w}{2M_{s1}t_1} - \frac{\sigma_w}{2M_{s2}t_2} \right| = 7875 \text{ Oe}$$

In Formula 50, since $$H_{C2} + \frac{\sigma_w}{2M_{s2}t_2} = 7125 \text{ Oe}$$

$$H_{C1} + \frac{\sigma_w}{2M_{s1}t_1} = 16000 \text{ Oe}$$

if the initial field Hini. is set to be 8,000 Oe in the "A direction", Formula 50 can be satisfied. Thus, the magnetization of the first layer is not reversed by the field Hini. at room temperature, and only the magnetization of the second layer is reversed.

Furthermore, this medium satisfies Formula 48:

$$H_{C1} = 10000 \text{ Oe} > \frac{\sigma_w}{2M_{s1}t_1} = 6000 \text{ Oe}$$

and, Formula 49:

$$H_{C2} = 4500 \text{ Oe} > \frac{\sigma_w}{2M_{s2}t_2} = 2625 \text{ Oe}$$

Therefore, if the field Hini. is removed, the magnetizations of the first and second layers are maintained.

If the bias field Hb is set to be 350 Oe in the same "A direction" as the field Hini., the medium satisfies Formula 50-2 at room temperature:

$$Hb = 350 < H_{C1} + \frac{\sigma_w}{2M_{s1}t_1} = 16000 \text{ Oe}$$

Therefore, the "non-A-directed" magnetization of the first layer of the recorded bit is no longer reversed even if it is again influenced by Hb after one revolution.

Furthermore, when a bit having the "non-A-directed" magnetization is formed in the first layer in the low-temperature cycle, this bit is influenced by Hb immediately thereafter at room temperature. However, since this medium satisfies the above-mentioned Formula 50-2 at room temperature, the "non-A-directed" magnetization is no longer reversed by Hb.

This medium exhibits the following values at 120° C.:

$M_{S1}$=65 emu/cc $H_{C1}$=1400 Oe $\sigma_w$=1.63

More specifically, the medium satisfies the formula:

$$H_{C1} + Hb = 1750 < \frac{\sigma_w}{2M_{s1}t_1} = 1791$$

and, at 120° C., the magnetization of the first layer is reversed by the magnetization of the second layer even if Hb is present.

If $T_L$=120° C. and $T_H$=215° C. are set, this medium can satisfy Formula 46-2:

$T_R < T_L < T_{C1} < T_H \leq T_{C2}$ and, an over-write operation can be achieved.

This medium satisfies Formula 11-2:

$T_{comp.2}$=140° C.<$T_{C1}$=180° C.

(Example 11 . . . Class 8, Medium No. 8-3)

A three-element RF magnetron sputtering apparatus was used, and two targets, i.e., first and second TbFeCo alloys having different compositions were placed therein. A glass substrate having a thickness of 1.2 nun and a diameter of 200 mm was set in a chamber of the apparatus.

After the interior of the chamber of the apparatus was evacuated to a vacuum of 7×10⁻⁷ Torr. or less, an Ar gas was introduced therein to a vacuum of 5×10⁻³ Torr. Sputtering was then performed at a deposition rate of about 2 Å/sec.

First, a first layer (recording layer) of a 600-Å thick $Tb_{21}Fe_{70}Co_9$ (numerals of suffixes are in units of atomic %: this applies to the following description) perpendicular magnetic film was formed on the substrate using the first TbFeCo alloy as the target.

Then, the target was replaced with the second TbFeCo alloy while maintaining the vacuum state, and sputtering was similarly performed. As a result, a second layer (reference layer) of a 500-Å thick $Tb_{26}Fe_{52}Co_{22}$ perpendicular magnetic film was formed on the first layer.

In this manner, a two-layered magnetooptical recording medium No. 8-3 belonging to Class 8 (A Type, Quadrant IV, Type 2) was manufactured.

Table 12 below summarizes the manufacturing conditions and characteristics of this medium. In Table 12, values of Ms, Hc, and $\sigma_w$ are those at 25° C.

TABLE 12

| | FIRST LAYER | SECOND LAYER |
|---|---|---|
| COMPOSITION (FIRST LAYER) | $Tb_{21}Fe_{70}Co_9$ | |
| COMPOSITION (SECOND LAYER) | | $Tb_{26}Fe_{52}Co_{22}$ |
| FILM THICKNESS (Å) | 600 | 500 |
| $M_S$ (emu/cc) | 65 | 150 |
| $H_C$ (Oe) | 10000 | 4500 |
| $T_C$ (°C.) | 215 | 270 |
| $T_{comp.}$ (°C.) | NONE | 150 |
| $\sigma_w$ | 5.0 erg/cm² | |

This medium satisfies Formula 47:

$$H_{C1} = 10000 > H_{C2} + \left| \frac{\sigma_w}{2M_{s1}t_1} - \frac{\sigma_w}{2M_{s2}t_2} \right|$$
$$= 7577 \text{ Oe}$$

In Formula 50, since $$H_{C2} + \frac{\sigma_w}{2M_{s2}t_2} = 7833 \text{ Oe}$$

$$H_{C1} + \frac{\sigma_w}{2M_{s1}t_1} = 16410 \text{ Oe}$$

if the initial field Hini. is set to be 9,000 Oe in the "A direction" Formula 50 can be satisfied Thus, the magnetization of the first layer is not reversed by the field Hini. at room temperature, and only the magnetization of the second layer is reversed.

Furthermore, this medium satisfies Formula 48:

$$H_{C1} = 10000 \text{ Oe} > \frac{\sigma_w}{2M_{s1}t_1} = 6410 \text{ Oe}$$

and, Formula 49:

$$H_{C2} = 4500 \text{ Oe} > \frac{\sigma_w}{2M_{s2}t_2} = 3333 \text{ Oe}$$

Therefore, if the field Hini. is removed, the magnetizations of the first and second layers are maintained.

If the bias field Hb is set to be 350 Oe in the same "A direction" as the field Hini., the medium satisfies Formula 50-2 at room temperature:

$$Hb = 350 < H_{c1} + \frac{\sigma_w}{2M_{s1}t_1} = 16410 \text{ Oe}$$

Therefore, the "non-A-directed" magnetization of the first layer of the recorded bit is no longer reversed even if it is again influenced by Hb at room temperature.

Furthermore, when a bit having the "non-A-directed" magnetization is formed in the first layer in the low-temperature cycle, this bit is influenced by Hb immediately thereafter at room temperature. However, since this medium satisfies the above-mentioned Formula 50-2 at room temperature, the "non-A-directed" magnetization is no longer reversed by Hb.

This medium exhibits the following values at 115° C.:

$M_{S1}$=82 emu/cc $H_{C1}$=2250 Oe $\sigma_w$=2.61

More specifically, the medium satisfies the formula:

$$H_{c1} + Hb = 2600 < \frac{\sigma_w}{2M_{s1}t_1} = 2652$$

and, at 115° C., the magnetization of the first layer reversed by the magnetization of the second layer even if Hb is present.

This medium exhibits the following values at 209° C.:

$M_{s1} = 35$ emu/cc    $M_{s2} = 24.5$ emu/cc $H_{c1} = 100$ Oe    $H_{c2} = 750$ Oe $\sigma_w = 0.1$    $\sigma_w = 0.1$ Therefore, the following Formulas (2) are satisfied:

$$Hb = 350 > H_{c1} + \frac{\sigma_w}{2M_{s1}t_1} = 338$$

and $$Hb = 350 > H_{c2} - \frac{\sigma_w}{2M_{s2}t_2} = 342$$

and, at 209° C., the magnetizations of both the first and second layers are reversed by Hb.

If $T_L=115°$ C. and $T_H=209°$ C. are set, this medium can satisfy Formula 46-3:

$$T_R < T_L < T_H \leq T_{C2}$$

and, an over-write operation can be achieved.

This medium also satisfies Formula 11-2:

$$T_{comp.2}=150° C. < T_{C1}=215° C.$$

(Example 12 . . . Class 9, Medium No. 9)

A three-element RF magnetron sputtering apparatus was used, and three targets, i.e., a GdTb alloy, an FeCo alloy, and a TbFeCo alloy shown in Table 13 below were placed therein. As the target, the TbFeCo alloy was used first, and then, the GdTb and FeCo alloys (2 elements) were used.

A glass substrate having a thickness of 1.2 mm and a diameter of 200 mm was set in a chamber of the apparatus.

After the interior of the chamber of the apparatus was evacuated to a vacuum of $7 \times 10^{-7}$ Torr. or less, an Ar gas was introduced therein to a vacuum of $5 \times 10^{-3}$ Torr. Sputtering was then performed at a deposition rate of about 2 Å/sec. A first layer of a 600-Å thick $Tb_{20}Fe_{71}Co_9$ film was formed on the substrate. Then, the target was changed while maintaining the vacuum state. Sputtering was similarly performed, and a second layer of a 1,500-Å thick $Gd_8Tb_{18}Fe_{68}Co_6$ film was formed on the first layer. Both the first and second layers were perpendicular magnetic layers.

In this manner, a medium No. 9 belonging to Class (A Type, Quadrant IV, Type 4) was manufactured.

Table 13 below summarizes the manufacturing conditions and characteristics of this medium.

TABLE 13

| | FIRST LAYER | SECOND LAYER |
|---|---|---|
| EVAPORATION SOURCE (2 ELEMENTS) | TbFeCo ALLOY | GdTb ALLOY FeCo ALLOY |
| FILM THICKNESS t (Å) | 600 | 1500 |
| $M_S$ (emu/cc) | 65 | 166 |
| $H_C$ (Oe) | 9000 | 2750 |

TABLE 13-continued

| | FIRST LAYER | SECOND LAYER |
|---|---|---|
| $T_C$ (°C.) | 200 | 210 |
| $T_{comp}$ (°C.) | NONE | NONE |
| $\sigma_w$ ROOM TEMPERATURE | 5.0 erg/cm² | |

This medium satisfies Formula 52:

$$H_{c1} = 9000 \text{ Oe} > H_{c2} + \left| \frac{\sigma_w}{2M_{s1}t_1} - \frac{\sigma_w}{2M_{s2}t_2} \right| = 8160 \text{ Oe}$$

In Formula 55, since $$H_{c2} + \frac{\sigma_w}{2M_{s2}t_2} = 3750 \text{ Oe}$$

$$H_{c1} - \frac{\sigma_w}{2M_{s1}t_1} = 15410 \text{ Oe}$$

if the initial field Hini. is set to be 4,000 Oe, Formula 55 can be satisfied. Thus, the magnetization of the first layer is not reversed by the field Hini. at room temperature, and only the magnetization of the second layer is reversed.

Furthermore, this medium satisfies Formula 53:

$$H_{c1} = 9000 \text{ Oe} > \frac{\sigma_w}{2M_{s1}t_1} = 6410 \text{ Oe}$$

and, Formula 54:

$$H_{c2} = 3750 \text{ Oe} > \frac{\sigma_w}{2M_{s2}t_2} = 1000 \text{ Oe}$$

Therefore, if the field Hini. is removed, the magnetizations of the first and second layers are maintained.

Thus, the initial field Hini.=4,000 Oe is applied in the "A direction" and the bias field Hb=300 Oe is applied in the "non-A direction".

This medium exhibits the following values at 114° C.:

$M_{S1}=92$ emu/cc $H_{C1}=2380$ Oe $\sigma_w=2.305$

More specifically, the medium satisfies the formula:

$$H_{c1} - Hb = 2080 < \frac{\sigma_w}{2M_{s1}t_1} = 2088$$

and, at 114° C. the magnetization of the first layer is reversed by the magnetization of the second layer.

If $T_L=114°$ C. and $T_H=210°$ C. are set, this medium can satisfy Formula 51:

$$T_R < T_L < T_{C1} < T_H \leq T_{C2}$$

and, an over-write operation can be achieved.

(Reference Example 1 . . . Over Write Capable Magnetooptical Recording Apparatus)

Figure 65:
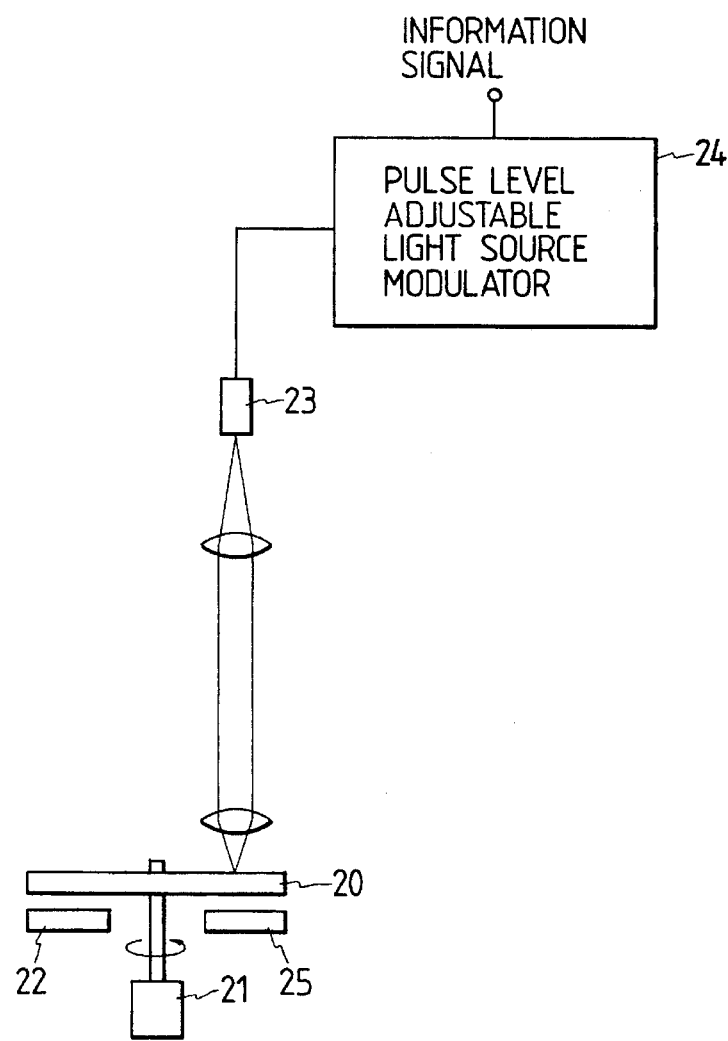
FIG. 65 is a diagram showing the overall arrangement of a magnetooptical recording apparatus.

This apparatus is exclusively used for recording, and FIG. 65 shows its general arrangement.

This apparatus basically comprises:

an electric motor 21 for rotating a recording medium 20;

a device 22 for applying an initial field Hini.;

a laser beam light source 23;

a modulator 24 for pulse-modulating a beam intensity in accordance with binary information to be recorded between (1) high level giving a medium temperature $T_H$ suitable for forming one of a bit having an upward magnetization and a bit having a downward magnetization and (2) low level giving a medium temperature $T_L$ suitable for forming the other bit; and a device 25 for applying a bias field Hb.

The devices 22 and 25 respectively employ the following various permanent magnets in accordance with media.

TABLE 14

| EXAMPLE | Hini. | | Hb | |
|---|---|---|---|---|
| No. | Oe | Direction | Oe | Direction |
| 1 | 5,200 | A | 300 | A |
| 2 | 5,200 | A | 300 | A |
| 3 | 4,000 | A | 200 | A |
| 4 | 4,200 | A | 300 | A |
| 5 | 4,200 | A | 300 | A |
| 6 | 4,000 | A | 200 | A |
| 7 | 4,000 | A | 200 | A |
| 8 | 4,000 | A | 200 | A |
| 9 | 8,000 | A | 350 | A |
| 10 | 8,000 | A | 350 | A |
| 11 | 9,000 | A | 350 | A |
| 12 | 4,000 | A | 200 | A |

The permanent magnets 22 and 25 are rod-line ones each having a length corresponding to a radius of the disk-like recording medium 20. The magnets 22 and 25 are fixed in the recording apparatus and are not moved together with a pickup including the light source 23. (Reference Example 2 . . . Over Write Magnetooptical Recording)

Magnetooptical recording was performed using the recording apparatus shown in FIG. 65. First, a recording medium (No. 8-1) 20 in Example 9 (Class 8) was moved at a constant linear velocity of 5.7 m/sec. A laser beam was radiated on the medium 20. This beam was pulse-modulated by the modulator 24 in accordance with information to be recorded, and was adjusted so that an output of 9.0 mW (on disk) at high level and an output of 3.5 mW (on disk) at low level were obtained.

In this case, information to be recorded was a signal at a frequency of 0.5 MHz. Therefore, the beam was radiated on the medium 20 while being modulated at the frequency of 0.5 MHz. Thus, a 0.5-MHz signal would be recorded. When the recorded information was reproduced by a separate magnetooptical reproducing apparatus (beam intensity=1 mW on disk), C/N ratio was 57 dB and it was confirmed that the information was recorded.

A signal of a frequency of 1 MHz was recorded on the already recorded region of the medium 20 as new information. When this information was similarly reproduced, the new information was reproduced while the C/N ratio=56 dB. In this case, no 0.5-MHz signal (previous information) appeared at all.

As a result, it was demonstrated that the over-write operation could be performed.

Under this condition, the medium temperature reaches $T_H$=220° C. at high level, and $T_L$=104° C. at low level. (Reference Example 3 . . . Measurement of C/N Ratio)

A recording medium (Class 8) 20 in Example 10 was moved at a constant linear velocity of 9.5 m/sec using the recording apparatus shown in FIG. 65, and a beam was radiated on the medium 20. The beam was pulse-modulated at a frequency of 1 MHz so that an output of 9.0 mW (on disk) at high level and an output of 3.8 mW (on disk) at low level were obtained. When the recorded medium thus obtained was reproduced by a separate magnetooptical reproducing apparatus using a laser beam having a level of 1.5 mW (on disk), C/N ratio was 59 dB and it was confirmed that the information was recorded.

A signal of a frequency of 1.2 MHz was recorded on the already recorded region of the medium 20 as new information. When this information was similarly reproduced, the new information was reproduced while the C/N ratio=58 dB. In this case, no 1-MHz signal (previous information) appeared at all.

As a result, it was demonstrated that the over-write-operation could be performed.

Under this condition, the medium temperature reaches $T_H$=215° C. at high level, and $T_L$=120° C. at low level.

C/N ratios of media in Examples 1, 2, 4, 5, 9, and 10 upon an over-write operation were measured similarly (a laser beam power was changed).

Table 15 below summarizes the measurement results.

TABLE 15

| MAGNETOOPTICAL RECORDING MEDIUM | C/N |
|---|---|
| EXAMPLE 1 (CLASS 1) Tcomp. 2 Tc1 | 56 |
| EXAMPLE 2 (CLASS 1) Tcomp. 2 Tc1 | 58 |
| EXAMPLE 4 (CLASS 2) Tcomp. 2 Tc1 | 56 |
| EXAMPLE 5 (CLASS 2) Tcomp. 2 Tc1 | 58 |
| EXAMPLE 9 (CLASS 8) Tcomp. 2 Tc1 | 56 |
| EXAMPLE 10 (CLASS 8) Tcomp. 2 Tc1 | 58 |

What is claimed is:

1. An overwritable method of magnetooptical recording comprising the following steps:

step 1) providing a magnetooptical recording medium and a laser beam, said medium comprising a substrate and a magnetic layer structure stacked on said substrate and including first and second magnetic exchange coupled layers each having perpendicular magnetic anisotropy;

wherein when one of opposite directions substantially perpendicular to said medium is defined as an "A direction" and the other is defined as a "non-A direction", magnetization of said second layer can be aligned along the "A direction" or "non-A direction" without changing the direction of magnetization of said first layer, and wherein said structure satisfies the following condition:

$$T_R < T_{C1} T_{C2}$$

where $T_R$: room temperature $T_{C1}$: Curie temperature of first layer $T_{C2}$: Curie temperature of second layer, satisfies the following conditions at room temperature:

$$H_{C1} > H_{C2} + |H_{D1} \mp H_{D2}|$$

$$H_{C1} > H_{D1}$$

$$H_{C2} > H_{D2}$$

where $H_{C1}$: coercivity of first layer $H_{C2}$: coercivity of second layer $H_{D1}$: coupling field applied to second layer, $H_{D2}$: coupling field applied to first layer and satisfies the following conditions:

$$H_{C1} > \sigma_w/2M_{S1}t_1$$

$$H_{C2} > \sigma_w/2M_{S2}t_2$$

where $M_{S1}$: saturation magnetic moment of first layer $M_{S2}$: saturation magnetic moment of second layer $t_1$: film thickness of first layer $t_2$: film thickness of second layer $\sigma_w$: interface wall energy (exchange coupling force);

step 2) aligning magnetization of said second layer to the "A direction" at least at a region to be recorded;

step 3) moving said medium relative to said laser beam in a direction transverse to said laser beam; and step 4) irradiating said region of said medium to be recorded with said laser beam while pulse-modulating said laser beam between a high-level and a low-level in accordance with binary information to be recorded and while applying a bias field to said region;

wherein the following condition is satisfied:

$$T_R < T_L < T_{C1} < T_H < T_{C2}$$

where $T_L$: temperature of recording medium when irradiated by said low-level laser beam $T_H$: temperature of recording medium when irradiated by said high-level laser beam; and wherein the following condition is established when the temperature of said recording medium is raised from $T_R$ to $T_L$:

$$H_{C1} \pm H_b < \sigma_w/2M_{S1}t_1$$

where $H_b$: bias field, whereby when the medium has been irradiated by a high-level laser beam, a bit having a "non-A direction" magnetization is formed in said second layer and a bit having a magnetization in a direction stable to the magnetization of said second layer is formed in said first layer at $T_R$, and when the medium has been irradiated by a low-level laser beam, a bit having an "A direction" magnetization is formed in said second layer and a bit having a magnetization in a direction stable to the magnetization of said second layer is formed in said first layer at $T_R$.

2. An overwritable method according to claim 1, wherein said structure satisfies the following condition:

$$H_{C2} + H_{D2} < |Hini.| < H_{C1} \pm H_{D1}$$

where

Hini.: initial field.

3. An overwritable method according to claim 1, wherein said first layer has a compensation temperature Tcomp.1 which is substantially equal to room temperature and said second layer has a compensation temperature Tcomp.2 which is higher than room temperature and lower than the Curie temperature $T_{C1}$ of the first layer.

4. An overwritable method according to claim 1, wherein said second layer has a compensation temperature Tcomp.2 which is higher than room temperature $T_R$ and lower than the Curie temperature $T_{C1}$ of the first layer.

5. An overwritable method according to claim 1, wherein said first layer has a compensation temperature Tcomp.1 which is higher than room temperature and said second layer has a compensation temperature Tcomp.2 which is higher than room temperature and lower than the Curie temperature $T_m$ of the first layer.

6. An overwritable method according to claim 1, wherein said second layer has a compensation temperature Tcomp.2 which is higher than room temperature $T_R$ and lower than the Curie temperature $T_{C1}$ of the first layer, the second layer satisfying a relation $T_L >$ Tcomp.2.

7. An overwritable method of magnetooptical recording comprising the following steps:

step 1) providing a magnetooptical recording medium and a laser beam, said medium comprising a substrate and a magnetic layer structure stacked on said substrate and including first and second magnetic exchange coupled layers each having perpendicular magnetic anisotropy;

wherein when one of opposite directions substantially perpendicular to said medium is defined as an "A direction" and the other is defined as a "non-A direction", magnetization of said second layer can be aligned along the "A direction" or "non-A direction" without changing the direction of magnetization of said first layer, and wherein said structure satisfies the following condition:

$$T_R < T_{C1} < T_{C2}$$

where $T_R$: room temperature $T_{C1}$: Curie temperature of first layer $T_{C2}$: Curie temperature of second layer, satisfies the following conditions at room temperature:

$$H_{C1} > H_{C2} + |H_{D1} \mp H_{D2}|$$

$$H_{C1} > H_{D1}$$

$$H_{C2} > H_{D2}$$

where $H_{C1}$: coercivity of first layer $H_{C2}$: coercivity of second layer $H_{D1}$: coupling field applied to first layer $H_{D2}$: coupling field applied to second layer, and satisfies the following conditions:

$$H_{C1} > \sigma w/2M_{S1}t_1$$

$$H_{C2} > \sigma w/2M_{S2}t_2$$

where $M_{S1}$: saturation magnetic moment of first layer $M_{S2}$: saturation magnetic moment of second layer $t_1$: film thickness of first layer $t_2$: film thickness of second layer πw: interface wall energy (exchange coupling force);

step 2) aligning magnetization of said second layer to the "A direction" at least at a region to be recorded;

step 3) moving said medium relative to said laser beam in a direction transverse to said laser beam; and step 4) irradiating said region of said medium to be recorded with said laser beam while pulse-modulating said laser beam between a high-level and a low-level in accordance with binary information to be recorded and while applying a bias field to said region;

wherein the following condition is satisfied:

$$T_R < T_L < T_H < T_{Cr} < T_{C2}$$

where $T_L$: temperature of recording medium when irradiated by said low-level laser beam $T_H$: temperature of recording medium when irradiated by said high-level laser beam; and wherein the following condition is established when the temperature of said recording medium is raised from $T_R$ to $T_L$:

$$H_{C1} \pm H_b < \sigma w / 2 M_{S1} t_1$$

where $H_b$: bias field, whereby when the medium has been irradiated by a high-level laser beam, a bit having a "non-A direction" magnetization is formed in said second layer and a bit having a magnetization in a direction stable to the magnetization of said second layer is formed in said first layer at $T_R$, and when the medium has been irradiated by a low-level laser beam, a bit having an "A direction" magnetization is formed in said second layer and a bit having a magnetization in a direction stable to the magnetization of said second layer is formed in said first layer at $T_R$.

8. An overwritable method according to claim 7, wherein said structure satisfies the following condition:

$$H_{C2} + H_{D2} < |H_{ini}.| < H_{C1} \pm H_{D1}$$

where

Hini.: initial field.

* * * * *

UNITED STATES PATENT AND TRADEMARK OFFICE
CERTIFICATE OF CORRECTION

PATENT NO. : 5,585,200
DATED : December 17, 1996
INVENTOR(S) : Masatoshi SATO et al.

It is certified that error appears in the above-indentified patent and that said Letters Patent is hereby corrected as shown below:

In Column 56:

line 4, "$T_m$" should read --$T_{c1}$--;
line 56, "$\pi w$" should read --$\sigma w$--.

Signed and Sealed this

Nineteenth Day of August, 1997

*Attest:*

BRUCE LEHMAN

*Attesting Officer*    Commissioner of Patents and Trademarks